(12) United States Patent
Nishi

(10) Patent No.: US 8,289,230 B2
(45) Date of Patent: Oct. 16, 2012

(54) IMAGE DISPLAY DEVICE AND IMAGE DISPLAY SYSTEM

(76) Inventor: Kenji Nishi, Yokohama (JP)

( * ) Notice: Subject to any disclaimer, the term of this patent is extended or adjusted under 35 U.S.C. 154(b) by 449 days.

(21) Appl. No.: 12/542,944

(22) Filed: Aug. 18, 2009

(65) Prior Publication Data

US 2010/0039351 A1    Feb. 18, 2010

Related U.S. Application Data

(62) Division of application No. 10/587,605, filed as application No. PCT/JP2004/015418 on Oct. 19, 2004, now abandoned.

(30) Foreign Application Priority Data

Jan. 28, 2004 (JP) ................................. 2004-020035
Apr. 23, 2004 (JP) ................................. 2004-128734

(51) Int. Cl.
*G09G 5/00* (2006.01)
(52) U.S. Cl. ................................. 345/7; 345/8
(58) Field of Classification Search .................. 345/4–9, 345/32–33, 204–215
See application file for complete search history.

(56) References Cited

U.S. PATENT DOCUMENTS

| | | | |
|---|---|---|---|
| 3,205,303 A | 9/1965 | Bradley | |
| 5,714,967 A | 2/1998 | Okamura et al. | |
| 5,784,207 A | 7/1998 | Satoh | |
| 5,812,224 A | 9/1998 | Maeda et al. | |
| 5,815,126 A | 9/1998 | Fan et al. | |
| 6,057,810 A | 5/2000 | Roell et al. | |
| 6,069,608 A | 5/2000 | Izumi et al. | |
| 6,234,446 B1 | 5/2001 | Patterson | |
| 2002/0180733 A1 | 12/2002 | Colmenarez et al. | |
| 2003/0122925 A1 | 7/2003 | Yoon | |
| 2007/0249932 A1* | 10/2007 | Shahinian | 600/421 |
| 2008/0111910 A1* | 5/2008 | Nikkanen et al. | 348/345 |
| 2009/0303315 A1* | 12/2009 | Charlesworth | 348/61 |

FOREIGN PATENT DOCUMENTS

| | | |
|---|---|---|
| JP | 5-293790 A | 11/1993 |
| JP | 6-141263 A | 5/1994 |
| JP | 6-195440 A | 7/1994 |
| JP | 10-161058 A | 6/1998 |
| JP | 10-197825 A | 7/1998 |

OTHER PUBLICATIONS

Notification Concerning Transmittal of International Preliminary Report on Patentability, Chapter I of the Patent Cooperation Treaty for PCT/JP2004/015418, 6 sheets.

* cited by examiner

*Primary Examiner* — Vijay Shankar
(74) *Attorney, Agent, or Firm* — Holtz, Holtz, Goodman & Chick, PC

(57) ABSTRACT

An image display device comprising a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user, a supporting portion that supports the display portion at its portion that is not in contact with the user, and a face contact portion that is supported by the display portion and is capable of changing the distance between the eyepiece optical systems and the eyes of the user, whereby images with high image quality and high field angle are, in a space-saving manner, safely provided to the user, and, at the time, with the personal image display devices' disadvantages being saved, even multiple persons can enjoy the images.

19 Claims, 48 Drawing Sheets

1 Image display device

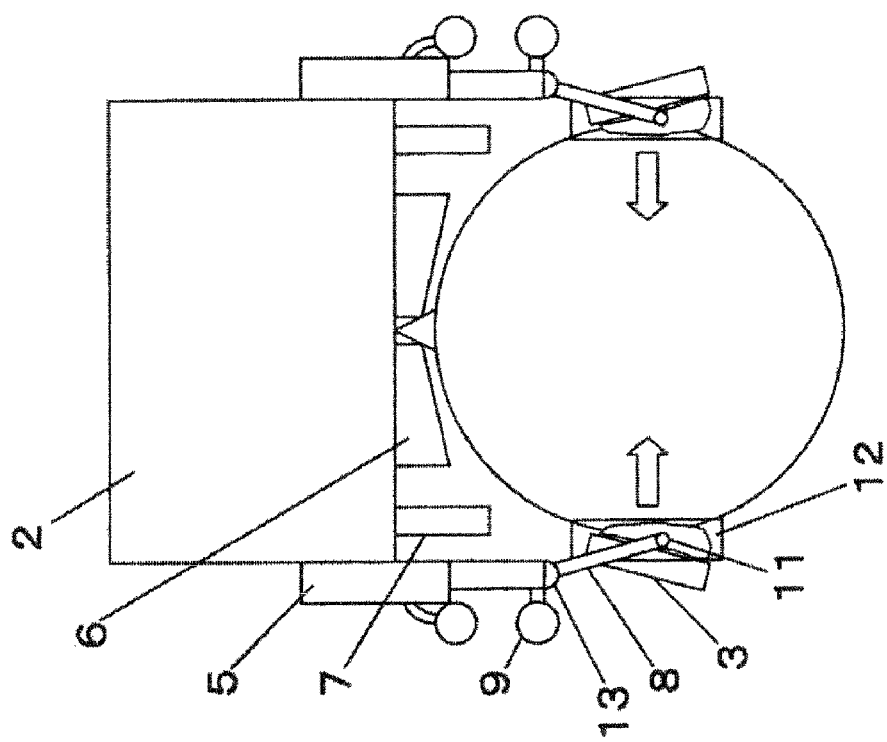
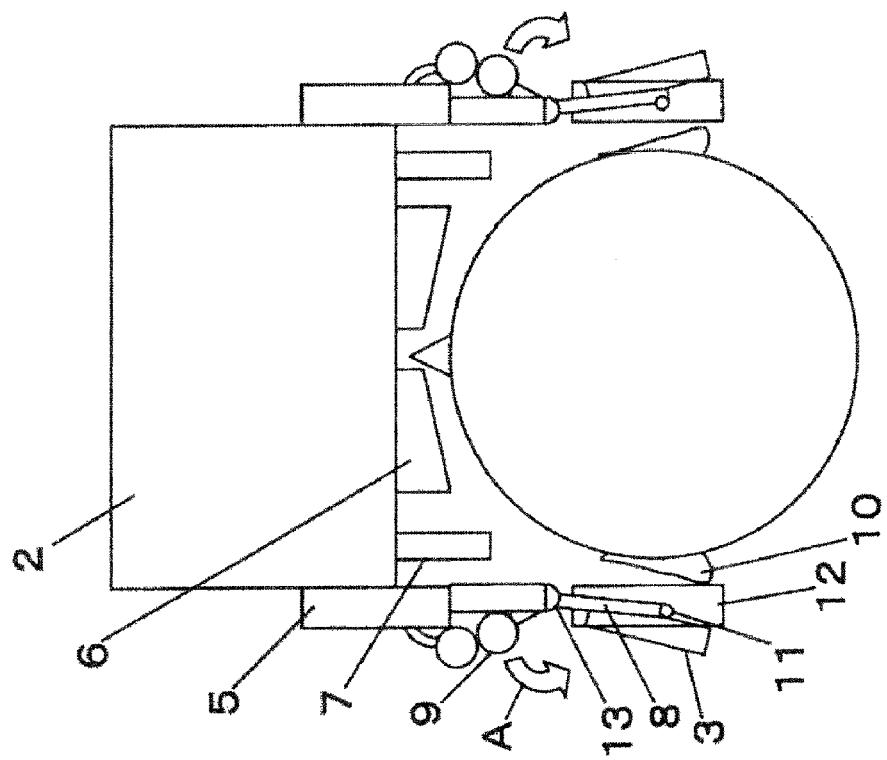

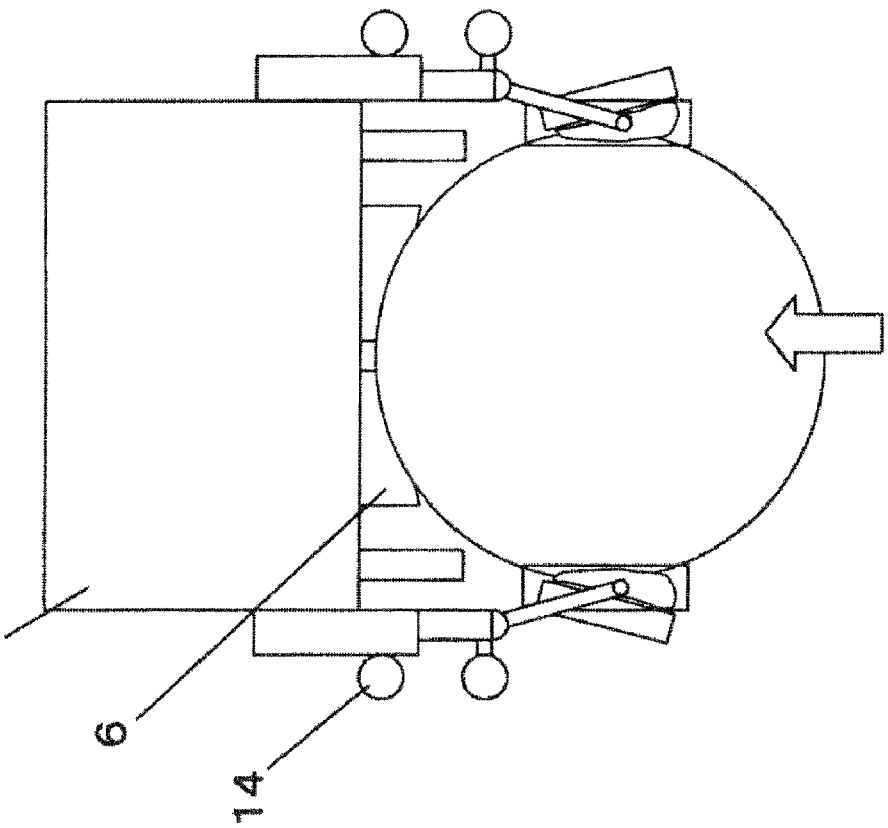
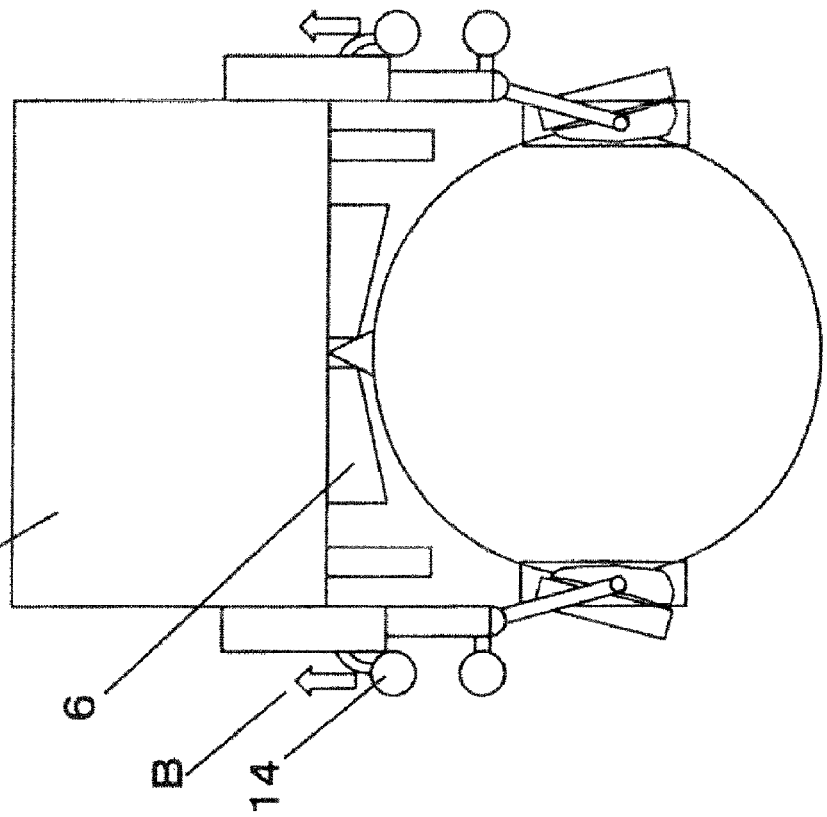

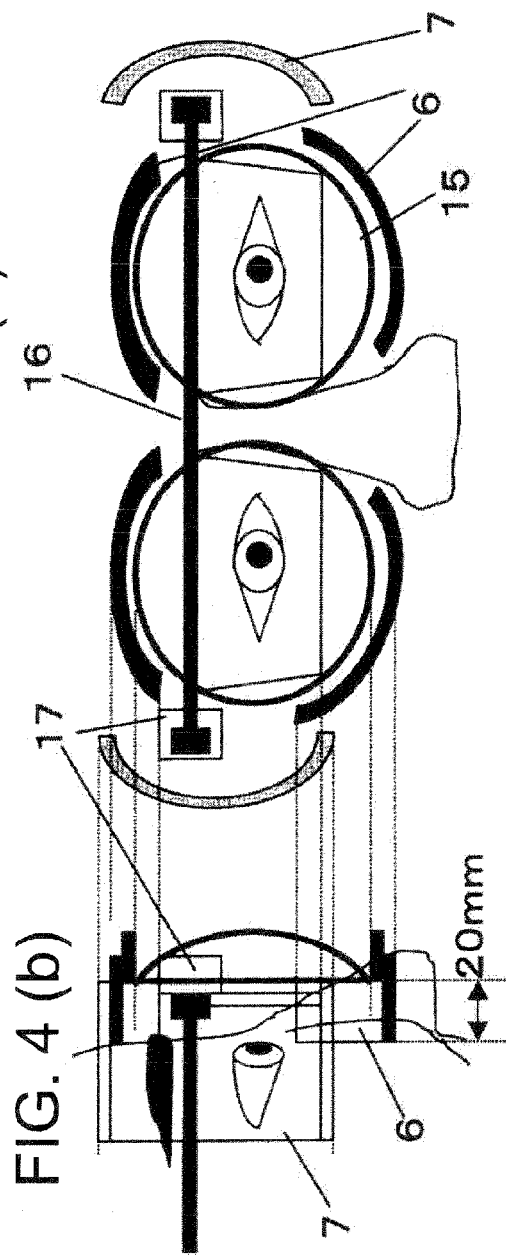

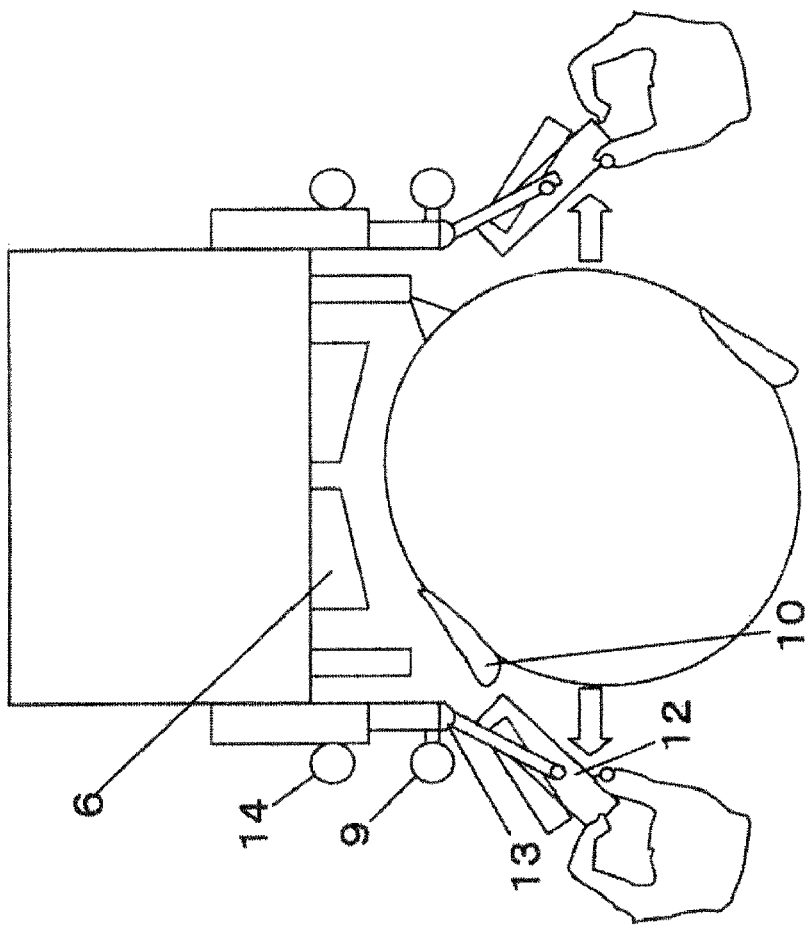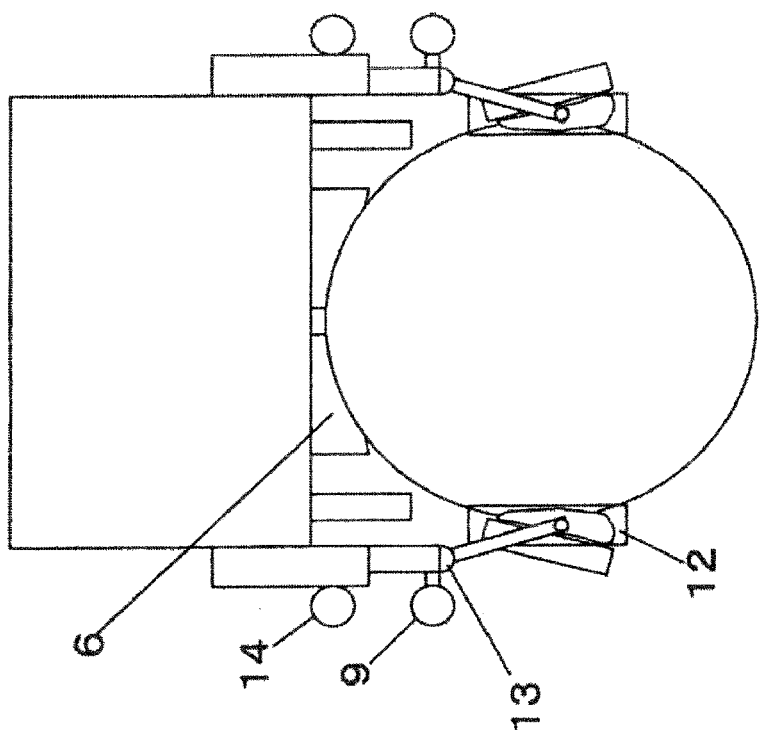

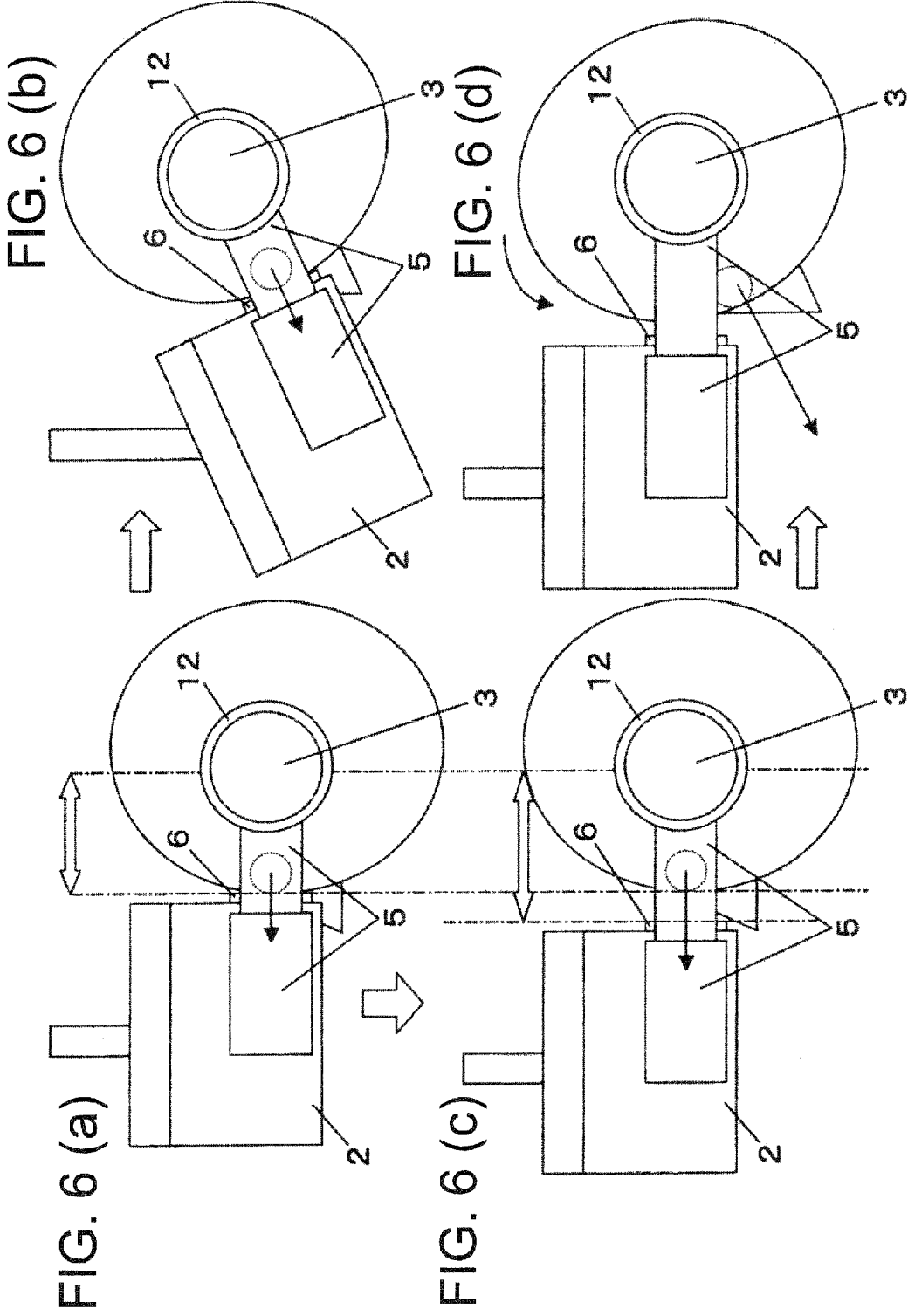

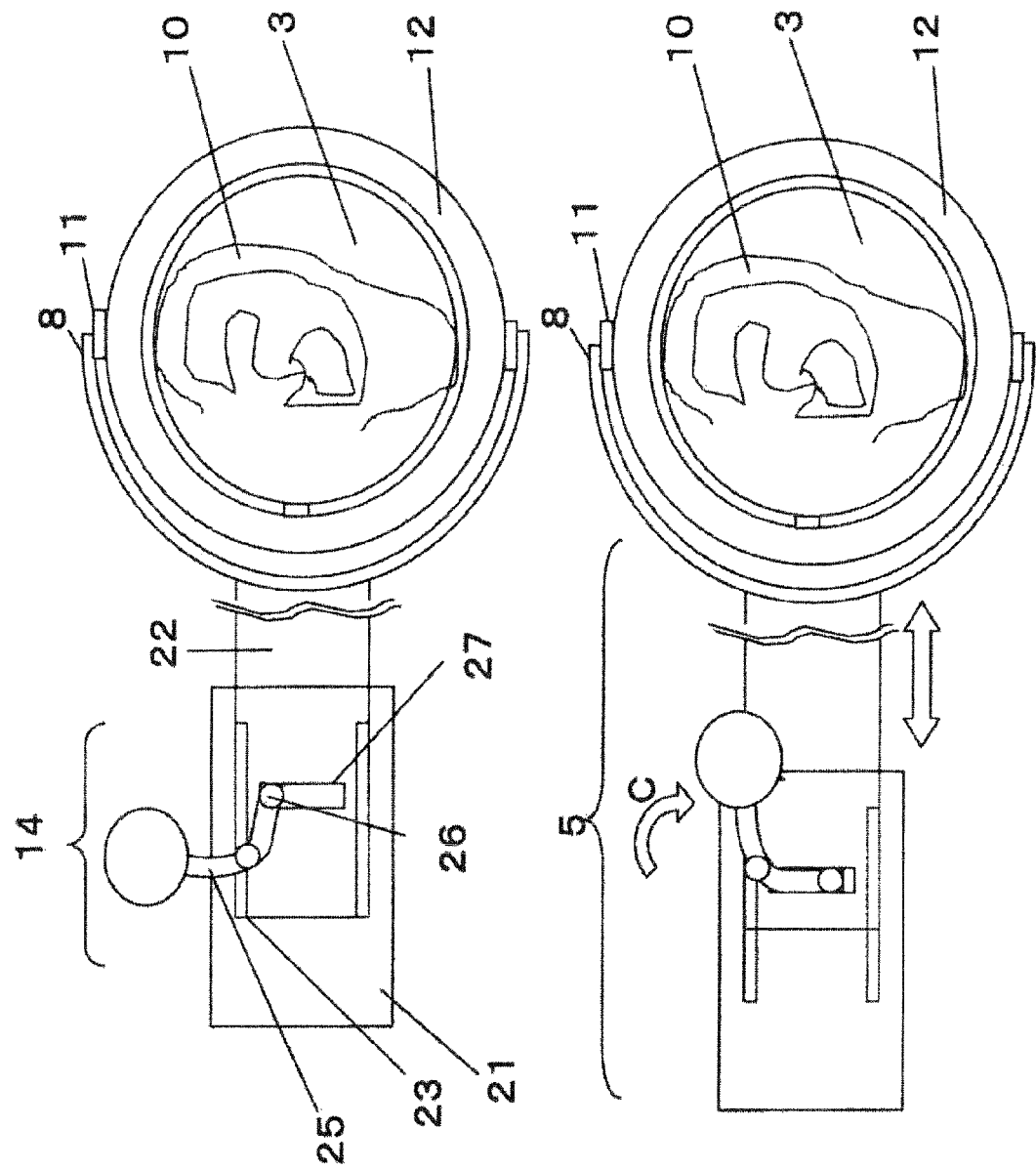

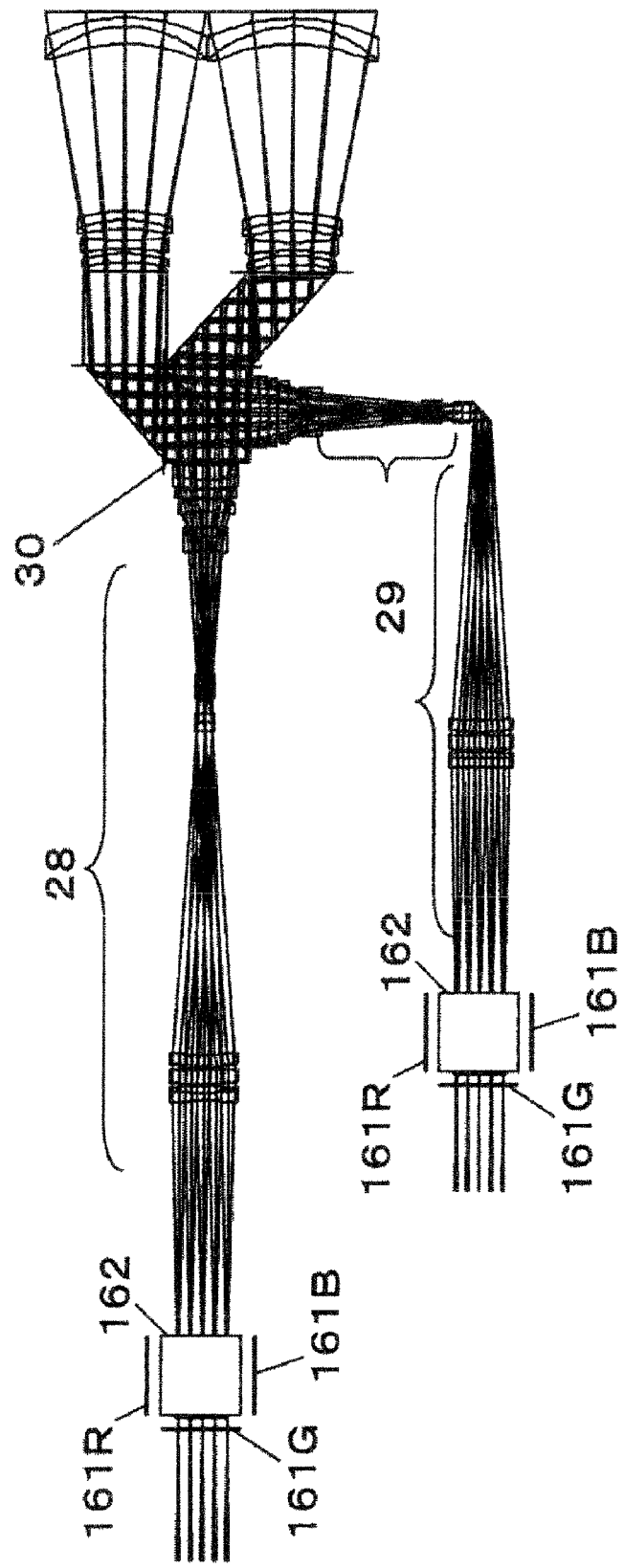

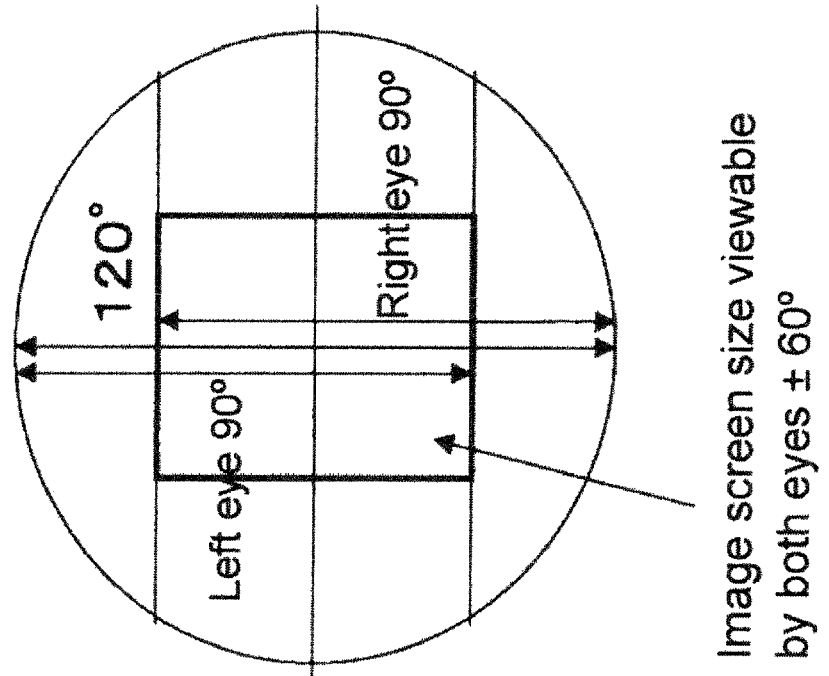
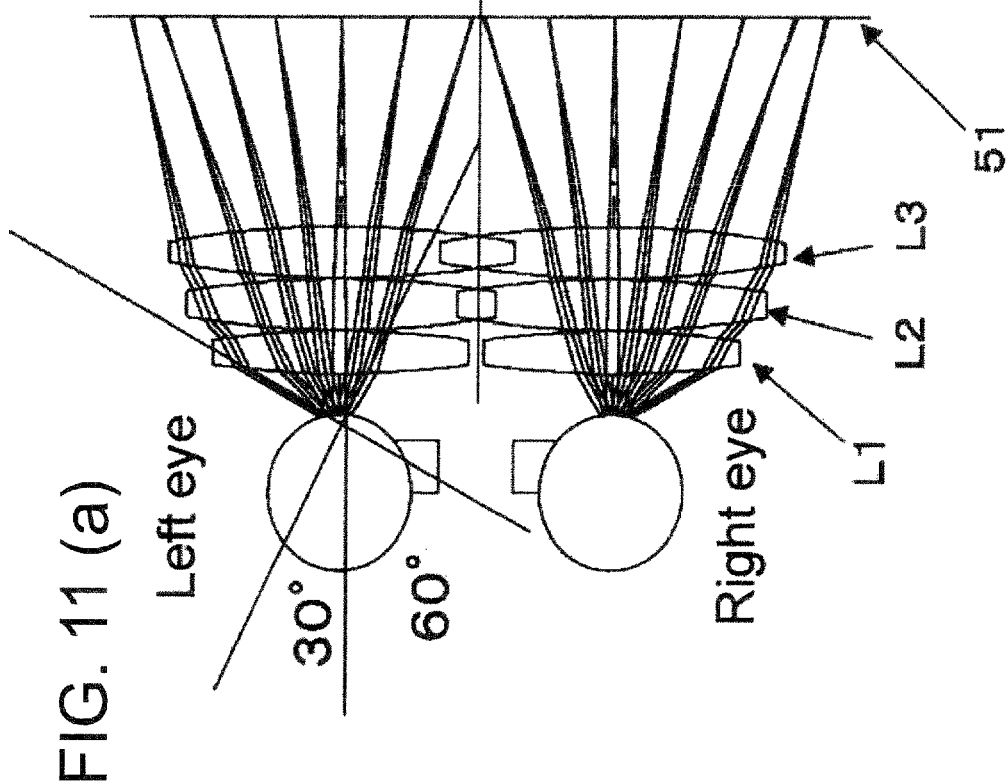

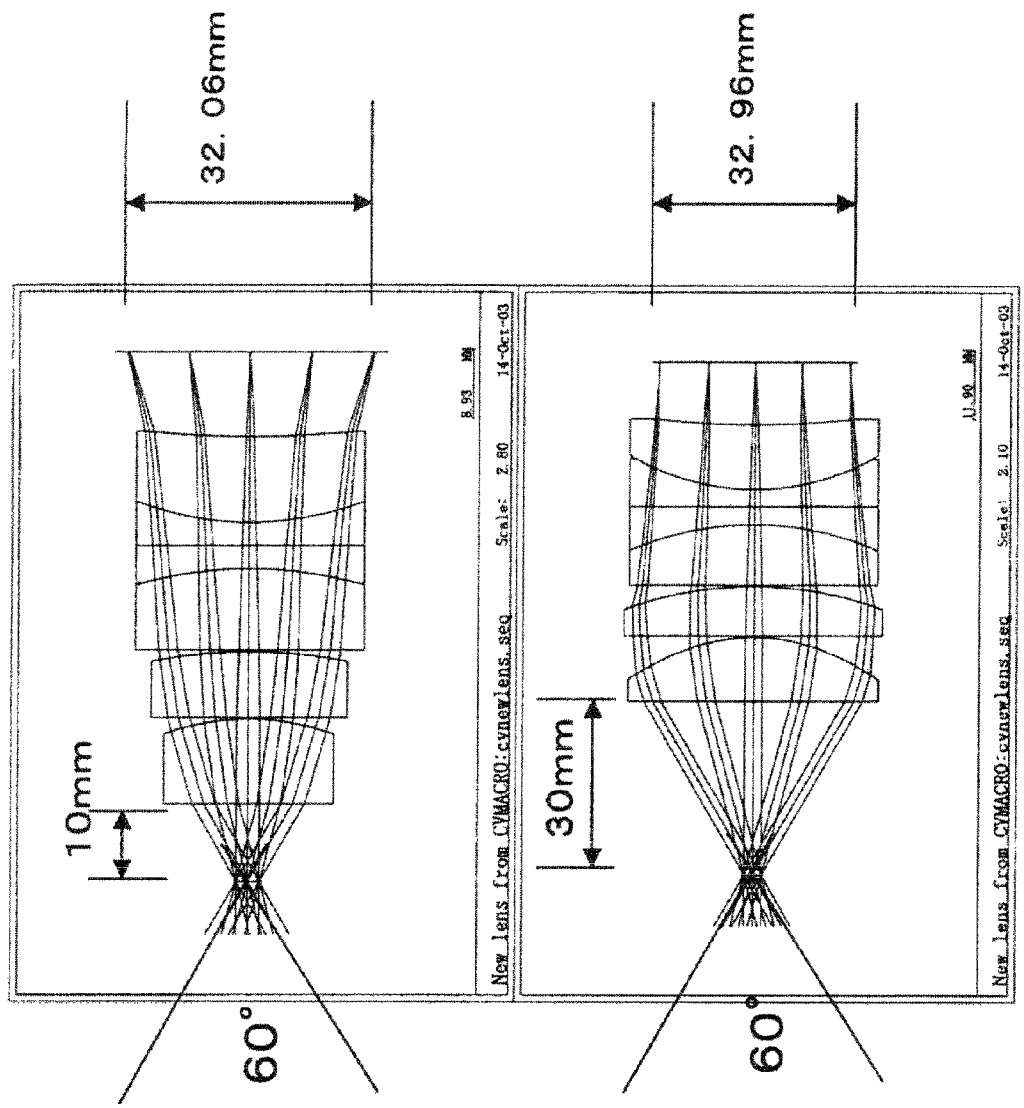

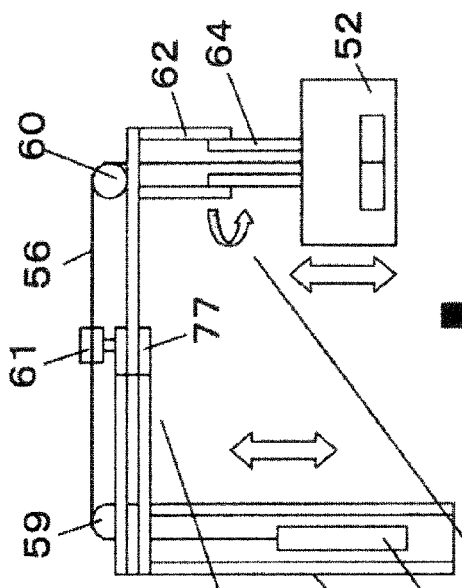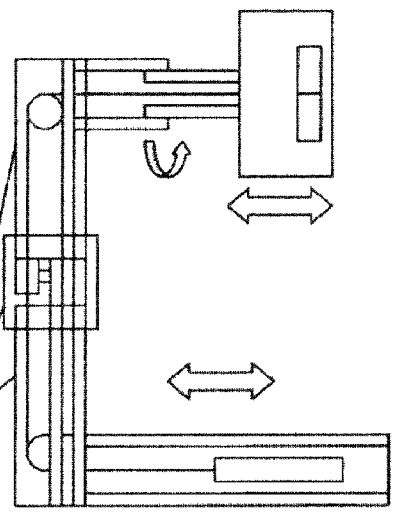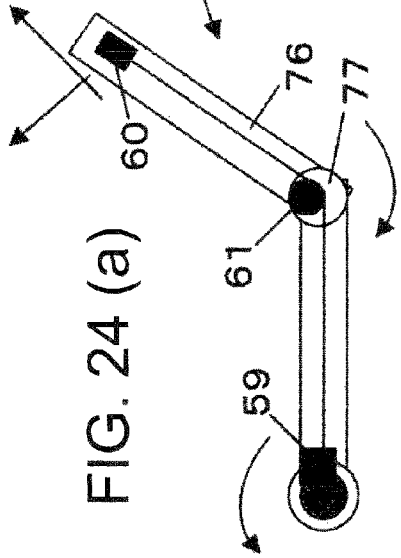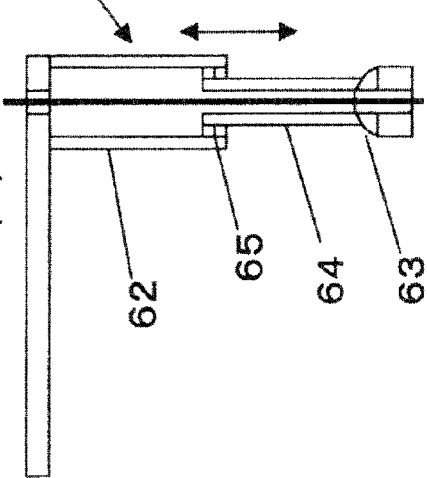
FIG. 24 (a) FIG. 24 (b) FIG. 24 (c) FIG. 24 (d)

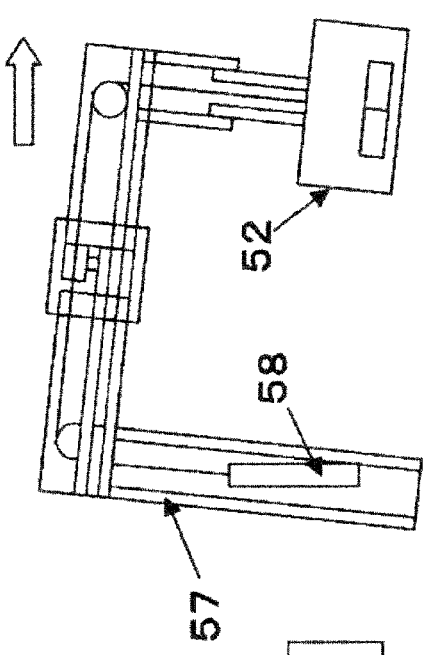
FIG. 34 (2)
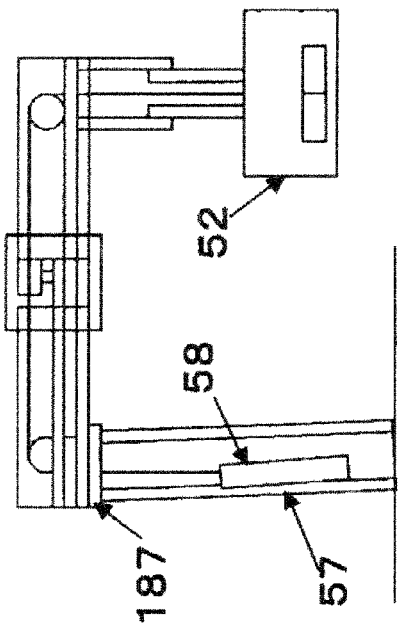
FIG. 34 (4)
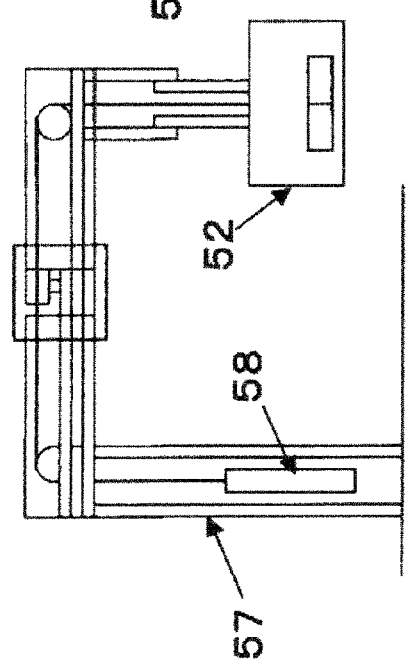
FIG. 34 (1)
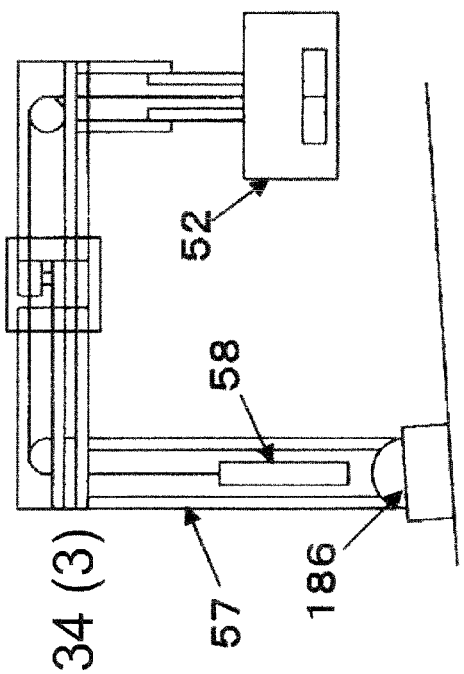
FIG. 34 (3)

FIG. 36

| Field of view angle (degree) | Number of pixels per unit area | | | | | |
|---|---|---|---|---|---|---|
| | 276 | 683 | 800 | 1028 | 1280 | 1920 |
| 13.9 | 0.36 | 0.82 | 0.96 | 1.23 | 1.54 | 2.30 |
| 20.1 | 0.25 | 0.57 | 0.66 | 0.85 | 1.06 | 1.59 |
| 25.0 | 0.20 | 0.46 | 0.53 | 0.69 | 0.85 | 1.28 |
| 32.1 | 0.16 | 0.35 | 0.42 | 0.53 | 0.66 | 1.00 |
| 36.7 | 0.14 | 0.31 | 0.36 | 0.47 | 0.58 | 0.87 |
| 42.4 | 0.12 | 0.27 | 0.31 | 0.40 | 0.50 | 0.76 |
| 47.8 | 0.10 | 0.24 | 0.28 | 0.36 | 0.45 | 0.67 |
| 53.0 | 0.09 | 0.21 | 0.25 | 0.32 | 0.40 | 0.60 |
| 57.9 | 0.09 | 0.20 | 0.23 | 0.30 | 0.37 | 0.55 |
| 79.4 | 0.06 | 0.14 | 0.17 | 0.22 | 0.27 | 0.40 |
| 95.8 | 0.05 | 0.12 | 0.14 | 0.18 | 0.22 | 0.33 |
| 108.3 | 0.04 | 0.11 | 0.12 | 0.16 | 0.20 | 0.30 |

| | |
|---|---|
| a | Dots in the displayed image are not visible |
| b | Dots in the displayed image are visible, but one scarcely feels uneasy |
| c | Dots in the displayed image are visible, but one does not feel uneasy in case of adapting to the displayed image |
| d | Resolution is low, and the image screen size should be made smaller |

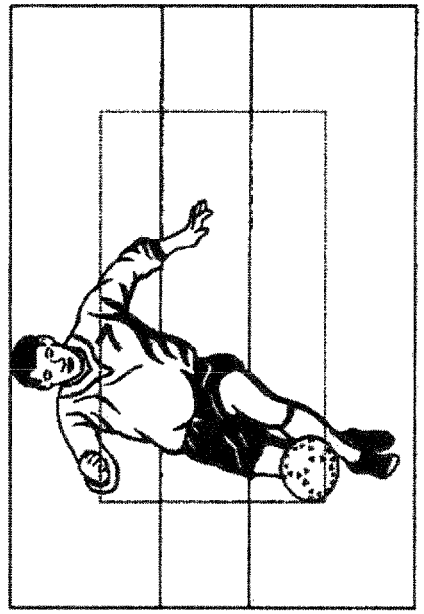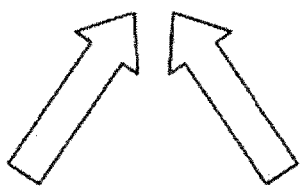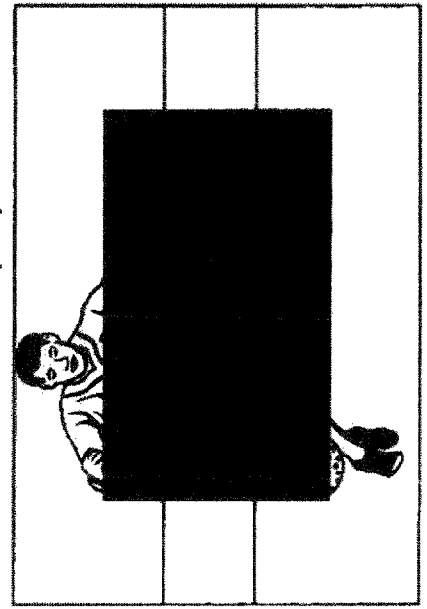
FIG. 38 (A) FIG. 38 (B) FIG. 38 (C)

130 Image display device

IMAGE DISPLAY DEVICE AND IMAGE DISPLAY SYSTEM

This application is a Divisional Application of U.S. application Ser. No. 10/587,605 filed Jul. 27, 2006, now abandoned the contents of which is incorporated herein by reference, and which is a U.S. national Phase Application under 35 USC 371 of International Application PCT/JP2004/015418 Filed Oct. 19, 2004.

TECHNICAL FIELD

The present invention relates to an image display device that is used with it being positioned near to the eyeballs and relates to an image display system.

BACKGROUND ART

Generally, image display devices can be divided into devices for multiple persons to enjoy images displayed thereon such as televisions and projectors, and personal display devices by which displayed images are enjoyed personally such as personal computers, televisions set in the chairs in an airplane, and cell phones. In the case of the former ones, for multiple persons to appreciate images, the images are required to be displayed at a position distant from the picture plane, and thus there is the disadvantage that there arises a restriction with respect to the size of the display, and, at the time, a large space is required. On the other hand, since the latter ones are for personal use, images may be displayed near the picture plane, and even if the picture plane itself is small, the images can be observed with a field angle comparable to that of the above-described televisions or projectors. However, since focal position is located near the user, there also is a restriction concerning the field angle (the user can approach such a display only down to a distance of from 30 to 40 cm); since the focal position is located near the user, the user is apt to be tired, and, moreover, wide range images having a field of view angle of more than 30 degrees cannot be obtained from such a display.

What was devised to solve the latter problem was eyeglass type displays and head mount type displays, namely, these displays are configured such that their image display portions are attached on the head, or such that their image display portions such as eyeglass frames are attached on the face; large picture planes located at a distant focal position are viewed with virtual images. However, in order to be attached on the head, they are required to be made light, and both of their image quality and field angle are unsatisfactory. On the other hand, as a method to satisfy high performances of both of image quality and field angle, there are systems configured such that with the heavy object of an image display portion of high image quality and high field angle being fixed on a position other than a user, the user looks into the image display portion, or with the sight line position being detected, the image display device is made to follow the detected sight line position by actuators (for example, see Patent Document 1 and Patent Document 2).

Patent Document 1: Japanese Unexamined Patent Publication Hei 5-293790.
Patent Document 2: Japanese Unexamined Patent Publication Hei 10-161058.

DISCLOSURE OF THE INVENTION

Problem to be Solved by the Invention

However, in the above-described case where the heavy object is supported by an outside member, since there is the possibility that the heavy object is driven in the vicinity of the face, it is required that it properly follow the face portion and that the risk that the face collides with the heavy object should be evaded. Further, also in the case of displays for personal use, when the system is structured such that the entire field of vision is light-shielded, there is the disadvantage that the user cannot appreciate images while paying attention to outside information. While to avoid this disadvantage, with respect to eyeglass type displays and head mount type displays, ingenuities in which, for example, see-through portions through which the peripheral portions can be observed or windows, located at the periphery of the eyeglass, for observing the outside are disposed are made, the ingenuities themselves decrease the sense of reality, and thus there is the disadvantage that the original sense of reality associated with a large screen image cannot be obtained. Still further, with respect to eyeglass type displays and head mount type displays, there is the disadvantage that while they can be utilized for personal use, multiple persons cannot enjoyably appreciate images.

The object of the present invention is to provide an image display device by which these problems are solved and through which images with high image quality and high field angle are, in a space-saving manner, safely provided to the user, and, at the time, with the personal image display devices' disadvantages being saved, even multiple persons can enjoy the images.

Means for Solving Problem

An image display device of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user; a supporting portion that supports said display portion at its portion that is not in contact with said user; and a face contact portion that is supported by said display portion, is provided in contact with the face sides of said user, sandwiches the face of said user, and is capable of changing the distance between said eyepiece optical systems and the eyes of said user.

Preferably, said display portion is movable in accordance with the movement of the head of said user and with the distance between said eyepiece optical systems and the eyes of said user, a portion of said face contact portion being a point of support.

Further, preferably, said face contact portion comes into contact with the face sides by sandwiching the both ears of said user, and the portion sandwiching said both ears comprises a sound output mechanism.

Further, preferably, said face contact portion comprises an elastic member for coming into contact with the face sides of said user, and said face contact portion comprises, independently of said elastic member, a width changing portion that changes the face sandwiching width and a distance changing portion that changes the distance between said eyepiece optical systems and the eyes of said user.

Further, preferably, said display portion changes, in accordance with the distance between said eyepiece optical systems and the eyes of said user, the size of an image to be displayed.

Further, preferably, said display portion comprises a face fixing member in a portion that faces the front side of the face of said user, and said face contact portion can change its position to a distance where the front side of the face of said user is in contact with said face fixing member and to a distance where without the front side of the face of said user being in contact with said face fixing members, the sight line of the both eyes of said user is, relative to said display portion, relatively movable around the axis passing through the both ears.

Further, preferably, said display portion comprises said face fixing members in a manner that they, evading the eyeglass frame of said user, are discretely provided around and above and below said both eyes, and said display portion comprises light-shielding members for shielding light from the outside in the right-and-left outsides of said eyeglass frame.

Further, preferably, said display portion comprises a frame recognition portion that recognizes whether there exists an eyeglass frame of said user, and the thickness in the optical axis direction of said eyepiece optical systems is changeable in accordance with the recognition results by said frame recognition portion.

Further, preferably, each of said eyepiece optical systems in said display portion is constituted by at least three pieces of lenses.

Further, preferably, in each of said eyepiece optical systems in said display portion, the lens located most distant from said eye is constituted by a cemented lens.

Further, preferably, in each of said eyepiece optical systems in said display portion, the lens located nearest to said eye is constituted by a lens of which at least one surface is a conic surface with conic constant K<0.

Further, preferably, said display portion comprises relay optical systems and light diffusing plates between said photoelectric device and said eyepiece optical systems, and the transmitted images of said light diffusing plates are projected, via said eyepiece optical systems, onto the eyeballs of said user.

Further, preferably, said supporting portion comprises a balance portion that cancels the moment of said display portion relative to said supporting portion, and said supporting portion comprises a hardwiring for connecting said display portion to the outside, said hardwiring being provided along the inside of said supporting portion, a portion of said display portion fixed to a portion of said balance portion.

Further, preferably, said supporting portion is expandable and contractible.

Further, preferably, an image display device further comprises a setting condition detection portion that detects the setting condition; and a supporting portion control portion that suppresses the expansion and contraction changes of said supporting portion when said setting condition detection portion detects that the setting condition has significantly deteriorated.

Further, preferably, an image display device further comprises an adjustment portion which is provided on a portion of said supporting portion and which adjusts at least either the setting angle of said supporting portion relative to a floor portion or the setting angle of said display portion relative to said floor portion.

Further, preferably, said supporting portion comprises a vertical balance portion having a weight.

Further, preferably, said display portion can change the content of the center region in the projection area and the content of the peripheral region in the projection area when said display portion displays said image, and said display portion performs either a first display in which said image is projected with a high-definition in said center region and said image is projected with a low-definition in said peripheral region or a second display in which the entirety of said image is projected with a high-definition in said center region and an image different from said image is projected with a low-definition in said peripheral region.

Further, preferably, when said display portion performs said second display, said display portion displays an image different from said image in the portion of said photoelectric device corresponding to said peripheral region.

Further, preferably, when said display portion performs said second display, said display portion displays an image having predetermined patterns of which sizes become smaller as they near said center region in the portion of said photoelectric device corresponding to said peripheral region.

Further, preferably, when said display portion performs said second display, said display portion displays, in the portion of said photoelectric device corresponding to said center region, an image having in at least a portion of the periphery of the portion of said photoelectric device corresponding to said center region said predetermined patterns that are similar to and smaller than said predetermined patterns.

Further, preferably, when said display portion performs said second display, said display portion projects said image in a defocused condition in said peripheral region.

Further, preferably, said face contact portion comprises a movement detection portion that detects the movement of the face of said user, and said display portion shifts the display region of the image to be displayed on said photoelectric device in the portion of said photoelectric device corresponding to said center region, in accordance with the movement of the face of said user detected by said movement detection portion.

Further, preferably, when said display portion performs said second display, said display portion displays information relating to the operation by said user as an image different from said image in the portion of said photoelectric device corresponding to said peripheral region.

Further, preferably, said face contact portion comprises a movement detection portion that detects the movement of the face of said user, and said display portion shifts either the display region of the image to be displayed on said photoelectric device in the portion of said photoelectric device corresponding to said center region or the display region where the information relating to the operation by said user is displayed, in accordance with the movement of the face of said user detected by said movement detection portion.

Further, preferably, an image display device comprises an information recording portion that records information relating to said user; and a control portion which reads out the information relating to said user recorded in said information recording portion and, based on the information, controls said display portion and said face contact portion.

An image display system of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user; a chair portion on which said user can sit and of which backrest portion is reclinable; a supporting portion which is united with said chair portion and which supports said display portion at its portion that is not in contact with said user; and a face contact portion which is supported by said display portion and comes into contact with the face of said user, wherein said supporting portion is movable so that said display portion follows the head of said user in accordance with the inclination of the backrest portion of said chair portion.

Further, preferably, said face contact portion is provided in contact with the face sides of said user and sandwiches the face of said user, and said display portion is movable in accordance with the movement of the head of said user, a portion of said face contact portion being a point of support.

Further, preferably, said supporting portion comprises a balance portion that cancels the moment of said display portion relative to said supporting portion.

Further, preferably, said supporting portion comprises a string-like flexible member that connects said display portion and said balance portion and a friction relaxing mechanism that relaxes the friction occurring to said flexible member.

Further, preferably, said supporting portion comprises a stainless-steel fiber as said string-like flexible member.

Further, preferably, said supporting portion comprises a para-type aramid fiber as said string-like flexible member.

Further, preferably, said supporting portion comprises a drop prevention mechanism that prevents said display portion from dropping when said flexible member breaks.

Further, preferably, said supporting portion comprises a cover that covers the surface of the supporting portion.

Further, preferably, an image display system comprises a hardwiring for connecting said display portion to the outside in the inside of said supporting portion, said hardwiring being provided along said string-like flexible member, a portion of said display portion fixed to a portion of said balance portion.

Further, preferably, said supporting portion comprises a weight in said balance portion, said supporting portion comprises a supporting column, wherein said supporting column supports said display portion and said weight by suspending them in a manner of a balance, and when assuming that the weight of said display portion is M, that the weight of said weight is m, that the distance between said display portion and a fulcrum is L, and that the distance between said weight and said fulcrum is 1, said supporting column holds said fulcrum at a position where $M \cdot L = m \cdot 1$ is satisfied.

Further, preferably, said supporting portion is disposed adjacent to said backrest portion of said chair portion, and said chair portion comprises a parallel link member which keeps the inclination of said supporting portion relative to the ground in the vertical direction, when said backrest portion inclines.

Further, preferably, when said user detaches said display portion from the face, said supporting portion evacuates said display portion out of the region defined by the are drawn by said head at its center being the hips of said user.

Further, preferably, said supporting portion is expandable and contractible.

Further, preferably, an image display system further comprises a setting condition detection portion that detects the setting condition; and a supporting portion control portion that suppresses the expansion and contraction changes of said supporting portion when said setting condition detection portion detects that the setting condition has significantly deteriorated.

Further, preferably, an image display system further comprises an adjustment portion which is provided on a portion of said supporting portion and which adjusts at least either the setting angle of said supporting portion relative to a floor portion or the setting angle of said display portion relative to said floor portion.

Further, preferably, said supporting portion comprises a vertical balance portion having a weight.

Further, preferably, said display portion can change the content of the center region in the projection area and the content of the peripheral region in the projection area when said display portion displays said image, and said display portion performs either a first display in which said image is projected with a high-definition in said center region and said image is projected with a low-definition in said peripheral region or a second display in which the entirety of said image is projected with a high-definition in said center region and an image different from said image is projected with a low-definition in said peripheral region.

Further, preferably, when said display portion performs said second display, said display portion displays an image different from said image in the portion of said photoelectric device corresponding to said peripheral region.

Further, preferably, when said display portion performs said second display, said display portion displays an image having predetermined patterns of which sizes become smaller as they near said center region in the portion of said photoelectric device-corresponding to said peripheral region.

Further, preferably, when said display portion performs said second display, said display portion displays, in the portion of said photoelectric device corresponding to said center region, an image having in at least a portion of the periphery of the portion of said photoelectric device corresponding to said center region said predetermined patterns that are similar to and smaller than said predetermined patterns.

Further, preferably, when said display portion performs said second display, said display portion projects said image in a defocused condition in said peripheral region.

Further, preferably, said face contact portion comprises a movement detection portion that detects the movement of the face of said user, and said display portion shifts the display region of the image to be displayed on said photoelectric device in the portion of said photoelectric device corresponding to said center region, in accordance with the movement of the face of said user detected by said movement detection portion.

Further, preferably, when said display portion performs said second display, said display portion displays information relating to the operation by said user as an image different from said image in the portion of said photoelectric device corresponding to said peripheral region.

Further, preferably, said face contact portion comprises a movement detection portion that detects the movement of the face of said user, and said display portion shifts either the display region of the image to be displayed on said photoelectric device in the portion of said photoelectric device corresponding to said center region or the display region where the information relating to the operation by said user is displayed, in accordance with the movement of the face of said user detected by said movement detection portion.

Further, preferably, an image display system comprises an information recording portion that records information relating to said user; and a control portion which reads out the information relating to said user recorded in said information recording portion and, based on the information, controls said display portion and said face contact portion.

Further, preferably, an image display system further comprises a sound output portion which is disposed in the backrest portion of said chair portion and outputs sound information to said user; and a vibration portion which is disposed in said chair portion and vibrates in concert with at least one of said image and said sound information.

An image display device of another mode of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user; a supporting portion supporting said display portion at its portion that is not in contact with said user and having a balance portion that cancels the moment of said display portion relative to said supporting portion; a face contact portion supported by said display portion and coming into contact with the face of said user; and a hardwiring for connecting said display portion to the outside, said hardwiring being provided along the inside of said supporting portion, a portion of said display portion fixed to a portion of said balance portion.

Further, preferably, said face contact portion is provided in contact with the face sides of said user and sandwiches the face of said user, and said display portion is movable in accordance with the movement of the head of said user, a portion of said face contact portion being a point of support.

An image display device of another mode of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user; a supporting portion that supports said display portion at its portion that is not in contact with said user; and a face contact portion that is supported by said display portion and comes into contact with the face of said user, wherein said supporting portion is expandable and contractible.

Further, preferably, an image display device further comprises a setting condition detection portion that detects the setting condition: and a supporting portion control portion that suppresses the expansion and contraction changes of said supporting portion when said setting condition detection portion detects that the setting condition has significantly deteriorated.

Further, preferably, said face contact portion is provided in contact with the face sides of said user and sandwiches the face of said user, and said display portion is movable in accordance with the movement of the head of said user, a portion of said face contact portion being a point of support.

An image display device of another mode of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user; a supporting portion that supports said display portion at its portion that is not in contact with said user; a face contact portion that is supported by said display portion and comes into contact with the face of said user; and an adjustment portion which is provided on a portion of said supporting portion and which adjusts at least either the setting angle of said supporting portion relative to a floor portion or the setting angle of said display portion relative to said floor portion.

Further, preferably, said supporting portion comprises a vertical balance portion having a weight.

Further, preferably, said face contact portion is provided in contact with the face sides of said user and sandwiches the face of said user, and said display portion is movable in accordance with the movement of the head of said user, a portion of said face contact portion being a point of support.

An image display device of another mode of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user; a supporting portion that supports said display portion at its portion that is not in contact with said user; and a face contact portion that is supported by said display portion and comes into contact with the face of said user, wherein said display portion can change the content of the center region in the projection area and the content of the peripheral region in the projection area when said display portion displays said image, and wherein said display portion performs either a first display in which said image is projected with a high-definition in said center region and said image is projected with a low-definition in said peripheral region or a second display in which the entirety of said image is projected with a high-definition in said center region and an image different from said image is projected with a low-definition in said peripheral region.

Further, preferably, when said display portion performs said second display, said display portion displays an image different from said image in the portion of said photoelectric device corresponding to said peripheral region.

Further, preferably, when said display portion performs said second display, said display portion displays an image having predetermined patterns of which sizes become smaller as they near said center region in the portion of said photoelectric device corresponding to said peripheral region.

Further, preferably, when said display portion performs said second display, said display portion displays, in the portion of said photoelectric device corresponding to said center region, an image having in at least a portion of the periphery of the portion of said photoelectric device corresponding to said center region said predetermined patterns that are similar to and smaller than said predetermined patterns.

Further, preferably, when said display portion performs said second display, said display portion projects said image in a defocused condition in said peripheral region.

Further, preferably, said face contact portion comprises a movement detection portion that detects the movement of the face of said user, and said display portion shifts the display region of the image to be displayed on said photoelectric device in the portion of said photoelectric device corresponding to said center region, in accordance with the movement of the face of said user detected by said movement detection portion.

Further, preferably, when said display portion performs said second display, said display portion displays information relating to the operation by said user as an image different from said image in the portion of said photoelectric device corresponding to said peripheral region.

Further, preferably, said face contact portion comprises a movement detection portion that detects the movement of the face of said user, and said display portion shifts either the display region of the image to be displayed on said photoelectric device in the portion of said photoelectric device corresponding to said center region or the display region where the information relating to the operation by said user is displayed, in accordance with the movement of the face of said user detected by said movement detection portion.

Further, preferably, said face contact portion is provided in contact with the face sides of said user and sandwiches the face of said user, and said display portion is movable in accordance with the movement of the head of said user, a portion of said face contact portion being a point of support.

An image display device of another mode of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user; a face contact portion that is supported by said display portion and comes into contact with the face of said user; an information recording portion that records information relating to said user; and a control portion which reads out the information relating to said user recorded in said information recording portion and, based on the information, controls said display portion and said face contact portion.

Further, preferably, said face contact portion is provided in contact with the face sides of said user and sandwiches the face of said user, and said display portion is movable in accordance with the movement of the head of said user, a portion of said face contact portion being a point of support.

An image display system of another mode of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user; a chair portion on which said user can sit and of which backrest portion is reclinable; a supporting portion which is united with said chair portion and which supports said display portion at its portion that is not in contact with said user; a face contact portion which is supported by said display portion and comes into contact with the face of said user; a sound output portion which is disposed in the backrest portion of said chair portion and outputs sound information to said user; and a vibration portion which is disposed in said chair portion and vibrates in concert with at least one of said image and said sound information, wherein said supporting portion is movable so that said display portion follows the head of said user in accordance with the inclination of the backrest portion of said chair portion.

Further, preferably, said face contact portion is provided in contact with the face sides of said user and sandwiches the face of said user, and said display portion is movable in accordance with the movement of the head of said user, a portion of said face contact portion being a point of support.

An image display device of another mode of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user, a sound output portion, a communication portion that inputs image information from the outside into said display portion and inputs sound information into said sound output portion, a supporting portion which supports said display portion at its portion that is not in contact with said user, and a face contact portion which is supported by said display portion and comes into contact with the face of said user, wherein said communication portion has, when at least two sets of said image display devices are set in the vicinity of each other and are used, a switching mechanism of infrared lights having slightly different wavelengths.

Further, preferably, said face contact portion is provided in contact with the face sides of said user and sandwiches the face of said user, and said display portion is movable in accordance with the movement of the head of said user, a portion of said face contact portion being a point of support.

An image display device of another mode of the present invention comprising:

a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user, a sound output portion that outputs sound to the both ears of said user, a voice input portion to which the voice of said user is inputted, a supporting portion which supports said display portion at its portion that is not in contact with said user, and a face contact portion which is supported by said display portion and comes into contact with the face of said user, wherein said image display device being characterized in that it is provided, when at least two sets of said image display devices are set in the vicinity of each other and are used, with a switching portion that switches what kind of sound information is outputted from said sound output portion and with a switching portion that switches to which image display device is inputted voice information from said voice input portion.

Further, preferably, said face contact portion is provided in contact with the face sides of said user and sandwiches the face of said user, and said display portion is movable in accordance with the movement of the head of said user, a portion of said face contact portion being a point of support.

An image display device of another mode of the present invention comprises a display portion that projects, via eyepiece optical systems which respectively correspond to each of the both eyes of a user, a light emitted from a two-dimensionally light emitting type photoelectric device which is perpendicular to the light beam emitting direction onto the eyeballs of said user, a sound output portion that outputs sound to the both ears of said user, a supporting portion which supports said display portion at its portion that is not in contact with said user, a face contact portion which is supported by said display portion and comes into contact with the face of said user, and a switching portion that switches whether sound information from the outside is outputted by said sound output portion.

Further, preferably, said face contact portion is provided in contact with the face sides of said user and sandwiches the face of said user, and said display portion is movable in accordance with the movement of the head of said user, a portion of said face contact portion being a point of support.

Effect of the Invention

In accordance with the present invention, there can be provided an image display device through which images with high image quality and high field angle are, in a space-saving manner, safely provided to the user, and, at the time, with the personal image display devices' disadvantages being saved, even multiple persons can enjoy the images.

BRIEF DESCRIPTION OF THE DRAWINGS

[FIG. 2] Top views showing the manner in which the face comes to be sandwiched by face sandwiching portions 5.

[FIG. 3] Top views showing the condition in which with face sandwiching portions 5 being shortened, the face and face fixing portion 6 are in contact with each,

[FIG. 4] Drawings showing the relationship between face fixing portion 6 and eyeglasses and schematic drawings showing the states in which the eye relief is varied depending upon the existence and nonexistence of the eyeglasses.

[FIG. 5] Top views showing the condition in which with the elastic members of face sandwiching portions 5 being elastically deformed, the face is detached from face fixing portion 6.

[FIG. 6] Drawings illustrating the eye relief and the movement of the face.

[FIG. 7] Drawings illustrating in detail the telescopic mechanism of face sandwiching portions 5 and the configuration of sandwiching portions around the ears.

[FIG. 9] An optical drawing of a relay magnification optical system.

[FIG. 11] Optical path drawing (a) using eyepiece optical system 31 of a first method and the field of view drawing (b) showing the observable field of view.

[FIG. 20] Optical path drawing (a) when the eye relief is 10 mm and optical path drawing (b) when the eye relief is 30 mm, in the case of eyepiece optical system 31 of the third method.

[FIG. 24] Drawings for illustrating supporting portion 54.

[FIG. 34] A drawing illustrating the inclination of the ground.

[FIG. 36] A correspondence table of the number of pixels vs. the field of view angle, with respect to the image of the center region.

[FIG. 38] Drawings illustrating the images displayed by image display device 190 in the sixth embodiment.

BEST MODE FOR CARRYING OUT THE INVENTION

Figure 1:
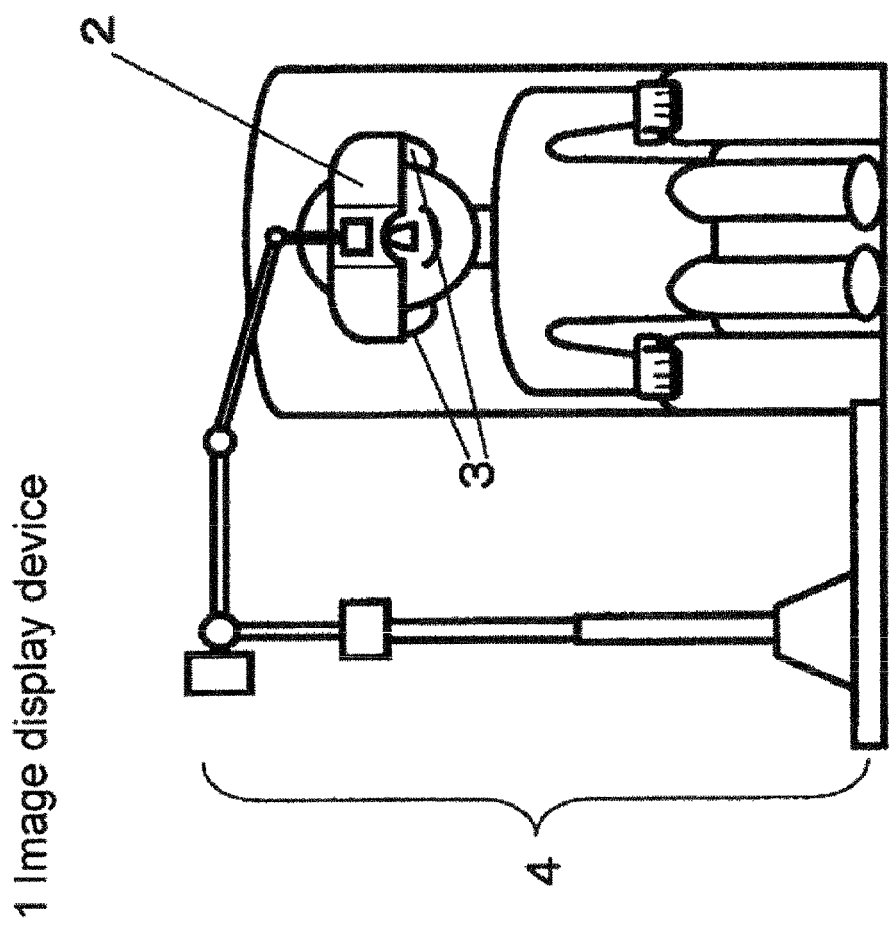
[FIG. 1] A sketch drawing of image display device 1 of a first embodiment.

In the following, embodiments of the present invention will be described, referring to the drawings.

<First Embodiment>

As shown in FIG. 1, image display device 1 of a first embodiment is provided with image display portion 2, sound output portions 3, and supporting portion 4. Image display portion 2 projects, via eyepiece optical systems which respectively correspond to each of the both eyes of a user (which will be detailed later), a light emitted from a two-dimensionally light emitting type photoelectric device, not shown, which is perpendicular to the light beam emitting direction onto the eyeballs of the user. Further, sound output portions 3 are disposed by elastic members, which will be described later, so as to sandwich the both ears of the user to output sound. Further, as shown in FIG. 1, supporting portion 4 supports image display portion 2 at its portion that is not in contact with the user.

First, a face sandwiching mechanism supported by image display portion 2 will be described. As shown in FIGS. 2(a) and 2(b), image display portion 2 supports face sandwiching portions 5. FIG. 2(a) shows the condition before the face of the user is sandwiched by face sandwiching portions 5; FIG. 2(b) shows the condition after the face of the user is sandwiched by face sandwiching portions 5.

Further, as shown in FIGS. 2(a) and 2(b), image display portion 2 is provided with face fixing portion 6 and outside-light-shielding plates 7, and head portion lateral width changing frames 8 are rotationally movably attached by head portion lateral width changing mechanisms 9 to the ends of face sandwiching portions 5. Further, to the ends of head portion lateral width changing frames 8 are provided rotation shafts 11 for sound output portions 3, and to outside sound output portions 3 are provided ear region contact portions 12. In the following, description will be made with respect to the left side portion. The same description applies to the right side portion.

With face width changing mechanism 9 being moved in the direction of arrow A, head portion lateral width changing frames 8 nears ear 10. And, sound output portion 3, with its rotation center being rotation shaft 11, comes, parallel to ear 10, into contact with ear 10; ear region contact portions 12 completely covers ear 10 and, as shown in FIG. 2(b), sandwiches the face. In this regard, elastic member 13 is intermediately disposed at the root portion of face width changing frame 8 and functions as a cushion for not sandwiching ears 10 with an excessive force.

Since face sandwiching portions 5 move left and right symmetrically and sandwich the face, it is adjusted such that each of the centers of the both eyes of the user approximately coincides with the center of the corresponding eyepiece lens. Further, face width changing mechanism 9 is provided with a stopper mechanism, not shown, through which it is configured such that with the knob portion of the face width changing mechanism being held, the knob portion can be freely moved and such that the knob portion being got off, the knob portion cannot be moved; and thus, it is configured such that when the knob portion is got off in cases where the sandwiching pressure becomes appropriate, the stopper mechanism works, and the face sandwiching width of face sandwiching portions 5 is fixed.

FIGS. 3(a) and 3(b) are drawings for illustrating the changing of the distance between the eyepiece optical systems, not shown, of image display portion 2 and the eyes of the user (hereinafter, referred to as "eye relief"). Note that with respect to the portions similar to those in FIGS. 2(a) and 2(b), their reference numerals/letters and descriptions will be omitted.

As shown in FIGS. 3(a) and 3(b), image display portion 2 is provided with eye relief changing mechanisms 14. By moving eye relief changing mechanisms 14 in the direction of arrow B, the eye relief can be shortened. FIG. 3(a) shows the state before the eye relief is shortened; FIG. 3(b) shows the state in which with the eye relief being shortened, the face of the user has come into contact with face fixing portion 6.

By the way, regarding image display device 1 of this embodiment, the weight of image display portion 2 is supported by the outside supporting portion 4, and thus, the weight is not required to be held by the face or the head as is done in the case of an eyeglass type display or a head mount type display. Generally, in the case of an eyeglass type display, the weight holding and the eye relief fixing are performed in a lump; in the case of a head mount type display, the display is fixed by the head, and the eye relief is determined by the design of the fixing portion.

In contrast, in image display device 1 of the embodiment, while the position of image display portion 2 is determined, with the face being sandwiched, depending upon the position of ear 10, the weight of image display portion 2 is not required to be held. Thus, a new feature is created that so long as the positional relationship between ear 10 and ear frame fixing portion 12 is fixed, the eye relief can be set to be a desired distance by shortening or elongating face sandwiching portions 5. For that purpose, it is preferable that the attaching of image display portion 2 to the face is performed in the sequence that the face sandwiching operation is performed first to determine the positional relationship between ear 10 and ear frame fixing portion 12, and the eye relief is determined next.

In FIG. 4 are drawings illustrating face fixing portion 6 that can address both of a user wearing eyeglasses and a user not wearing eyeglasses. FIG. 4(a) is an elevation view showing the relationship when the face of a user wearing eyeglasses is in contact with face fixing portion 6; the circle denoted by 15 represents eyepiece lens 15 which is located nearest to the eye of the user. FIG. 4(b) is a side view at that time; FIG. 4(c) is a side view in which to illustrate the change of the thickness of face fixing portion 6 in accordance with the eye relief, illustration of outside-light-shielding plates 7 is omitted.

As shown in FIG. 4(a), irrespective of the existence or nonexistence of eyeglasses, face fixing portions 6 are disposed in a manner that they, evading eyeglass frame portion 16, are disposed outside and above and below eyepiece lenses 15. Further, in the right-and-left outsides of the eyeglass frame ends are disposed outside-light-shielding plates 7 that shield light from the outside, and it is configured, as shown in FIG. 4(b), such that with the field of vision angle of the user being assumed to be 180 degrees, those plates cover the face so that outside light does not enter the eyes from the outside of the image display region. Further, at the positions of face fixing portions 6 corresponding to eyeglass frame end portions are located protruded portions 17 for recognizing whether there exist eyeglasses; when protruded portions 17 are pushed by the eyeglass frame end portions, stoppers 18 work, as shown in FIG. 4(c), and block face fixing portion 6 from contracting relative to eyepiece lens frame 19. As shown in FIG. 4(c), face fixing portion 6 is originally designed to correspond to a length of about 20 mm; when assuming that the eye relief between the eyeglasses and the position of the eyeball of the user is 15 mm, the eyeglasses and eyepiece lens 15 do not come into contact with each other at the time when face fixing portion 6 comes into contact with the skin on the bone around the eye, even if the eyeglass has a thickness of from 2 to 3 mm. In other words, the user can appreciate images in a state of wearing glasses and with an eye relief of 20 mm.

On the other hand, FIG. 4(d) is a drawing showing the case where a user not wearing eyeglasses uses the image display device; in this case, since there exist no eyeglass end portions, protruded portions 17 are never pushed. Thus, stoppers 18 do not work, and block face fixing portion supporting mechanism 20 is extended and contracted, starting from the time when face fixing portion 6 comes into contact with the skin on the bone around the eye, until the eye relief becomes near 10 mm. As a result thereof, face fixing portion 6 comes to have a length of 10 mm, and the user can appreciate images with an eye relief of 10 mm. In this way, the user wearing eyeglasses can appreciate images with an eye relief of 20 mm, and the user not wearing eyeglasses can appreciate images in an optimal condition of an eye relief of 10 mm.

Next, FIGS. 5(a) and 5(b) show the condition in which by elastically deforming elastic members 13 of face sandwiching portions 5, the user's face is detached from face fixing portion 6. FIG. 5(a) shows the condition in which the user is enjoying the images of image display portion 2 by means of the above-described method. In this condition, image display portion 2 and the face are positioned by face sandwiching portions 5 in an optimal condition, and the user is enjoying the images in a comfortable condition. However, among image information, there are images that cause VE sickness because they have an excessively high sense of reality; further, eyestrain occurs when the user continues to appreciate images for a long time. Still further, there may occur situations in which the user has to look at the outside in accordance with information inputted from the outside. In connection with such cases, it takes a considerable time to perform position adjustment by using the above-described method, and it also a lot of trouble to perform re-adjustment. Here, to address those problems, with neither face width changing mechanisms 9 nor eye relief changing mechanism 14 being used, the face is detached from image display portion 2 by directly holding with both hands ear frame fixing portions 12 and by elastically deforming elastic members 13, as shown in FIG. 5(b). Of course, elastic members 13 are constituted by a mechanism which uses leaf springs or springs that are designed not to exceed their elastic limit and allows ear frame fixing portions 12 to be detached from the face; and thus, by making face fixing portion 6 come into contact with the face and by aligning ear frame fixing portions 12 with ears 10 to return to the original condition, the previous condition can be re-created.

FIG. 6(a) is a drawing viewing the state of FIG. 3(b) from the side; FIG. 6(b) is a drawing viewing from the side the state in which the face is inclined downwardly in the state of shown in FIG. 3(b). In the case of FIG. 6(a), the user's face is completely fixed by ear frame fixing portions 12 of face sandwiching portions 5 and by face fixing portion 6; thus, when, for example, the face is inclined downwardly as shown in FIG. 6(b), image display portion 2 also, following the face, moves downwardly while rotating. In this condition, the user is appreciating images with an eye relief of, e.g., 10 mm in the case of not wearing eyeglasses, and the image is displayed in the direction to which the face moves.

In contrast, in FIG. 6(c), face sandwiching portions 5 are elongated, and FIG. 6(c) shows the state of FIG. 3(a) as viewed from the side. Thus, face fixing portion 6 and the face are completely detached from each other. In this condition, while the face is constrained by ear frame fixing portions 12 of face sandwiching portions 5 with respect to almost every direction, the face has a freedom only with respect to around the axis passing through the both ears; thus, by, as shown in FIG. 6(d), inclining the face downwardly (rotating it around the axis passing through the both ears) or by, with the face being fixed, upwardly moving image display portion 2 (rotating it around the axis passing through the both ears to lift it), the user can direct the eyes from image display portion 2 to different directions. By this, the user can not only direct the eyes to different directions, but also take a meal or eat between meals with ease because image display portion 2 which was in the vicinity of the mouth, with the face being directed downwardly, also departs from the mouth.

Next, more detailed description will follow, referring to FIGS. 7 and 8. FIG. 7(a) is a drawing showing in detail the sandwiching configuration around ear 10 when face sandwiching portion 5 is shortened; FIG. 7(b) is a drawing showing in detail the sandwiching configuration around ear 10 when face sandwiching portion 5 is elongated. Member 21 is a portion fixed to image display portion 2; member 22 holding portions including sound output portion 3 is translationally movably connected to member 21 by linear guide 23. (Here, since the portion indicated by the wavy lines is the portion where face width changing mechanism 9 exists in relation to ear 10, illustration thereof is omitted.) Since face width changing frame 8 nears ear 10, sound output portion 3, with its rotation center being rotation shaft 11, comes, approximately parallel to ear 10, into contact with ear 10, and the face is sandwiched by ear frame fixing portions 12 so as to completely cover ear 10, ear region contact portion 12 and image display portion 2 can set as desired, the eye relief between the eye and the eyepiece lens through the translational movement executed by linear guide 23.

The shortening and elongating of face sandwiching portions 5 by linear guide 23 is performed by the movement, along hole portion 27 provided in member 21, of pin 26 attached to the end of lever portion 25, with the movement being associated with the rotational movement, in the direction of arrow C, of lever portion 25 which is rotationally movably connected to rotation shaft 26 set on member 22. It is to be noted that it is configured such that a knob portion to be held by hand is provided on the other end of lever portion 25; with this knob portion being held, a stopper is released, and the above-mentioned rotational movement can be performed; and with the knob portion being got off, the stopper works, and a desired eye relief can be obtained. (While an example of telescopic mechanism has been described, various kinds of telescopic methods, e.g., electrically driven means, can of course be also conceived.)

Figure 8A:
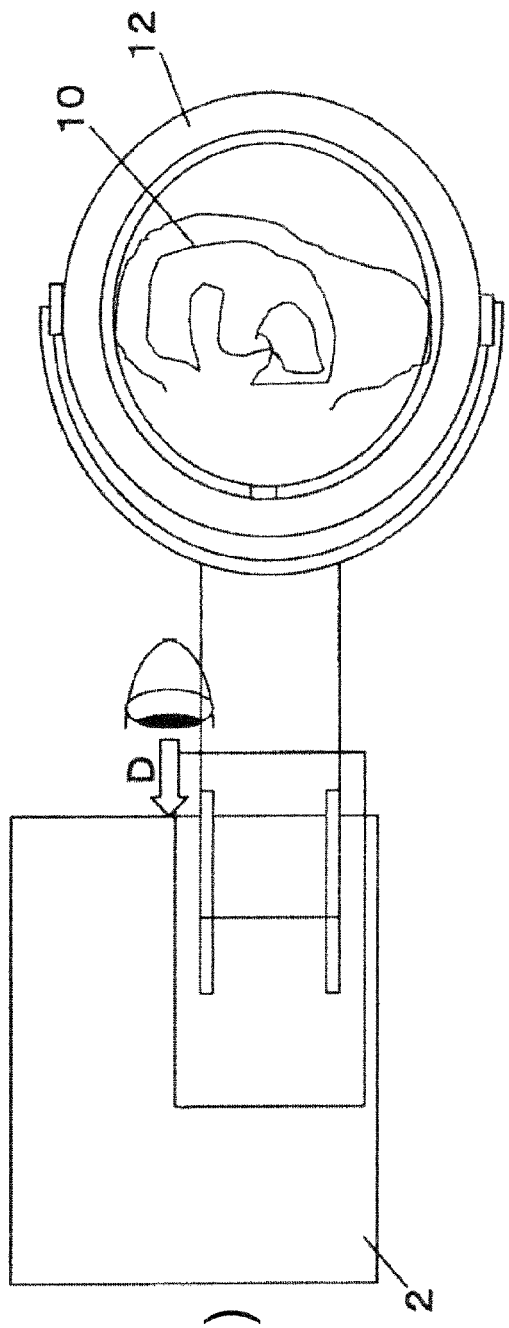
[FIG. 8] Drawings showing that with face sandwiching portions 5 being elongated, the face is detached from face fixing portion 6, and the display portion does not follow the rotation of the face around the axis passing through the both ears and showing the condition in which the ears and the eyes rotate.
Figure 8B:
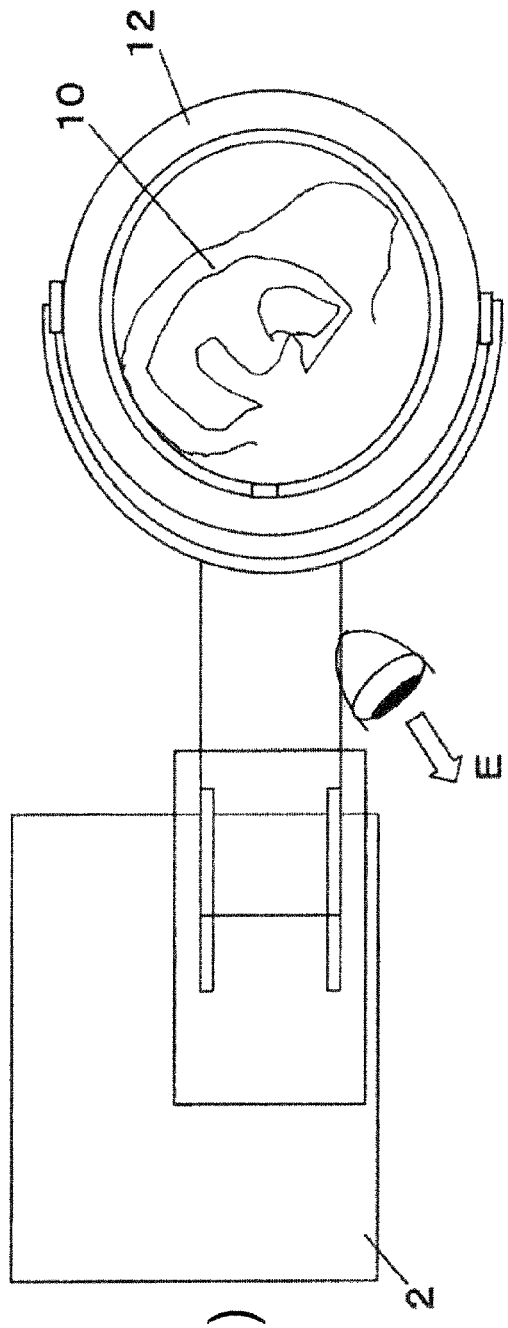

The entirety of those things constitutes eye relief changing mechanism 14, and the user can freely change the eye relief while viewing images. In FIG. 8 are drawings showing the relationship between the eye and image display portion 2 in the case where the eye relief is elongated by eye relief changing mechanism 14. As described above, ear 10 is completely covered by ear frame fixing portion 12. On the other hand, as shown in FIGS. 8(a) and 8(b), face fixing portion 6 and the face are completely separated from each other. Accordingly, in contrast to the case where face fixing portion 6 and the face are in contact with each other, the freedom in the rotation direction around the axis that passes through the both ears and is perpendicular to the plane of the drawing is permitted, as shown by the transition from the state of FIG. 8(a) to that of FIG. 8(b). In other words, the user can, by Inclining the face downwardly, direct the sight line direction to the outside of image display portion 2, as shown by the transition of the eye sight line from the direction indicated by arrow D to that indicated by arrow E. Further, by rotating image display portion 2 around the rotation axis in a state of directing the face straight ahead, an equivalent effect can be obtained. This effectively works for looking at the outside conditions while continuously listening to sound from sound output portions 3, for taking a meal or eating between meals while viewing images, and for relieving eyestrain due to images. Further, since image display portion 2 is supported by supporting portion 4, and only the freedom in the rotation direction around the axis that passes through the both ears and is perpendicular to the plane of the drawing is permitted, the user can immediately appreciate images only by positioning the face in the original position and is freed from the trouble of, e.g., removing image display portion 2 each time or performing the re-adjustment when re-wearing the image display portion, as shown in FIG. 9.

Next, referring to FIG. 9, the inner mechanism of image display portion 2 will be described. 161G, 161B, and 161R are a two-dimensionally light emitting type optical device that emits a green image, a two-dimensionally light emitting type optical device that emits a blue image, and a two-dimensionally light emitting type optical device that emits a red image, respectively; those images are combined by three color multiplexing prism 162. As those two-dimensionally light emitting type optical devices, for example, liquid crystal display devices and organic EL devices using LED light sources can be listed. Image display portion 2 is provided with two sets of the above-mentioned optical devices 161G, 161B, and 161R and three color multiplexing prisms 162.

Further, image display portion 2 has a relay magnification optical system; as shown in FIG. 9, the relay magnification optical system is provided with zoom optical systems 28 and 29 and half prism 30. And, by driving zoom optical systems 28 and 29, the size of images can be changed. Further, the images led by zoom optical systems 28 and 29 are combined by half prism 30, and the combined images are led to eyepiece optical systems, not shown. It should be noted that in combining images, the sizes of the two images may or may not be the same. Further, it may also be configured, for example, such that one of the images is an image corresponding to the center portion, and the other image is an image of the entire portion. Still further, it may also be configured such that by substituting half prism 30 with another optical device, the images led by zoom optical systems 28 and 29 are separately led to each of the right and left eyepiece optical systems.

Figure 10:
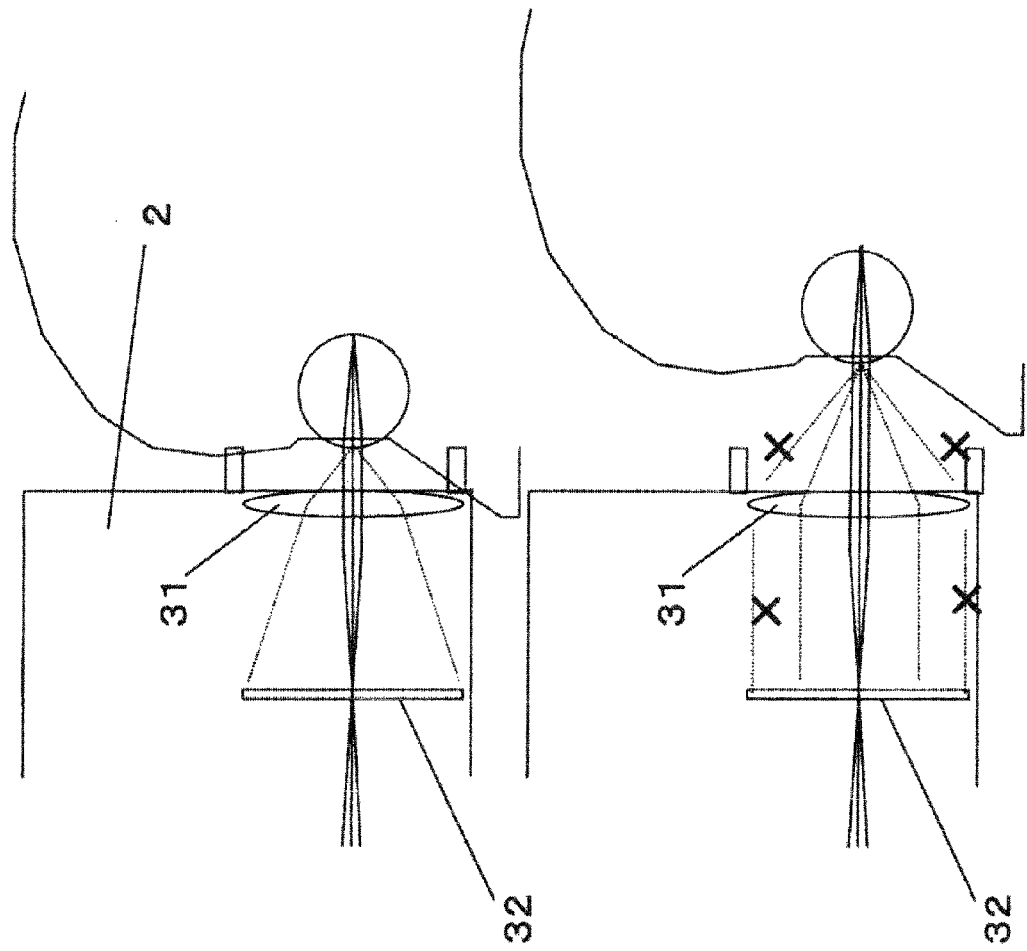
[FIG. 10] Drawings showing that there are two kinds of eye reliefs for image display portion 2 and that under each of the both conditions, the eyeball and the light diffusing plate are conjugate with each other.

The images magnified by the above-mentioned relay magnification optical system are projected on screen 32 shown in FIG. 10. Here, for the image to be viewed with the eye as an image that is as large as possible, eyepiece optical system 31 plays a crucial role. Eyepiece optical system 31 plays a role of keeping screen 32 and the retina in the eyeball in a conjugate positional relationship. As shown in FIGS. 10(*a*) and 10(*b*), in this embodiment, it is configured such that at least two kinds of eye reliefs are provided. In the case where, as shown in FIG. 10(*a*), the eye relief is narrow, the field of view angle relative to the eye can be made a large one; and thus, among the light beams including the transmitted image information emitted from the field angle of the image on screen 32, the number of the light beams that transmit through eyepiece optical system 31 and can pass through the pupil of the eye also become large and can be recognized a large image.

By the way, in connection with FIG. 10, it has been described that the eyepiece optical system plays a role of keeping screen 32 and the retina in the eyeball in a conjugate positional relationship; however, in the case where the light beams proceeding to the pupil are parallel light beams, they constitute an infinite image, and even if the eye relief is made larger than the original one, the image can be still observed, with only the disadvantage that the viewable field of view angle becomes smaller.

Further, when screen 32 and eyepiece optical system 31 are located nearer to each other, a condition in which an object located near is viewed is created. Even if, under this condition, the eye relief is made larger than the original one, the image can be similarly observed because the user's eyes have a focusing function.

On the other hand, in the case where, as shown in FIG. 10(*b*), the eye relief is wide, the field of view angle relative to the eye becomes small; and thus, the transmitted image emitted from the field angle of the image on screen 32 transmits through eyepiece optical system 31, but the number of light beams that can pass through the pupil of the eye within the field of view angle becomes small. As a result, the resultant image is an image smaller than that of FIG. 10(*a*). As just described, to provide at least two kinds of eye reliefs, it is preferable that the characteristic of eyepiece optical system 31 is good at least two distances. Here, in view of the fact that the standard eye relief between eyeglasses and the eye is 15 mm, the eye relief between eyepiece optical system 31 and the eye is set to be 10 mm, in this embodiment which is not used while the user bouncing or exercising hard, but used at a fixed position. Assuming further that the eye relief by which the user's sight line can be directed to the outside of image display portion 2 is 30 mm, the following consideration will be made to show, as an example, that images of ±30 degrees by which a high sense of reality can be obtained are obtained at the position of both eye reliefs.

First, the case where eyepiece optical system 31 is constituted by an ordinary, single convex lens will be considered. From a design viewpoint, in the case of a single convex lens, a field angle of about ±30 degrees can be obtained by making the curvatures thereof large. However, the aberrations in the peripheral area become large, and the distortion also becomes large. When, for example, under this condition, the cases of eye relief distances of 10 mm and 30 mm are considered, a large, spool-shaped distortion of more than two times and of, as to the rate-of-change, more than 15%, compared with the case of the 10 mm eye relief, is present at the longer eye relief side, which makes it difficult to set two kinds of eye reliefs. Since, in the case of a large screen image, generally, the distortion amount which does not trouble the user is thought to be an amount of less than 10%, and the endurable distortion amount is thought to be an amount of less than 15%, it is highly likely that such specification cannot be satisfied by a single convex lens.

For that reason, in the embodiment, as a first method, eyepiece optical system 31 is constituted by at least three pieces of lenses. FIG. 11 includes an optical drawing in which, to obtain a wide field of view angle, the eye relief is set to be 10 mm; using three pieces of convex lenses L1, L2, and L3 with glass material LAC7 having a low refractive index but having a small color dispersion being used, each lens having a curvature of 220 mm and arranged sequentially from the left side of the drawing. While from the viewpoint of aberration, combination of convex lens and concave lens is generally used, concave lenses have a low deflecting effect with respect to peripheral light beams and thus are not appropriate to obtain a wide field of view angle. Thus, here, it is adopted a method in which all of the lenses are intentionally constituted by a convex lens, and by making each curvature small, the aberrations are suppressed.

As shown by the light beams shown in FIG. 11(*a*), field angles of −30 degrees, −15 degrees, 0 degree, +15 degrees, +30 degrees, +45 degrees, and +60 degrees, as considered from the center, are obtained with respect to the left eye, and field angles of −30 degrees, −15 degrees, 0 degree, +15 degrees, +30 degrees, +45 degrees, and +60 degrees, as considered from the center, are obtained with respect to the right eye also; it can be seen that, as shown in FIG. 11(*b*), the field of view angle viewable by the both eyes is ±30 degrees, and as a field of view angle, an image of field of view angle of ±60 degrees is obtained as a whole. However, since, in this case, the lenses in the right and left sides overlap with each other, the overlapping portions are required to be cut.

Figure 12:
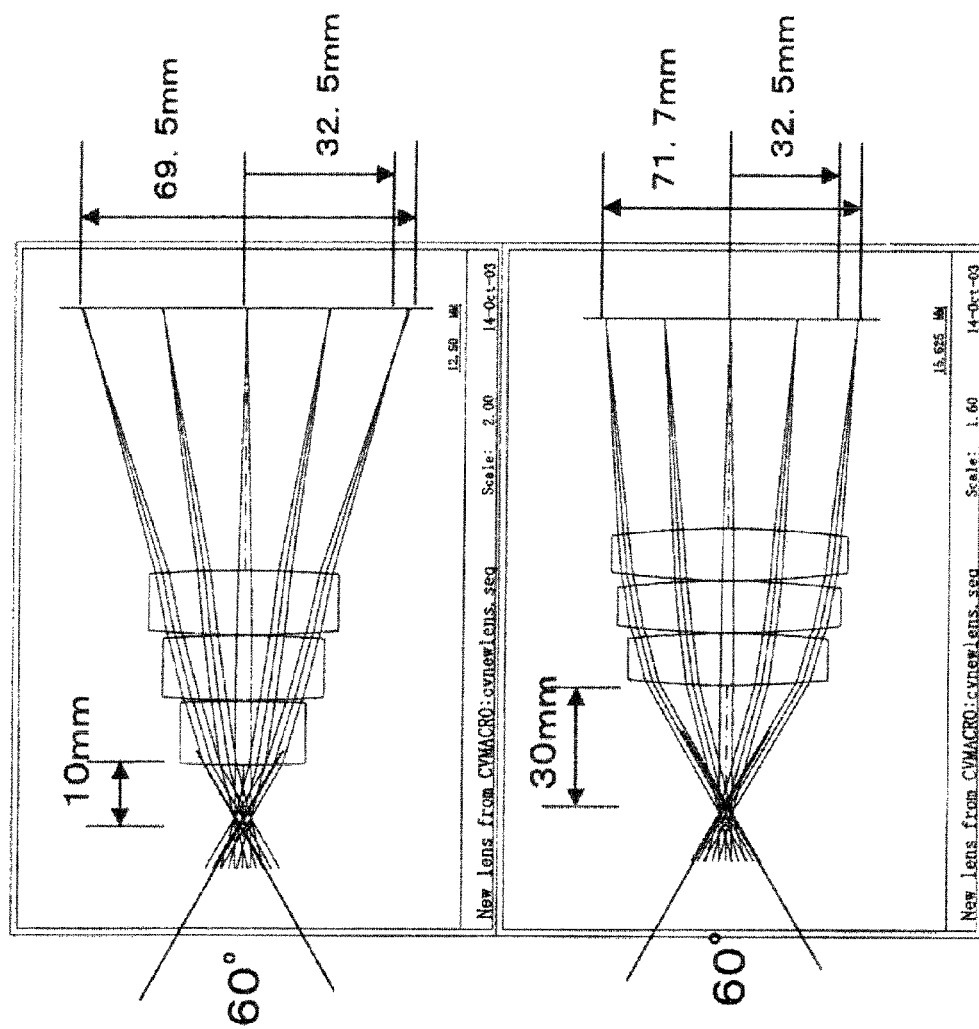
[FIG. 12] Optical path drawing (a) when the eye relief is 10 mm and optical path drawing (b) when the eye relief is 30 mm, in the case of eyepiece optical system 31 of the first method.

FIG. 12(*a*) shows the light beams when the eye relief of this eyepiece optical system 31 is set to be 10 mm; FIG. 12(*b*) shows the light beams when the eye relief of this eyepiece optical system 31 is set to be 30 mm. The field of view angle viewable by the both eyes is about ±25 degrees, which means that a little portion is suppressed: however, it can be seen that images can be appreciated in the both states of eye relief within the above-described field of view angle of ±30 degrees.

Figure 13A:
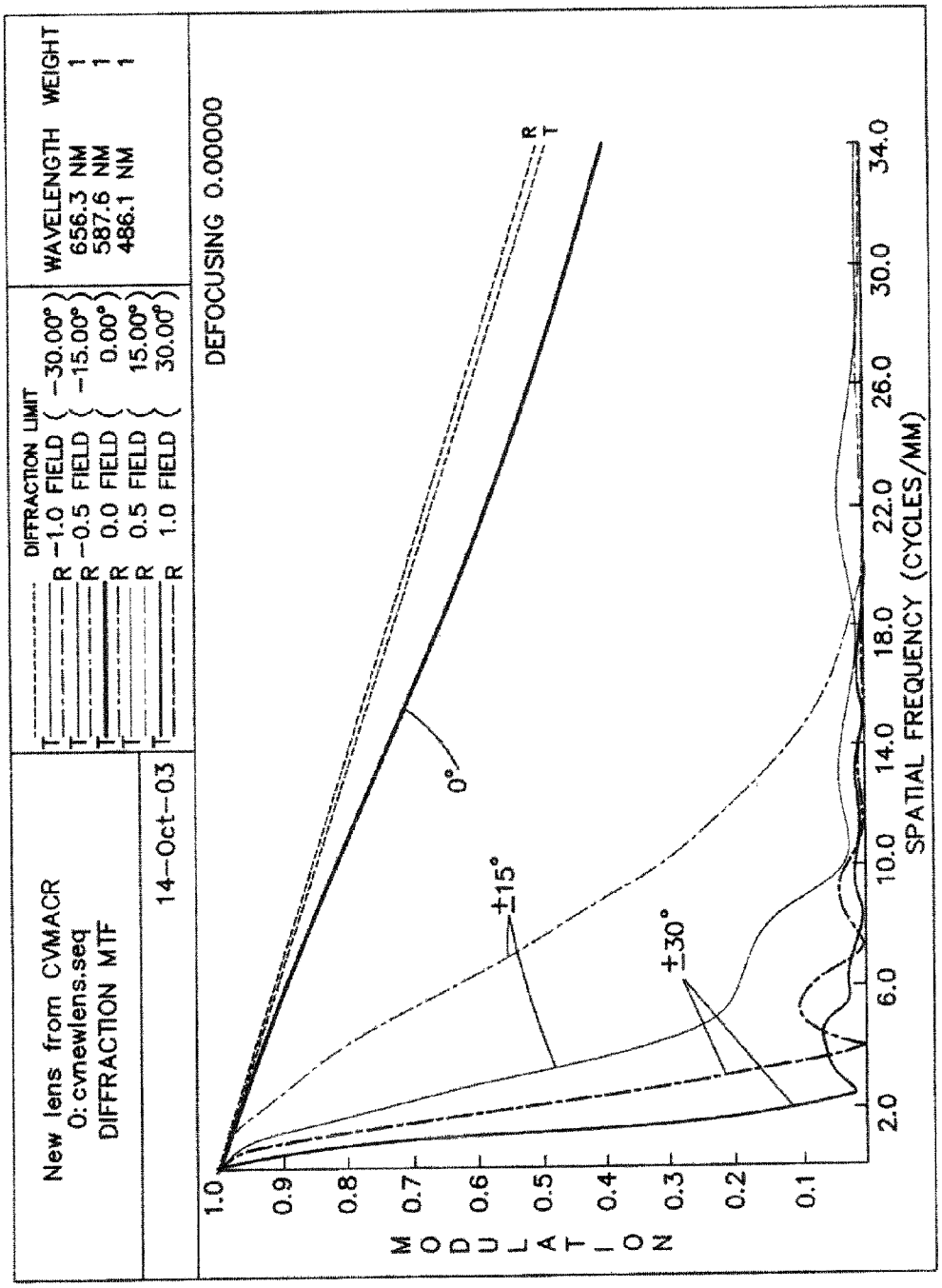
[FIG. 13] MTF output drawing (a) when the eye relief is 10 mm and MTF output drawing (b) when the eye relief is 30 mm, in the case of eyepiece optical system 31 of the first method.

FIG. 13 shows the results of the evaluation of the optical drawing in FIG. 12; FIG 13(*a*) shows an MTF output drawing when the eye relief is 10 mm, and FIG. 13(*b*) shows an MTF output drawing when the eye relief is 30 mm. When eye relief is 10 mm, as shown in FIG. 13(*a*), at the position of field of view angle of ±15 degrees, while depending upon the pattern direction, only about 4 cycles/mm can be resolved at best at an MTF of 30% (0.25 mm L/S being resolvable). Further, also at the position of field of view angle of ±30 degrees, while depending upon the pattern direction, only about 2 cycles/mm can be resolved at best at an MTF of 30% (0.5 mm L/S being resolvable); however, since when ordinary large screen moving images are viewed, the user's sight line is practically directed to the center area having a high resolution, the user does not sense that the images are so bad.

Figure 13B:
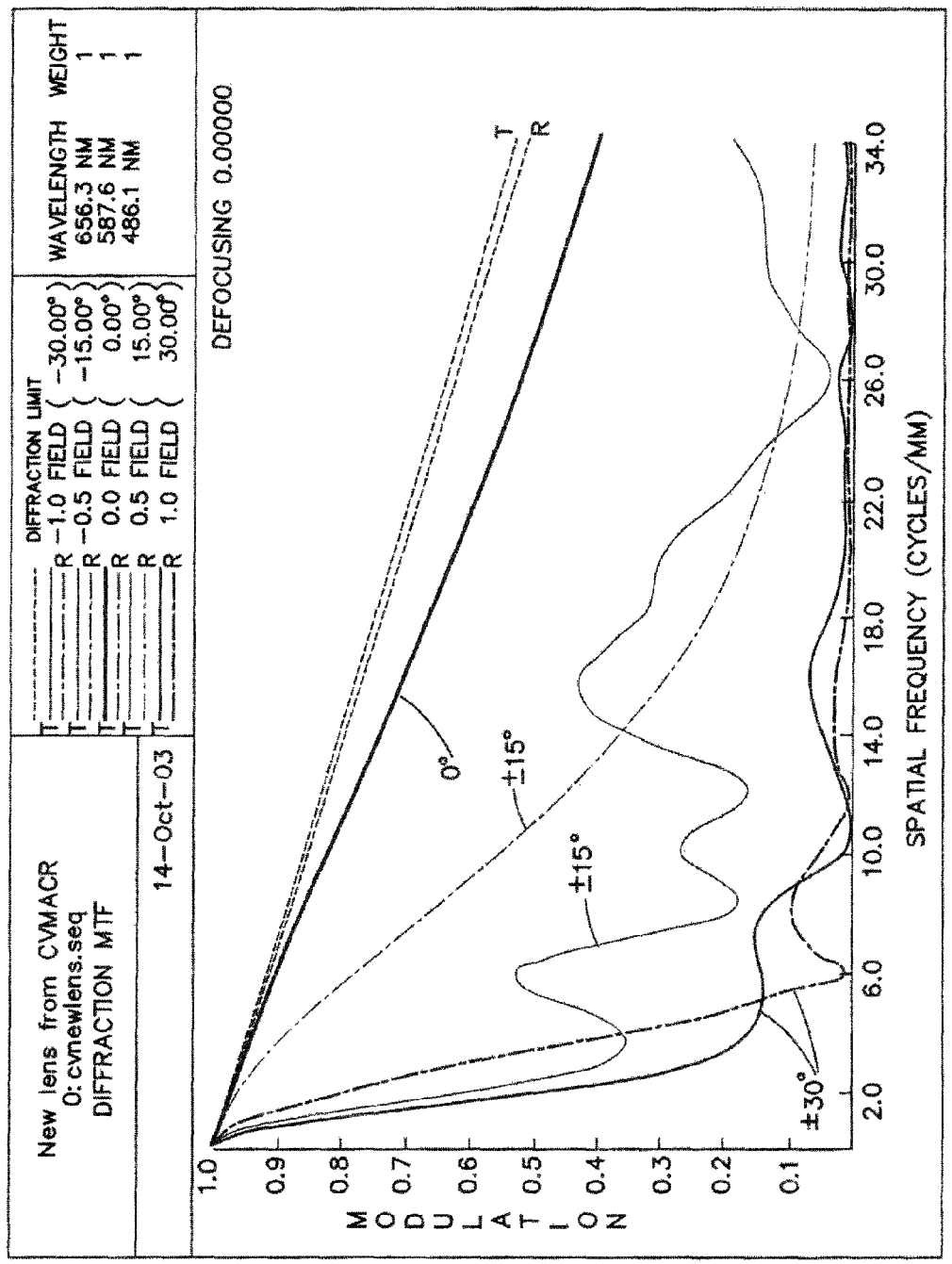

On the other hand, when the eye relief is 30 mm, as shown in FIG. 13(b), at the position of field of view angle of ±15 degrees, while depending upon the pattern direction, only about 3 cycles/mm can be resolved at best at an MTF of 30% (0.3 mm L/S being resolvable). Further, at the position of field of view angle of ±30 degrees, while depending upon the pattern direction, about 2.5 cycles/mm can be resolved at best at an MTF of 30% (0.4 mm L/S being resolvable), which shows that the resolution is improved a little. In this case also, since when ordinary large screen moving images are viewed, the user's sight line is practically directed to the center area having a high resolution, the user does not sense that the images are so bad.

Figure 14:
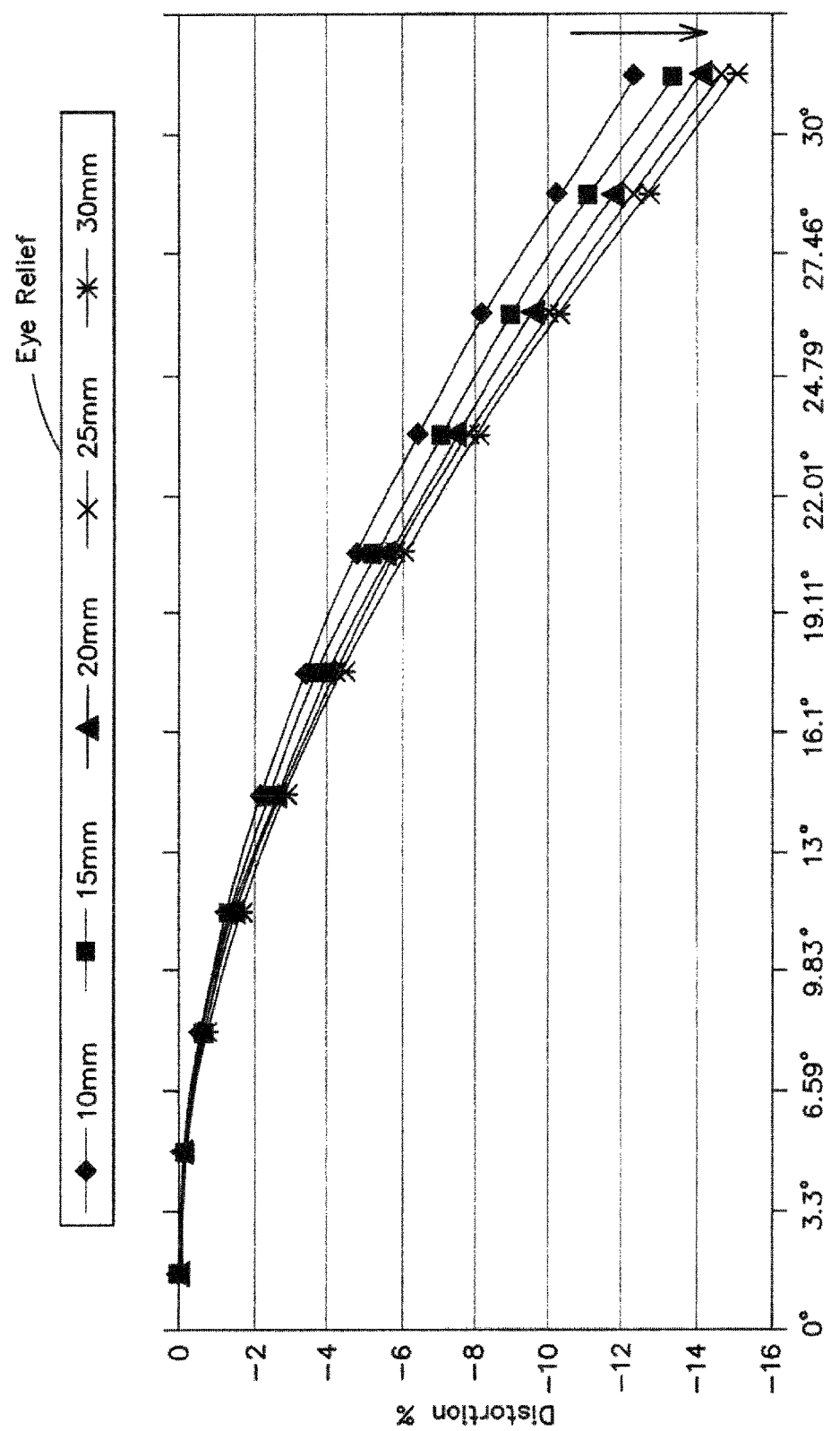
[FIG. 14] A line graph showing the distortion amounts when the eye relief is varied by 5 mm from 10 to 30 mm, in the case of eyepiece optical system 31 of the first method.

FIG. 14 shows further the distortions at each of the eye reliefs and at each of the field of view angles. It can be seen that, as shown in FIG. 14, the above-described endurable amount of less than 15% is satisfied under every condition, as seen still from the graph of eye relief 30 mm. The usage of the embodiment is directed to the cases where image quality does not relatively trouble the user, as in appreciating large screen moving images. Thus, since the eyepiece optical system can be designed to be an inexpensive one, it has an adequate configuration applicable to a system in which an eye relief changing mechanism is incorporated.

However, the above-described eyepiece optical system becomes unsatisfactory for the case where the images are required to have a high resolution as in the case of a computer display. Since there are a lot of fine black and white patterns or rich and colorful patterns in a computer display, design that sufficiently takes care of the largeness of aberrations, in particular, of chromatic aberration is required. For that reason, in the embodiment, as a second method, eyepiece optical system 31 is constituted by at least three pieces of lenses, and, at the time, to maintain a large screen image and to perform chromatic aberration correction, the lens located most distant from the eye is constituted by a cemented lens made by combining a convex lens and a concave lens.

Figure 15:
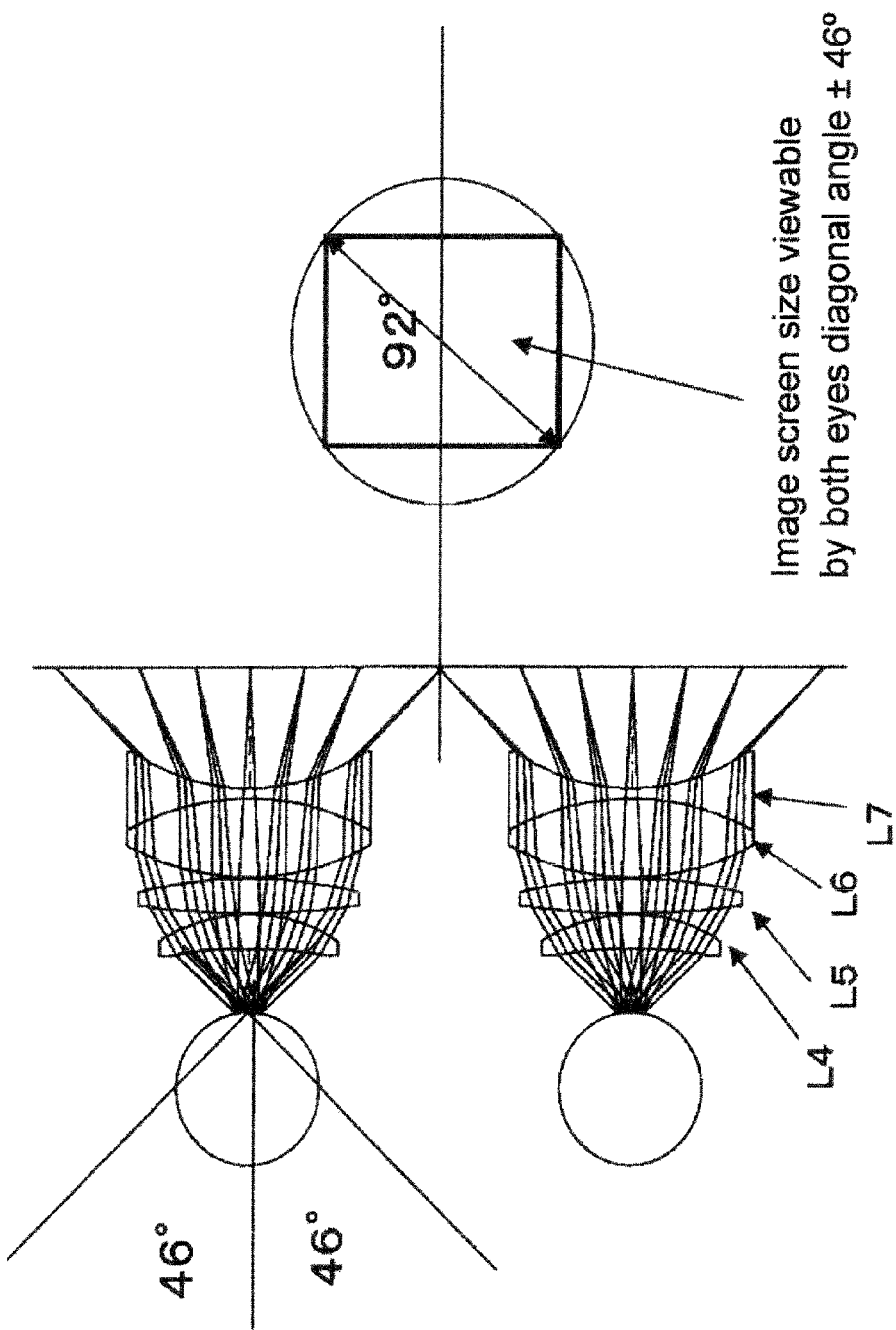
[FIG. 15] Optical path drawing (a) using eyepiece optical system 31 of a second method and the field of view drawing (b) showing the observable field of view.

FIG. 15(a) is an optical drawing in which the material for lenses L4 and L5 are made NLAK8, the material for lens L6 is made NBAK4, and the material for lens L7 is made SF10, those lenses are, sequentially from the left side of the drawing, arranged in this order, and the approximate curvatures of lens L4, lens L5, lens L6, and lens L7 are (−65 mm, −25 mm), (125 mm, −70 mm), (40 mm), and (−40 mm, 30 mm), respectively.

As shown by the light beams shown in FIG. 15(a), when the eye relief is set to be 10 mm, field angles of −46 degrees, −30 degrees, −15 degrees, 0 degree, 15 degrees, 30 degrees, and 46 degrees, as considered from the center, are obtained with respect to the left eye, and field angles of −46 degrees, −30 degrees, −15 degrees, 0 degree, 15 degrees, 30 degrees, and 46 degrees, as considered from the center, are obtained with respect to the right eye also. It can also be seen from FIG. 15(b) that with a concave lens being used, the field of view angle viewable by the both eyes is ±46 degrees, but, as a field of view angle, only an image of field of view angle of ±46 degrees is similarly obtained. However, since, in this case, the lens diameters are small, there is the advantage that for example, eye-width adjustment can be done relatively easily.

FIG. 16(a) shows the light beams when the eye relief of this eyepiece optical system 31 is set to be 10 mm; FIG. 16(b) shows the light beams when the eye relief of this eyepiece optical system 31 is set to be 30 mm. The field of view angle viewable by the both eyes is about ±30 degrees, and it can be seen that images can be appreciated in the both states of eye relief within that range.

Figure 16:
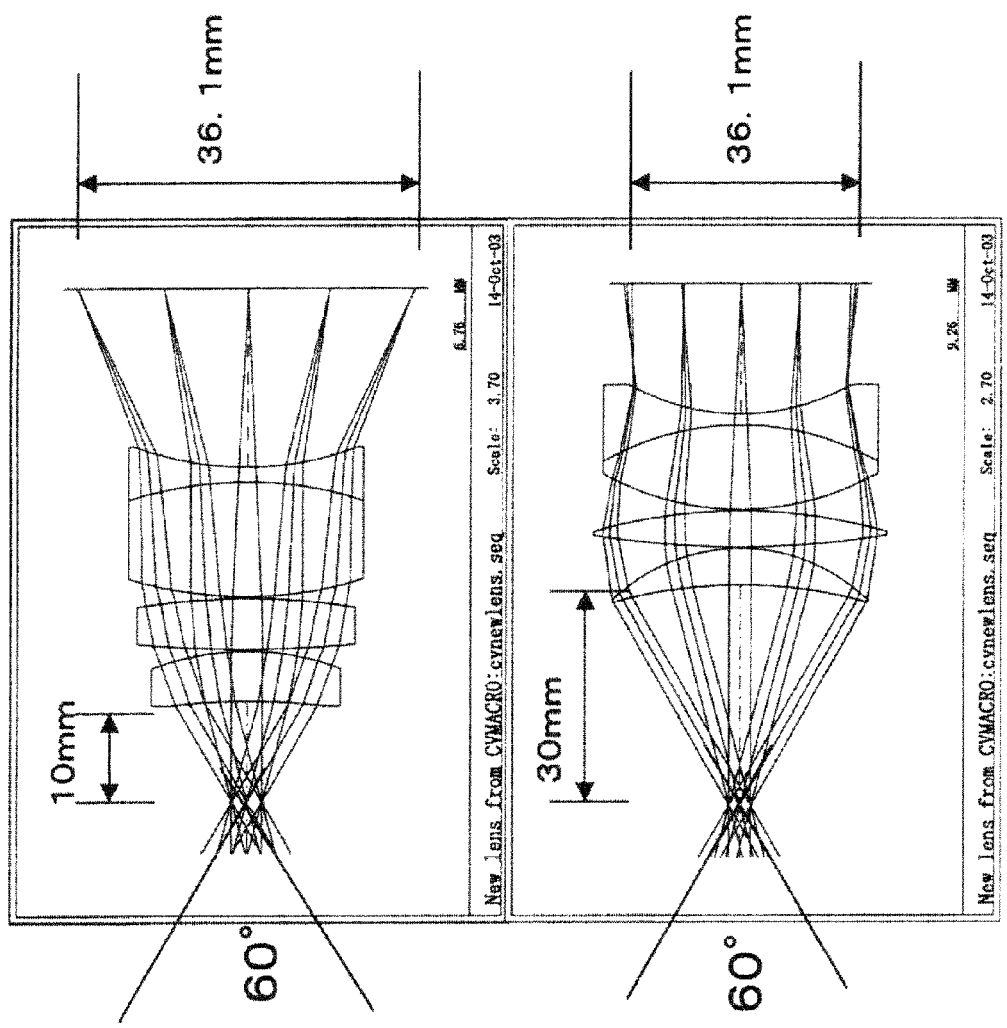
[FIG. 16] Optical path drawing (a) when the eye relief is 10 mm and optical path drawing (b) when the eye relief is 30 mm, in the case of eyepiece optical system 31 of the second method.
Figure 17A:
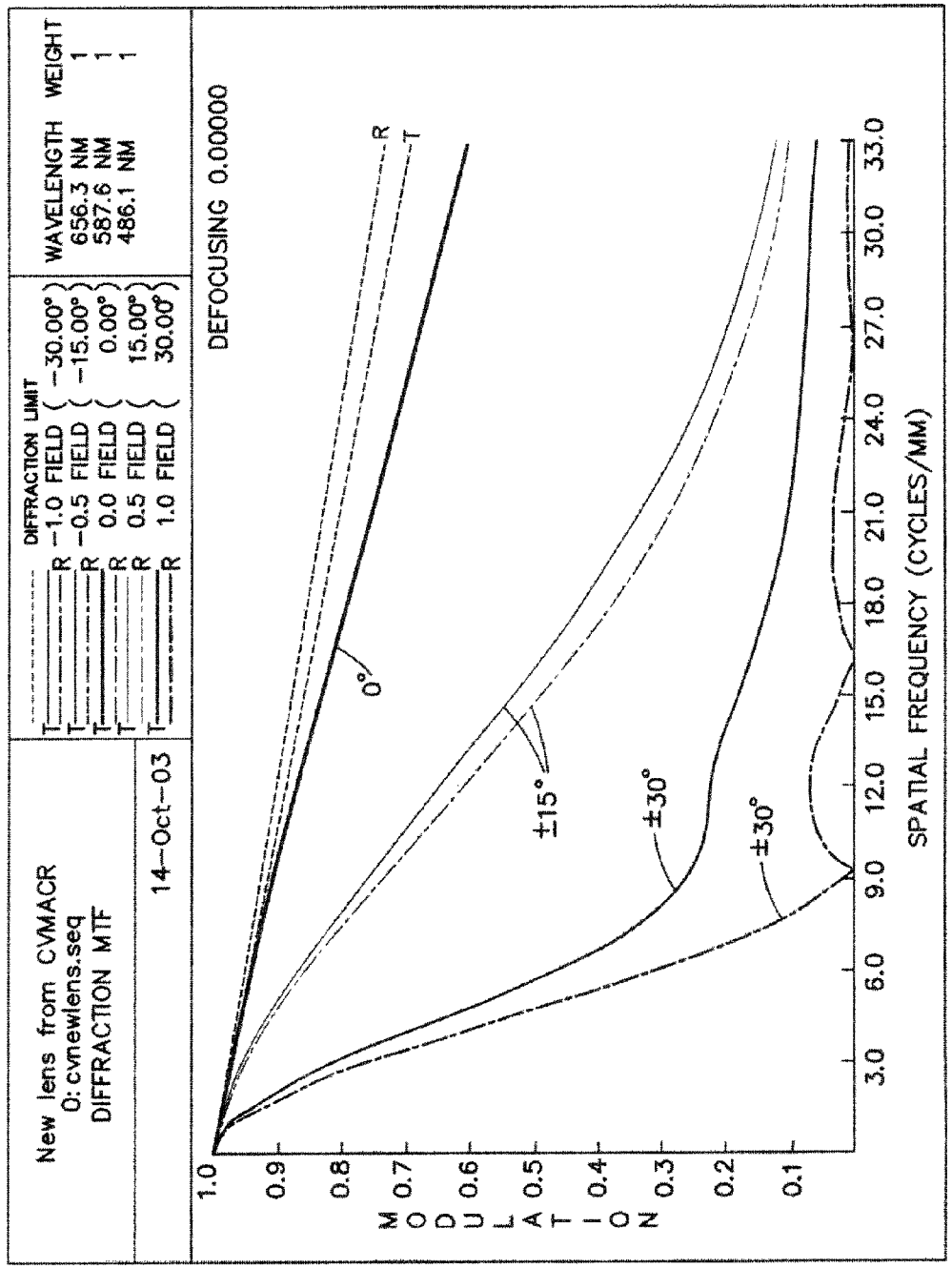
[FIG. 17] MTF output drawing (a) when the eye relief is 10 mm and MTF output drawing (b) when the eye relief is 30 mm, in the case of eyepiece optical system 31 of the second method.
Figure 17B:
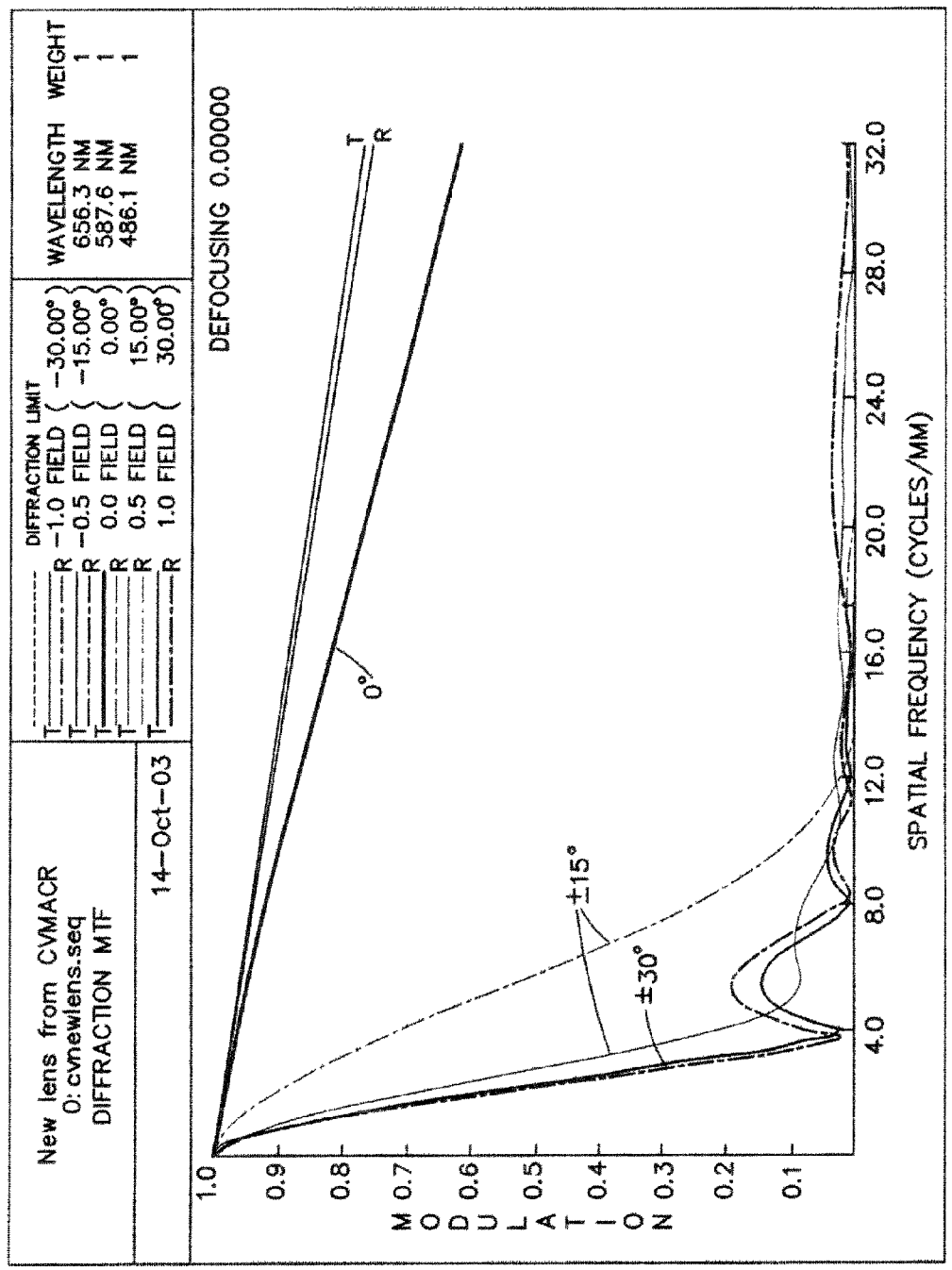

FIG. 17 shows the results of the evaluation of the optical drawing in FIG. 16; FIG. 17(a) shows an MTF output drawing when the eye relief is 10 mm, and FIG. 17(b) shows an MTF output drawing when the eye relief is 30 mm. When eye relief is 10 mm, it can be seen that, as shown in FIG. 17(a), at the position of field of view angle of ±15 degrees, about 22 cycles/mm can be resolved at the minimum at an MTF of 30% (45 μm L/S being resolvable), and even at the position of field of view angle of ±30 degrees, up to about 6 cycles/mm can be resolved at an MTF of 30% (167 μm L/S being resolvable). The chromatic aberration correction by the cemented lens has contributed to this resolution, at the level which ordinary letters can be resolved without difficulty even in a computer display.

However, when the eye relief is 30 mm, as shown in FIG. 17(b), at the position of field of view angle of ±15 degrees, only about 4 cycles/mm can be resolved at best at an MTF of 30% (0.25 mm L/S being resolvable), and also at the position of field of view angle of ±30 degrees, only about 3 cycles/mm can be resolved at best at an MTF of 30% (0.33 mm L/S being resolvable). Thus, when viewing large screen moving images, the user is scarcely troubled, but there arises, for example, the disadvantage that letters in the peripheral areas of a computer display become a little hard to be read.

Figure 18:
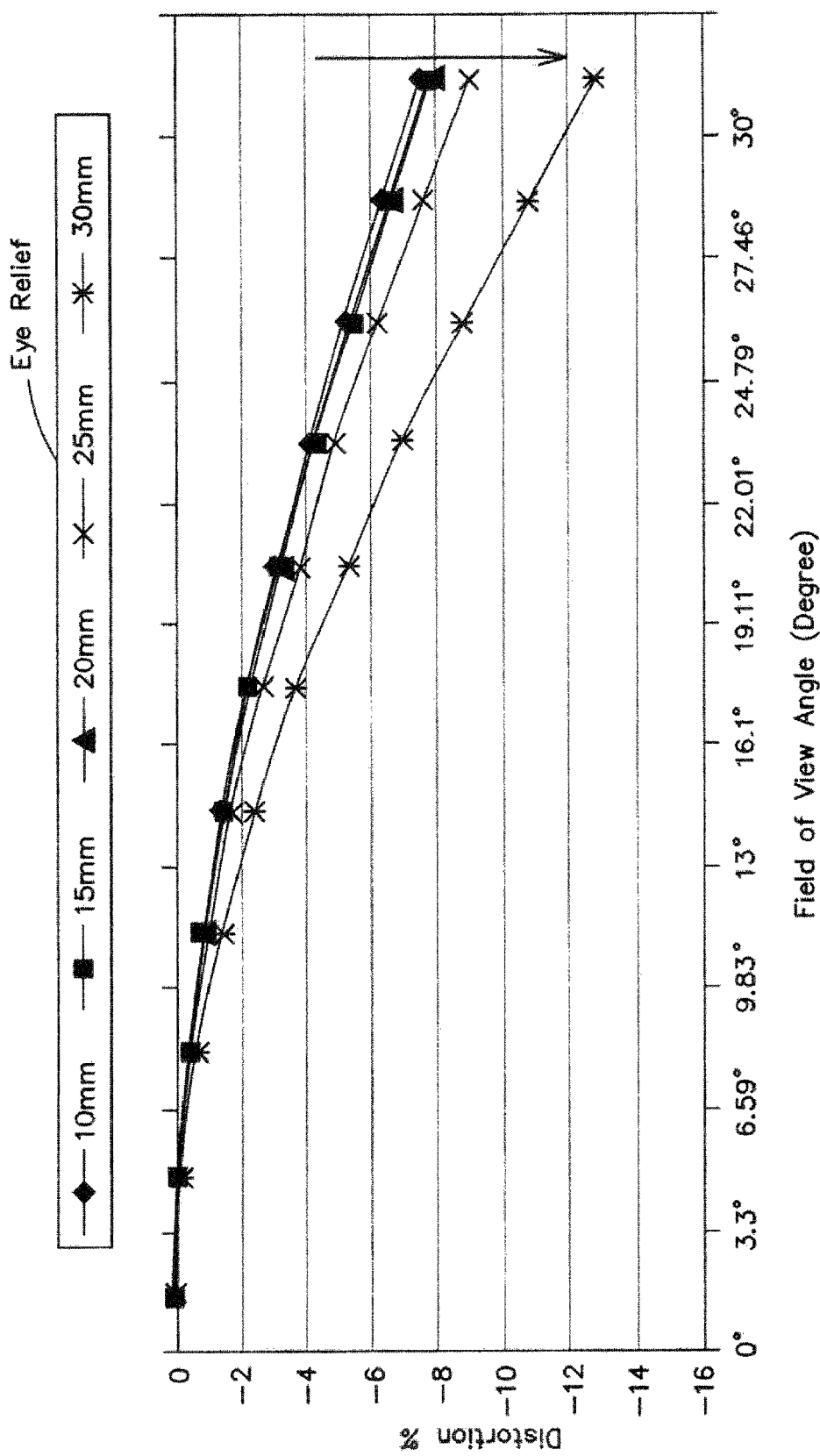
[FIG. 18] A line graph showing the distortion amounts when the eye relief is varied by 5 mm from 10 to 30 mm, in the case of eyepiece optical system 31 of the second method.

FIG. 18 shows further the distortions at each of the eye reliefs and at each of the field of view angles. It can be seen that, as shown in FIG. 18, the above-described endurable amount of distortion of less than 15% is satisfied under every condition. However, when the eye relief is in the range of from 25 to 30 mm, the distortion change becomes a little larger. If the user is accustomed to viewing images at an eye relief of 10 mm, the user may feel a sense of discomfort a little at the relatively large distortion change. However, generally, a large screen image of ±30 degrees is hardly used for a computer display, and thus, when the screen image area on which the user directly operates is set to be an area of about ±20 degrees, the user is not much troubled, as to the distortion change level. In other words, since the eyepiece optical system can be designed to be an inexpensive one by setting limits to the image screen size at the 10 mm eye relief, it has an adequate configuration applicable to a system in which an eye relief changing mechanism is incorporated.

However, since an eye relief of 10 mm is presupposed, it is preferable, under this condition, that a field of view angle of ±60 degrees, which is substantially comparable to that of eyeglasses, is obtained, and, further, also at an eye relief of 30 mm, good images are obtained with a field of view angle of ±30 degrees. For that reason, in the embodiment, as a third method, eyepiece optical system 31 is constituted by at least three pieces of lenses; the lens located most distant from the eye is constituted by a cemented lens; and the lens located nearest to the both eyes is constituted by a lens of which one surface is a conic surface with conic constant K<0.

FIG. 19(a) is an optical drawing in which the material for lens L8 is made SLAH66, the material for lens L9 is made SLAH55, the material for lenses L10 and L13 are made SLAH58, and the material for lenses L11 and L12 are made SNPH2, those lenses are, sequentially from the left side of the drawing, arranged in this order, and the approximate curvatures of lens L8, lens L9, lens L10, lens 11, lens L12, lens L13, and lens L14 are (∞, −31 mm and a hyperboloid with a conic constant of −1.3), (∞, −66 mm), (∞, −66 mm), (∞, −53 mm), (−53 mm, ∞), (∞, 42 mm), and (42 mm, 150 mm), respectively.

As shown by the light beams shown in FIG. 19(a), when the eye relief is set to be 10 mm, field angles of −60 degrees, −45 degrees, −30 degrees, −15 degrees, 0 degree, 15 degrees, 30 degrees, 45 degrees, and 60 degrees, as considered from the center, are obtained with respect to the left eye, and field angles of −60 degrees, −45 degrees, −30 degrees, −15 degrees, 0 degree, 15 degrees, 30 degrees, 45 degrees, and 60 degrees, as considered from the center, are obtained with respect to the right eye also. This results from improving, by using an aspheric lens having a negative conic constant instead of making the curvature of the lens located nearest to the eye small, the aberration which would be inherently generated when the lens curvature is small and from improving various aberrations by, as described above, using a plurality of convex lenses and by adopting a cemented lens. As shown in FIG. 19(a), the field of view angle viewable by the both eyes is ±60 degrees, and, also as a field of view angle, a field of view angle of ±60 degrees is similarly realized, which shows that a field angle comparable of which largeness is substantially comparable to that of eyeglasses is obtained. However, since, in this case, an aspheric surface is used, there is the disadvantage that the eyepiece optical system becomes expensive. It is preferable that to alleviate this disadvantage, as the glass material of the lens subjected to aspheric processing, a glass material of which refractive index is as high as possible and which can be processed with ease be used. In addition, to improve large chromatic aberration, a glass material having a large color dispersion and a glass material having a small color dispersion are combined; further, to improve the yield ratio in preparing glass materials, lens L11 and lens L12 are separately prepared in order to limit the thickness of the lenses.

FIG. 20(a) shows the light beams when the eye relief of this eyepiece optical system 31 is set to be 10 mm; FIG. 20(b) shows the light beams when the eye relief of this eyepiece optical system 31 is set to be 30 mm. A field of view angle viewable by the both eyes of more than ±30 degrees is obtained. Further, even when comparing the both of the two eye relief state in the range of ±30 degrees, it can be seen that images can be appreciated well in the both states of eye relief within that range.

Figure 19:
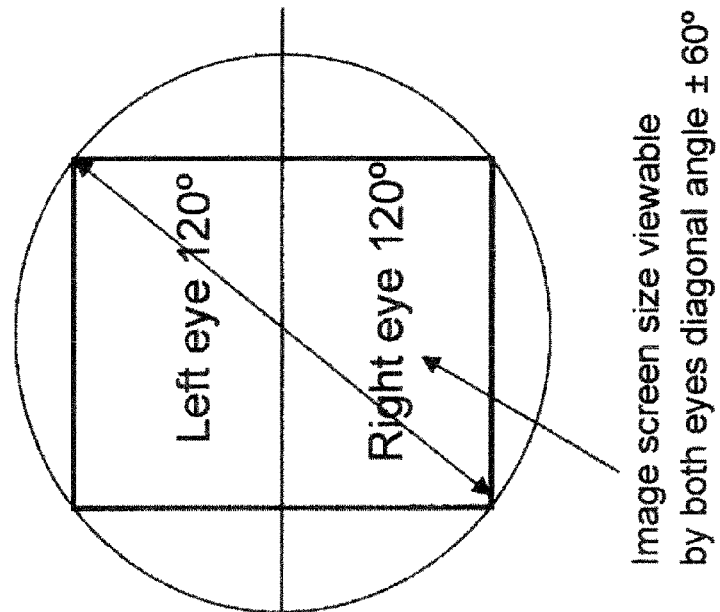
[FIG. 19] Optical path drawing (a) using eyepiece optical system 31 of a third method and the field of view drawing (b) showing the observable field of view.
Figure 19:
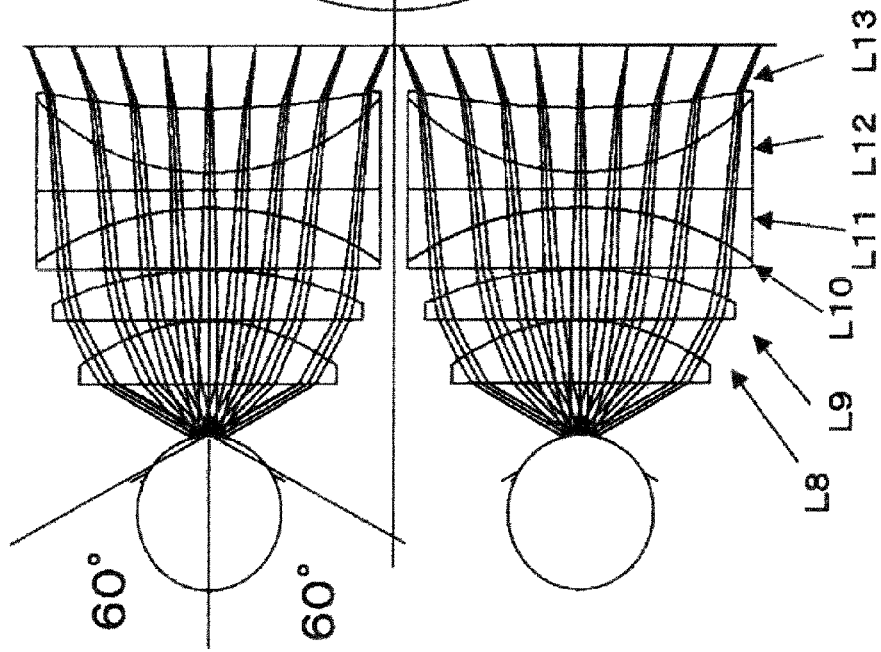
Figure 21A:
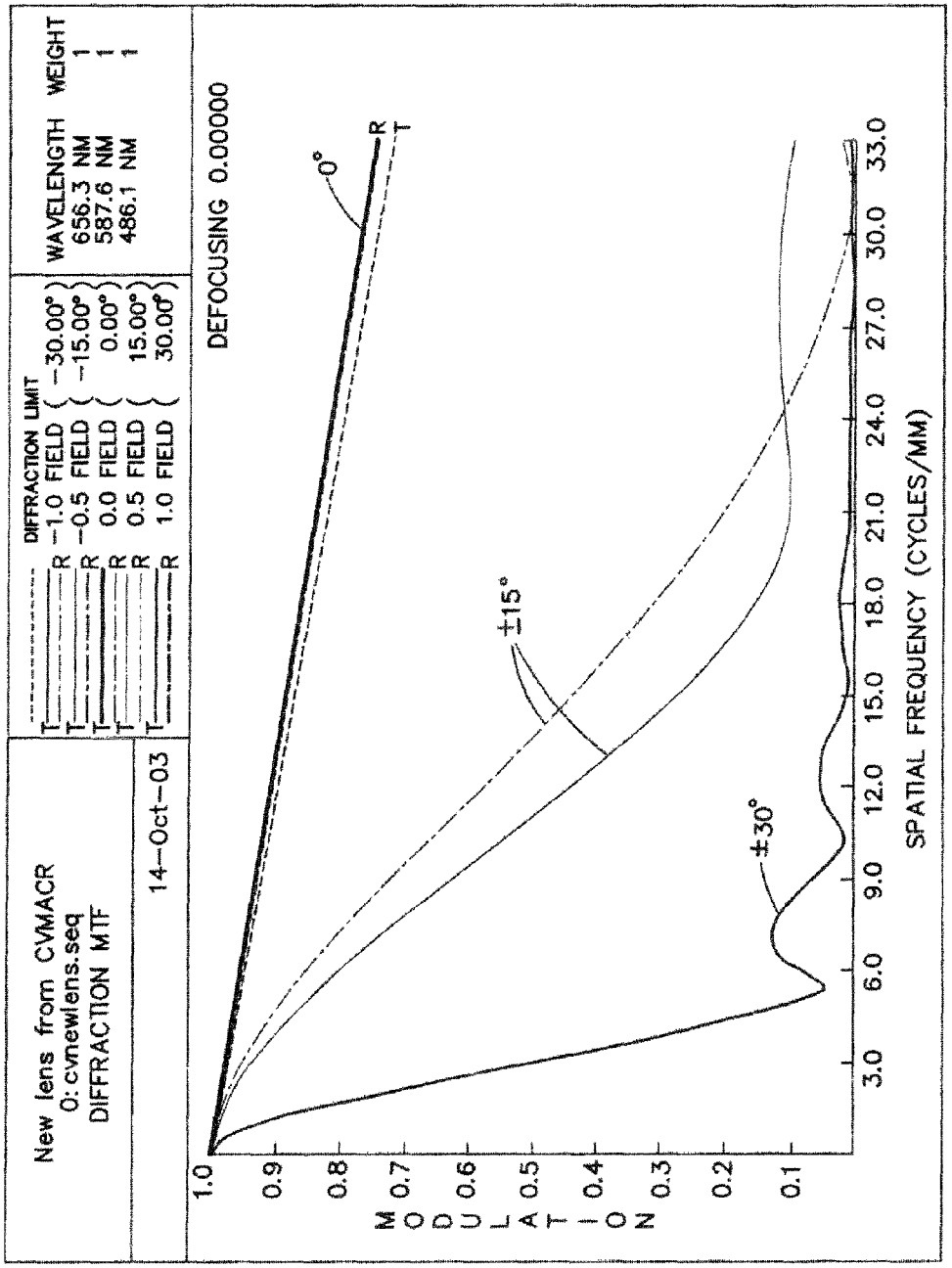
[FIG. 21] MTF output drawing (a) when the eye relief is 10 mm and MTF output drawing (b) when the eye relief is 30 mm, in the case of eyepiece optical system 31 of the third method.
Figure 21B:
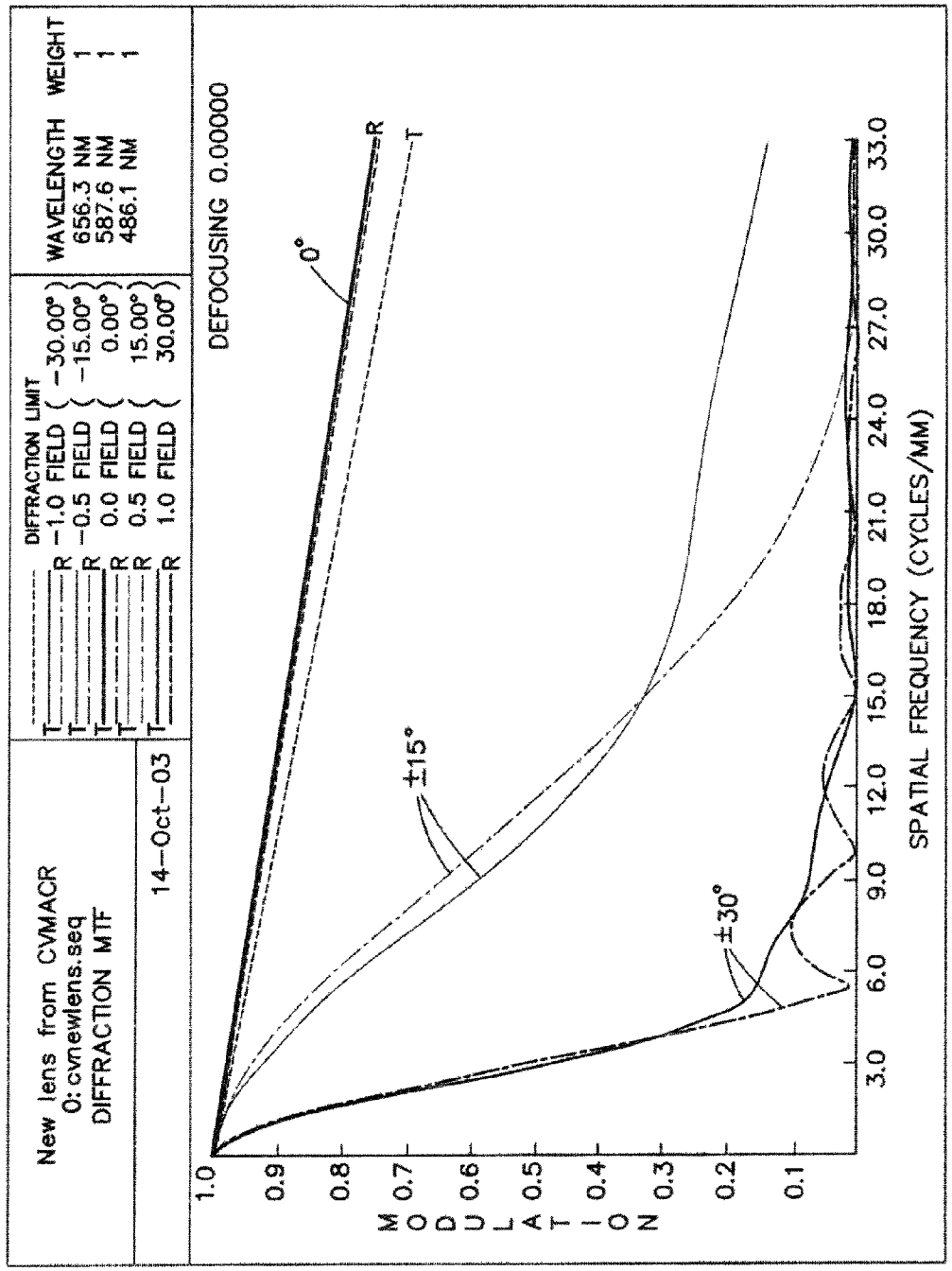

FIG. 21 shows the results of the evaluation of the optical drawing in FIG. 19; FIG. 21(a) shows an MTF output drawing when the eye relief is 10 mm, and FIG. 21(b) shows an MTF output drawing when the eye relief is 30 mm. When eye relief is 10 mm, it can be seen that, as shown in FIG. 21(a), at the position of field of view angle of ±15 degrees, about 14 cycles/mm can be resolved at an MTF of 30% (71 μm L/S being resolvable), and even at the position of field of view angle of ±30 degrees, up to about 4 cycles/mm can be resolved at an MTF of 30% (0.25 mm L/S being resolvable). Under this resolution level, up to ±15 degrees, ordinary letters in a computer display can be resolved without difficulty, and up to ±30 degrees, large screen moving images can be appreciated without difficulty.

Since with this optical configuration being adopted, also when the eye relief is 30 mm, at the position of field of view angle of ±15 degrees, about 15 cycles/mm can be resolved at an MTF of 30% (67 μm L/S being resolvable), and even at the position of field of view angle of ±30 degrees, about 4 cycles/mm can be resolved at an MTF of 30% (0.33 mm L/S being resolvable), it can be seen that images substantially equal to those when the eye relief is 10 mm can be obtained.

Figure 22:
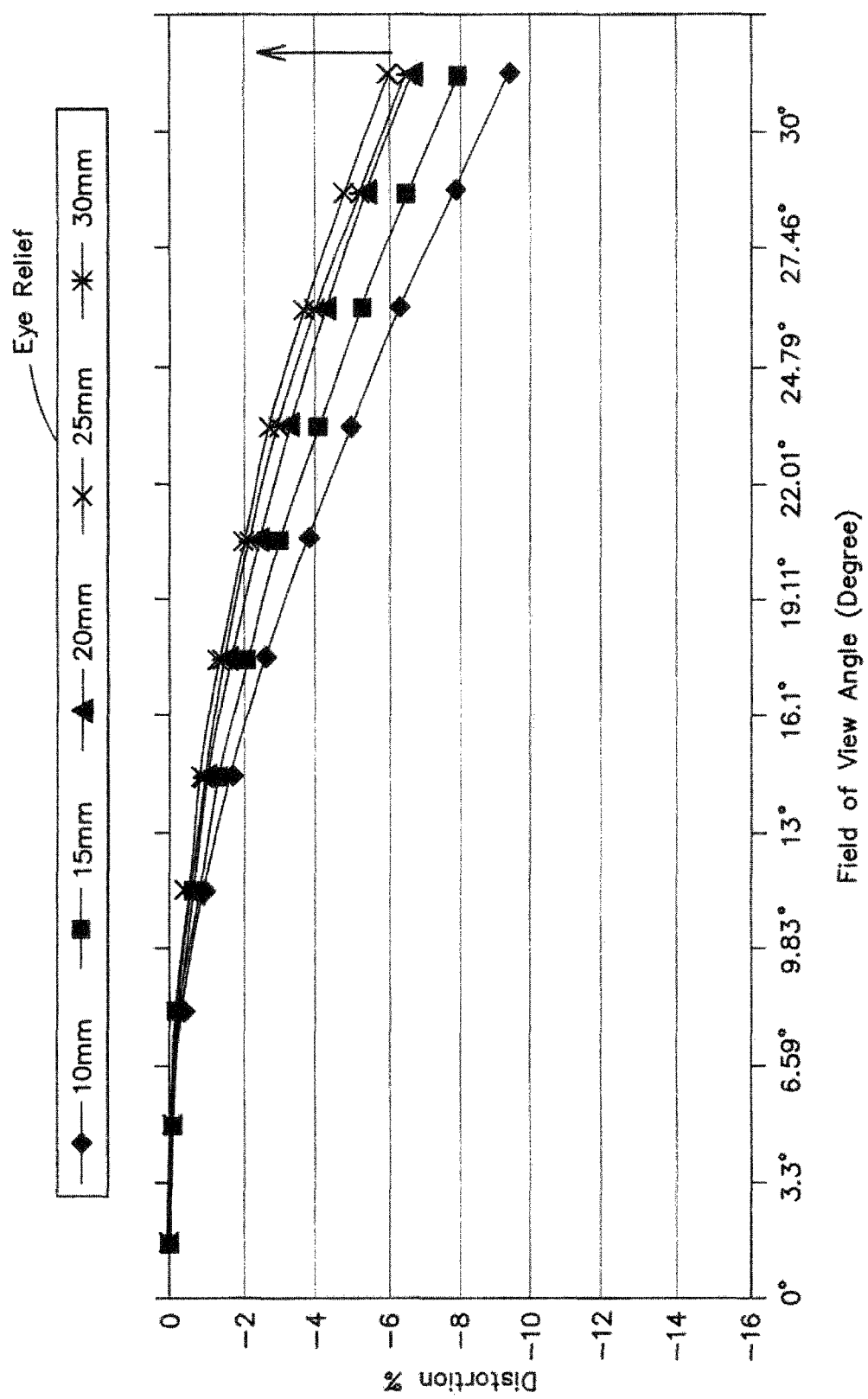
[FIG. 22] A line graph showing the distortion amounts when the eye relief is varied by 5 mm from 10 to 30 mm, in the case of eyepiece optical system 31 of the third method.

FIG. 22 shows further the distortions at each of the eye reliefs and at each of the field of view angles. As shown in FIG. 22, this eyepiece optical system satisfies the above-described endurable amount of distortion of less than 10% and, when compared with the other optical systems, the eyepiece optical system has the characteristic that the distortion amounts become smaller as the eye relief becomes larger. This means that at the position of an eye relief of 10 mm, the user can fully enjoy a sense of reality given by large screen images, and the user can even at the position of an eye relief of 30 mm, appreciate good images with a field of view angle of ±30 degrees.

Accordingly, in a system in which an eye relief changing mechanism is incorporated, the optical system of this invention represents a configuration that brings about the most effective performance. While, of course, the eye relief is supposed to range from 10 mm to 30 mm here, but the eyepiece optical system is designed for a field angle of 60 degrees; thus by utilizing this embodiment and by setting the field angle to be smaller, a mechanism having an eye relief of more than 30 mm may also be constructed.

As described above, in accordance with the first embodiment there are provided a display portion that displays an image, a supporting portion that supports the display portion at its portion that is not in contact with a user, and a face sandwiching portion that is supported by the display portion, is provided in contact with the face sides of the user, sandwiches the face of the user, and is capable of changing the distance between eyepiece optical systems and the eyes of the user. Thus, the number of choices regarding the distance between the eyepiece optical systems and the eyes of the user is increased, which makes it possible to attach the display portion to the face according to the situation. Further, the face sandwiching portion is provided in contact with the face sides of the user and sandwiches the face of the user, and the display portion is movable, with a portion of the face sandwiching portion being a point of support, in accordance with the movement of the head of said user and with the distance between the eyepiece optical systems and the eyes of the user. Thus, with the first eye relief state, in which the image display portion is made to follow the movement of the face of the user substantially completely, the user can appreciate images having a high image quality and a high field angle, in a state of a high sense of reality. Further, since, even in the second eye relief state, a fixed distance between the image display portion and the face is maintained by the face sandwiching mechanism, there is no risk that the face collides with the image display portion, and, in this state, there is generated, for example, the effect that the user, while appreciating images of a field of view angle of about 60 degrees, can, by directing the user's sight line to the outside, enjoy a meal or acquire outside information.

Further, in accordance with the first embodiment, the face sandwiching mechanism comes into contact with the face sides by sandwiching the both ears of the user and is provided with a sound output mechanism in the portion sandwiching the both ears. Thus, even if the field of view angle becomes smaller through the above-described transition from the first eye relief state to the second eye relief state, the positional relationship between the sound output mechanism and the ears does not change. For this reason, the user can still receive sound information and thus, while a state of high sense of reality being maintained, can, for example, have a meal or contact others.

Further, in accordance with the first embodiment, the face sandwiching mechanism is provided with an elastic member for the face sandwiching portion coming into contact with the face sides of the user and is provided, independently of the elastic member, with a width changing portion that changes the face sandwiching width and with a distance changing portion that changes the eye relief. Thus, while the degree of pressing is determined by the width changing portion, the pressing is performed via the elastic member; thus the pressing does not become an excessive one, and a comfortable sandwiching condition can maintained in accordance with the distance between the both ears. Further, as a sequence, the position of the ears is aligned with the face sandwiching portion first; however, since the face and the image display portion are not in contact with each other at that time, there does not arise such a problem that the face collides with the convex portion of the image display portion. While, further, by changing the eye relief, the face and the image display device are made to be in contact with each other, there does not arise such a problem that the eyes collide with the convex portion of the image display portion, because the positioning on the surface perpendicular to the optical axis of the image has already been performed. Further, since the sandwiching portion can be shortened or elongated in accordance with the distance between the ears and the face front, a comfortable contact condition can be maintained. Further, while the image display portion moves following the movement of the face while the position of the image display portion and the position of the eyes being kept in a predetermined relation (the state in which the eye center is located in the lens center) by the change of the eye relief and by the change of the face sandwiching width, the face sandwiching mechanism can be directly widened in emergency situations. This is because the mechanism can be widened by elastic-ally deforming the elastic members within their elastic limit; the user can immediately detach the face from the image display portion when the user feels sick, when an emergency arises, or when an inquiry is made from the outside. Further, since the elastic members resumes their original form, the eye relief and the face sandwiching width condition previously set can be maintained when the user wants to view images, and thus re-attaching or re-adjusting is required.

Further, in accordance with the first embodiment, with the size of the images to be displayed on the image display portion being automatically controlled in accordance with the eye relief, images having an appropriate size can be appreciated without feeling a sense of discomfort even if the eye relief is changed.

Further, in accordance with the first embodiment the display portion is provided, in a portion that faces the front side of the face of the user, with a face fixing portion, and the face fixing portion can change its state to a first eye relief state in which the front side of the face of said user is in contact with the face fixing portion and the distance between the display portion and the user's eyes is kept constant and to a second eye relief state in which without the front side of the face of said user being in contact with said face fixing members, the sight line of the both eyes of said user is, relative to said display portion, relatively movable around the axis passing through the both ears. Thus, since in the first eye relief state, the face fixing portion comes into contact with the skin on the bone around the eye, contact between the eye and the eyepiece lens is avoided, and even when the image display portion is pushed toward the face for some reason, the risk that the face would be damaged is avoided. Further, while in the second eye relief state, the face fixing portion and the face are not in contact with each other, the face sandwiching mechanism is set so as to surround the ears, and thus, the face can be rotated around the above-described axis. Further, since with the ears being covered by the ear region contact portion, the lengthwise movement is restrained, the risk that the face would be damaged can be similarly avoided, even when the image display portion is pushed toward the face for some reason or when the face inclines forward because of drowsiness. With the safety conditions being maintained in this way, the user can enjoy images and sound in the above-described two states.

Further, in accordance with the first embodiment the display portion is provided with the face fixing portions in a manner that they, evading the eyeglass frame of the user, are discretely provided around and above and below the both eyes and is provided, in the right-and-left outsides of the eyeglass frame, with light-shielding members for shielding light from the outside. Thus, even in a state of wearing eyeglasses, the face fixing portions and the eyeglass frame do not interfere with each other, the user can appreciate, with a high sense of reality, images at a predetermined eye relief. Generally, it is desired that also at the time of look-around eye action, in which the user moves the eyes around, the field of view is made wide. For this reason, it is desirable that for a user not wearing eyeglasses, the eye relief is set to be about 10 mm, which is shorter than the normal eye relief of 15 mm. However, in the case of a user wearing eyeglasses, since the standard eye relief between eyeglasses and the eye is traditionally set to be 15 mm, the eye relief of the user wearing eyeglasses would become totally more than 25 mm when assuming that the face fixing portion is 10 mm in thickness. However, in accordance with the first embodiment, the face fixing portions are discretely provided around and above and below the both eyes, evading the eyeglass frame of the user, such a problem can be evaded.

Further, since with the face fixing portions being discretely provided above and below, air comes in and out, there can also be obtained another effect that the eyeglass lenses and the eyepiece optical systems do not cloud over. It should be noted that an air blowing system may further be provided to prevent them from clouding over.

Further, in accordance with the first embodiment the display portion is provided with a frame recognition portion that recognizes whether there exists an eyeglass frame of the user and is capable of, in accordance with the recognition results, changing the thickness of the face fixing portion. Thus, for a user not wearing eyeglasses, an eye relief of 10 mm is realized, and for a user wearing eyeglasses, with the eyeglass frame being recognized, the stopper works, and an eye relief of 20 mm is set. As a result, since even if the eyeglass has a thickness of from 2 to 3 mm, there is provided a space of from 2 to 3 mm thickness between the eyeglass portion and the eyepiece lens portion, there is produced the effect that the lenses do not come into contact with each other and that images can be appreciated at an eye relief of 20 mm. Further, by virtue of such configuration, most suitable conditions can be provided to both of the user not wearing eyeglasses and the user wearing eyeglasses.

Further, in accordance with the first embodiment, each of the eyepiece optical systems is constituted by at least three pieces of lenses. Thus, various aberrations are suppressed while a high field angle being secured at an eye relief of 10 mm, and, at the same time, even when several kinds of eye reliefs are set, the distortion can be suppressed such that it has a small distortion rate-of-change and is of less than 15%.

Further, in accordance with the first embodiment, in each of the eyepiece optical systems, the lens located most distant from the eye is constituted by a cemented lens. Thus, a high field angle is realized, and, at the same time, chromatic aberration can be corrected.

Further, in accordance with the first embodiment, in each of the eyepiece optical systems, the lens located nearest to the eye is constituted by a lens of which at least one surface is a conic surface with conic constant K<0. Thus, a high field angle is realized; aberrations are improved; further, even when several kinds of eye reliefs are set the distortion can be suppressed. Still further, deterioration of the image quality due to the changing of eye relief can also be suppressed.

Further, in accordance with the first embodiment, the display portion is configured such that relay optical systems and light diffusing plates are provided between the photoelectric device and the eyepiece optical systems and such that the transmitted images of the light diffusing plates are projected, via the eyepiece optical systems, onto the eyeballs of the user. Thus, it is configured such that images to be projected are tentatively projected by a relay magnification optical system onto the light diffusing plates, and then the projected images are observed through the eyepiece optical systems. By this, images having a high image quality can be provided to the user. In particular, in the case of a liquid crystal panel, which has a strong directivity and looks dark when viewed from a given direction, there also arises the advantage that with the light diffusing plates being used, the images can be observed from a wide range of angle because of the diffusing effect.

<Second Embodiment>

Figure 23:
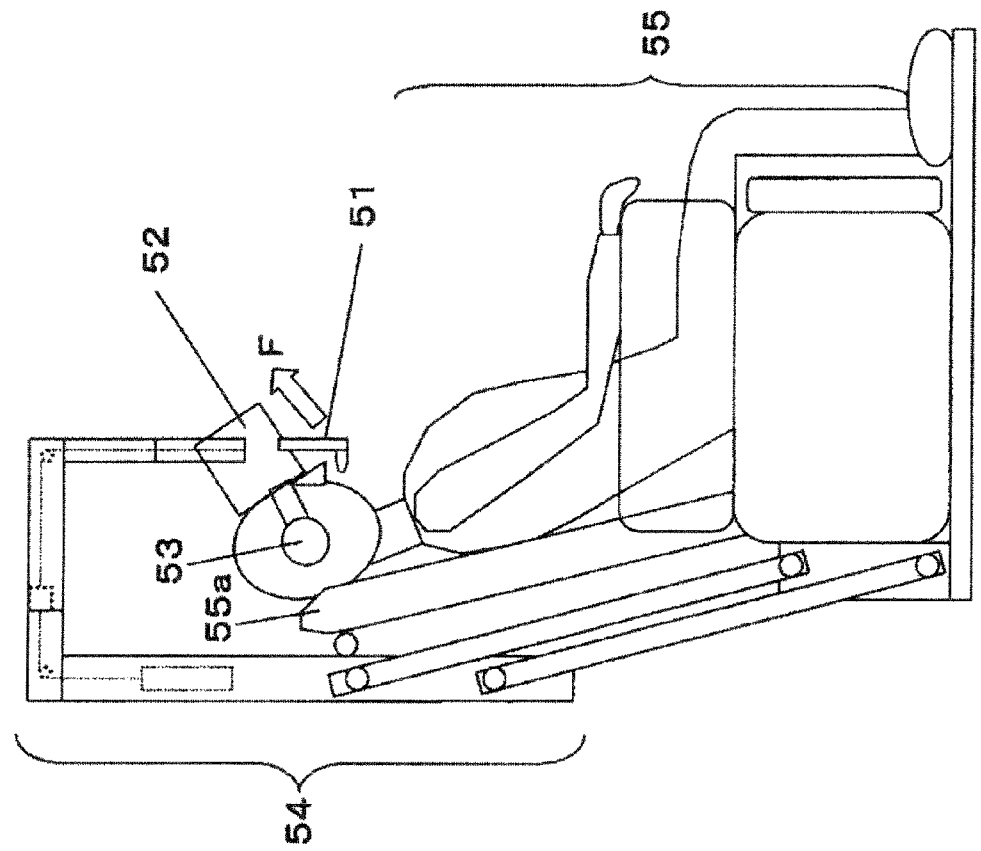
[FIG. 23] A sketch drawing of image display system 50 of a second embodiment.

As shown in FIG. 23, image display system 50 of a second embodiment is provided with voice input portion 51, image display portion 52, sound output portions 53, supporting portion 54, and, further, chair portion 55. Voice input portion 51 can, with it being moved in the direction of arrow F, perform on/off of voice input. Further, image display portion 52 projects, via eyepiece optical systems which respectively correspond to each of the both eyes of a user, a light emitted from a two-dimensionally light emitting type photoelectric device, not shown, which is perpendicular to the light beam emitting direction onto the eyeballs of the user. Further, sound output portions 53 output sound to the user. Further, as shown in FIG. 23, supporting portion 54 supports image display portion 52 at its portion that is not in contact with the user.

First, supporting portion 54, which supports image display portion 52, will be described. FIG. 24(c) is a cross-section drawing of supporting portion 54 of this embodiment. As shown in FIG. 24(c), supporting portion 54 is provided with in-horizontal-plane drive portion 76 including joint 77, string 56 by which image display portion 52 is suspended, supporting column 57, weight 58 disposed in supporting column 57, and pulleys 59, 60, and 61. The weight of weight 58 within supporting column 57 is substantially equal to that of image display portion 52. With respect to image display portion 52, its free movement in a horizontal plane is realized by in-horizontal-plane drive portion 76, and with image display portion 52 and weight 58 being connected with each other by string 56 along pulleys 59, 60, and 61, the image display portion's movement in the vertical direction is realized.

Weight 58 is connected with image display portion 52 by string 56 and cancels the moment of image display portion 52 relative to supporting portion 54.

Further, pulleys 59, 60, and 61 relax the friction occurring to string 56. It is to be noted that it may also be configured such that by applying Teflon (registered trademark) processing to the portions where pulleys 59, 60, and 61 are provided instead of disposing pulleys 59, 60, and 61, the friction is relaxed.

Here, as string 56, a string-like flexible member that is strong is preferably used. For example, a twined cord using stainless-steel fibers, which excel in tensile strength, or a para-type aramid fiber (brand name: technora, KEVLAR) may be used.

By the way, when string 56 is exposed to the outside of supporting column 57, it may break because of its contact with other members. Since Image display portion 52 itself weighs from 1 to 3 kg, a significant danger occurs when it drops. To address this, as shown in FIG. 24(b), supporting portion 54 is provided with a cover in the portion ranging from in-horizontal-plane drive portion 76 to image display portion 52 suspended by string 56. The cover is constructed by connecting cover 62 fixed to in-horizontal-plane drive portion 76 with cover 64 fixed to universal joint portion 63 of image display portion 52 via nested portion 65, as shown in FIG. 24(b), and the cover is structured such that even if string 56 happens to break, image display portion 52 does not drop.

By adopting at least one of the above-described safety measure examples, it can be thought that appropriate safety has been obtained.

Further, in consideration of a case where the string breaks despite of such safety measure, it is configured such that with the string being divided a little above nested portion 65, a brake member of which shape is configured such that when the tension of the divided string disappears, the brake member's claws open right and left and come into contact with cover 62 is attached to the divided portion. It may also be configured such that the brake member comes into contact with the upper end portion of cover 62, causing friction, and makes the dropping speed slower.

The portion, other than the suspending portion, where string 56 is exposed to the outside is the portion of in-horizontal-plane drive portion 76. As shown in FIG. 24(d), with respect to this portion, to each of the joints of in-horizontal-plane drive portion 76 is provided cover 66, and it is structured such that while string 56 and pulleys 59, 60, and 61 are not viewable from the outside, the drive in a horizontal plane can be completely performed.

Figure 25:
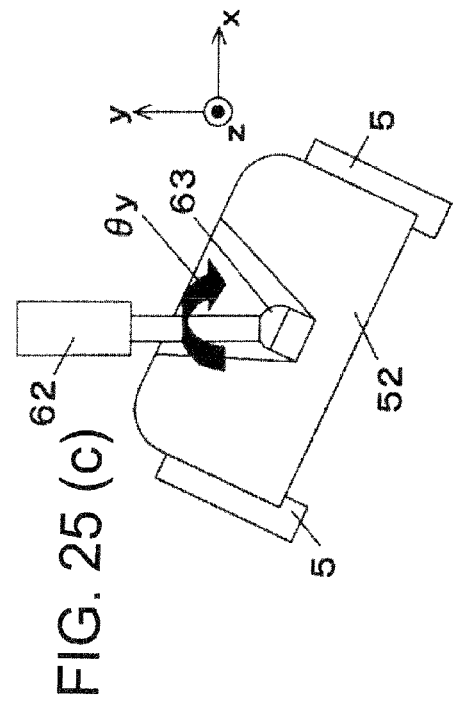
[FIG. 25] Drawings for illustrating rotation mechanisms for each of the rotation axes of θx, θy, and θz.
Figure 25:
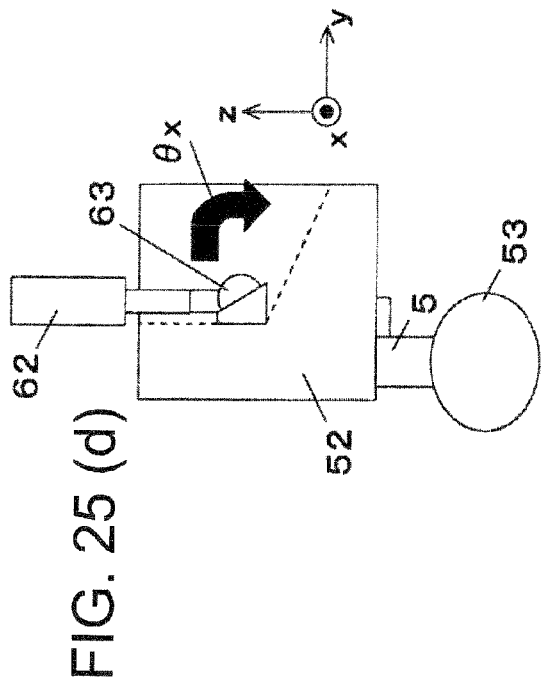
Figure 25:
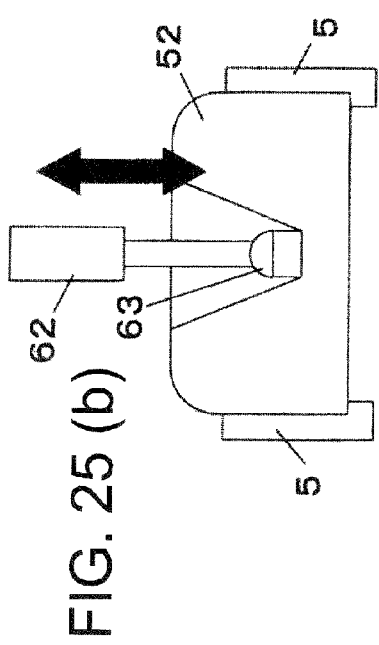
Figure 25:
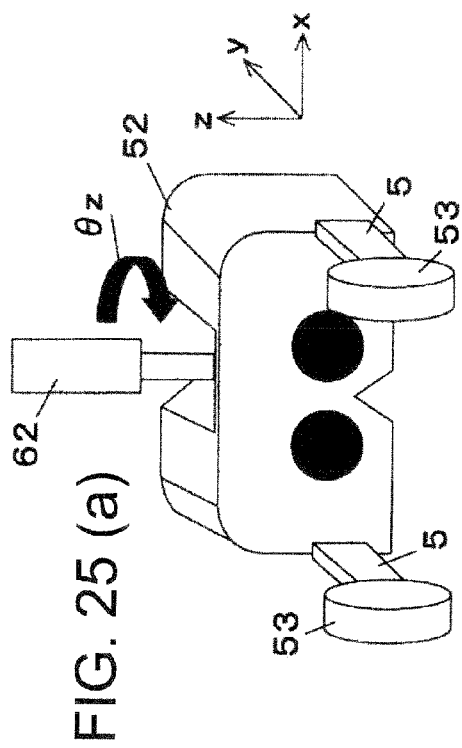

Next, FIG. 25 shows, other than the above-described XYZ movements, rotation mechanisms for each of the rotation axes of $\theta x$, $\theta y$, and $\theta z$. With image display portion 52 being moved up and down and with in-horizontal-plane drive portion 76 being driven, via universal joint portion 63 and string 56, movement of six degree of freedom is assured. The six degree of freedom referred to here means not only that the display portion simply moves but also that with the techniques of balancing weight and keeping center of gravity, the display portion completely follows the movement of the face almost without no resistance and that the user can appreciate images at a desired direction of the display portion so long as the direction is within the permitted range of stroke, in either of the state of standing, the state of sitting, or the state of lying.

Figure 26:
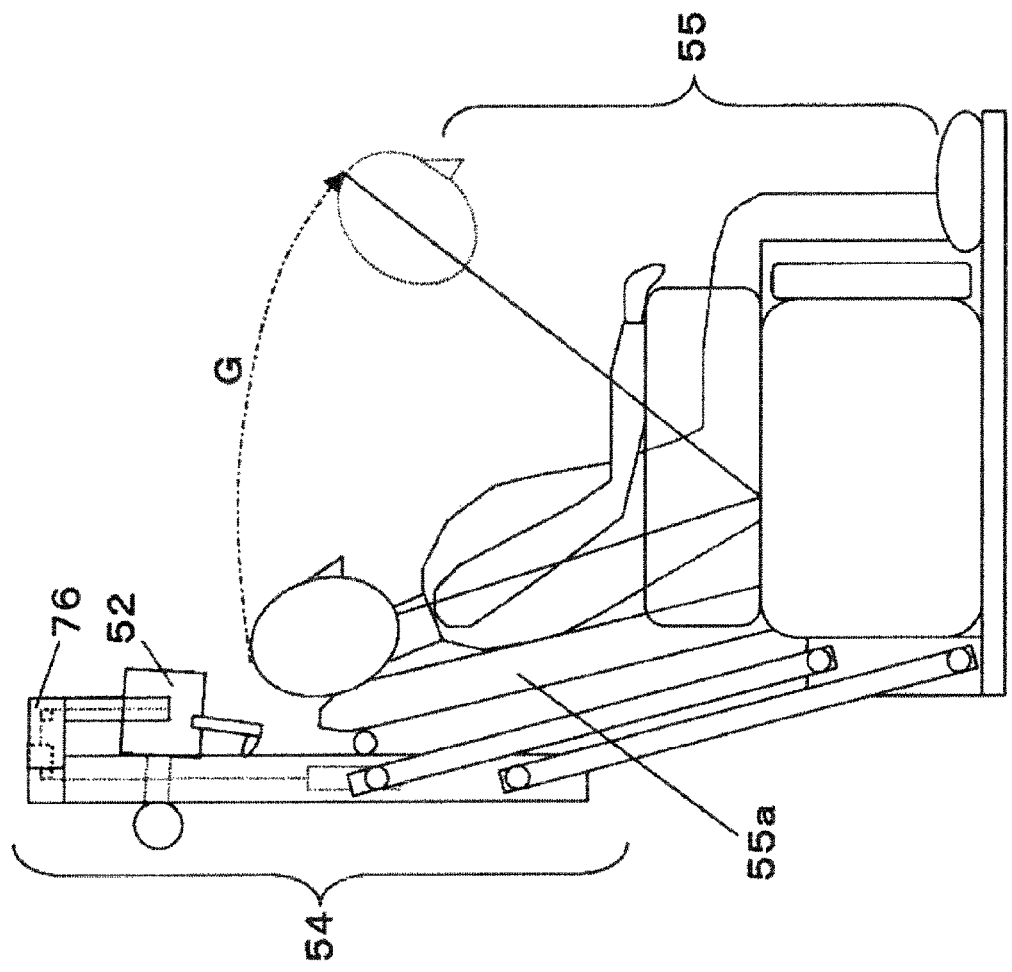
[FIG. 26] A side view showing that when a user bends his or her body in a state of sitting, there is no obstacle in the vicinity of the head.

By the way, while the mechanism in which chair portion 55 and supporting portion 54 are integrally provided makes it possible to perform various things, special attention must be paid to safety because the heavy object is set on the user's head. Since supporting portion 54 is set on backrest portion 55a of chair portion 55, there arises no problem when the user does ordinary actions. However, when, as shown in FIG. 26, the user detaches image display portion 52 from the face, in-horizontal-plane drive portion 76 of supporting portion 54 automatically retracts, and image display portion 52 is evacuated at least out of the region defined by the arc G drawn, with its center being the hips, by the head, which is the action region when the user rises from the chair.

Figure 27:
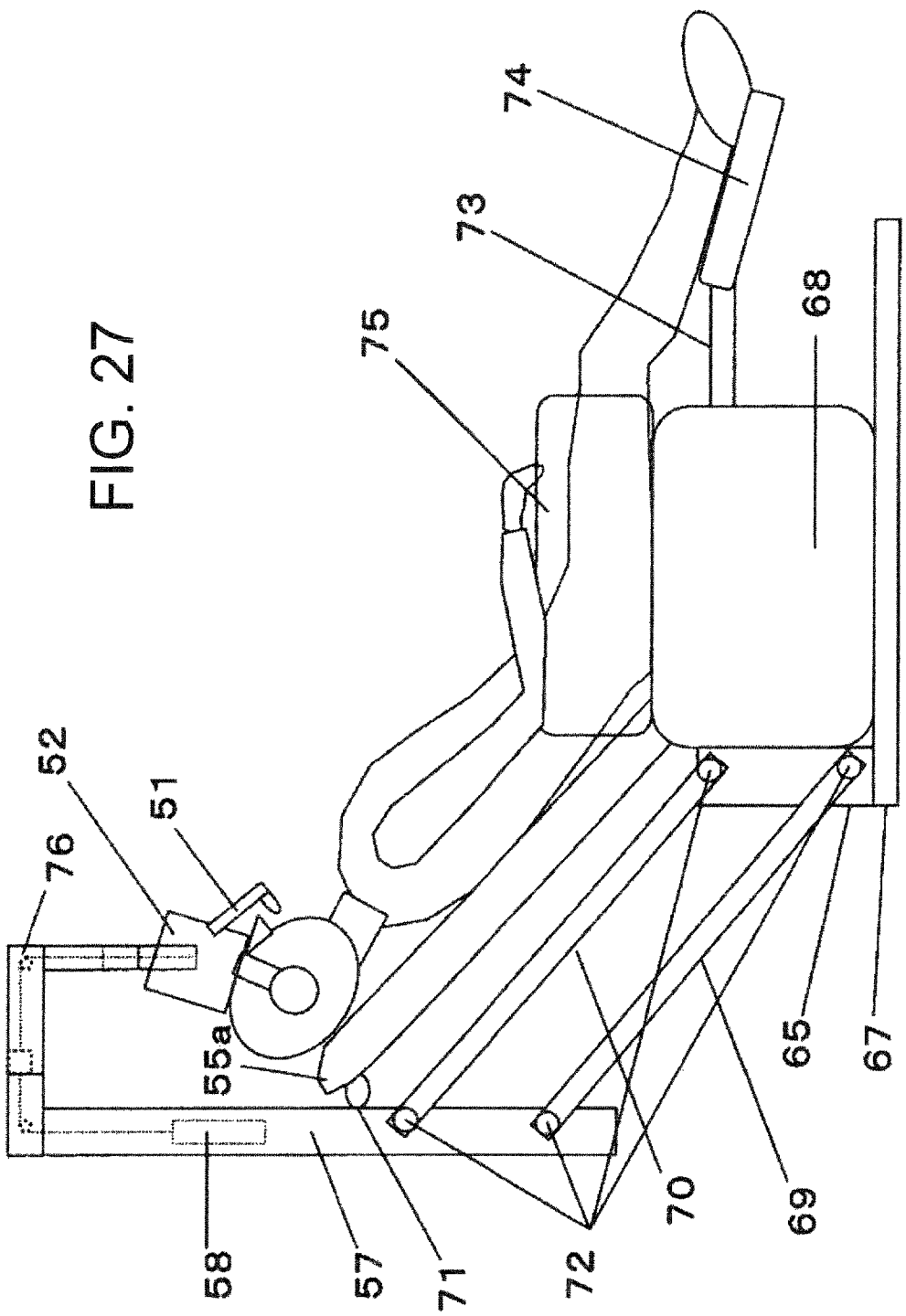
[FIG. 27] A side view showing the condition when the backrest portion of a chair is reclined.
Figure 28:
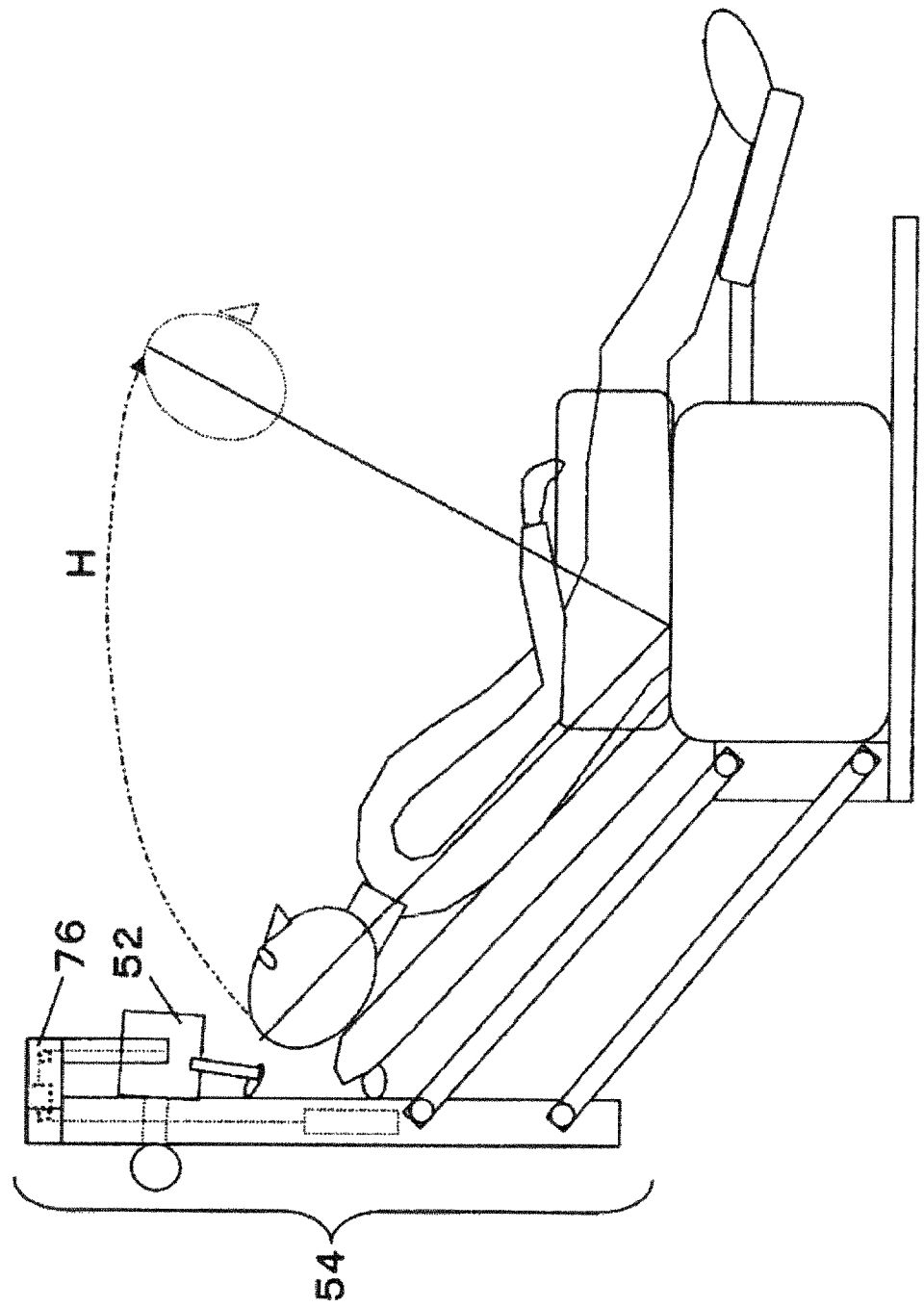
[FIG. 28] A side view showing that when a user raises his or her body in a state of reclining, there is no obstacle in the vicinity of the head.

Further, as shown in FIG. 27, regarding chair portion 55, backrest portion 55a is inclinable (reclinable). Also when backrest portion 55a of chair portion 55 is reclined, or when, as shown in FIG. 28, the user detaches image display portion 52 from the face, in-horizontal-plane drive portion 76 of supporting portion 54 automatically retracts, and image display portion 52 is evacuated at least out of the region defined by the are H drawn, with its center being the hips, by the head, which is the action region when the user rises from the chair. In the ordinary actions where, as described just above, the user is not willing to intentionally make his or her body come into contact with the heavy object, a safety design is applied so that the user is not damaged by the heavy object.

Next, description will be made on the situation where, as shown in FIG. 27, backrest portion 55a of chair portion 55 is reclined. In FIG. 27, to chair main body 68 fixed to setting to floor base 67 is rotationally drivably fixed by joint portions 72 a parallel link mechanism (69, 70, 71) that supports by a parallel link mechanism supporting portion 54. And, it is configured such that supporting portion 54 that is drivably set by joint portions 72 driven up-and-down and back-and-forth in accordance with the reclining of backrest portion 55a of chair main body 68 is driven up-and-down and back-and-forth in a state that supporting portion 54 is kept parallel to parallel link fixing portion 65 by the constraint of parallel link mechanism (69, 70, 71).

In accordance with the reclining of backrest portion 55a, a foot reclining mechanism (73, 74) set to chair main body 68 also operates. It is configured such that those operations are controllable by armrest portion 75 fixed to chair main body 68.

Here, since, as shown in FIG. 26, supporting portion 54 is kept parallel to parallel link fixing portion 78 in both of the normal state and the reclining state, space larger than the space required by the reclining of the chair is not required. Thus, space saving can be realized. Further, weight 58 described in connection with FIG. 24 exists in supporting column 57 of supporting portion 54, and it is structured such that with supporting portion 54 being kept vertical, the balance between image display portion 52 and weight 58 can be maintained. Further, in this method, the position of supporting column 57 also moves in accordance with the reclining, and, compared with a floorstanding device, the stroke of the moving mechanism moving in the horizontal direction mounted on supporting portion 54 can be made smaller by the extent that is realized by the position movement of supporting column 57, and thus it is possible to make the image display system more compact.

Further, while, referring to FIG. 27, the necessity that in the case of connecting weight 58 and image display portion 52 by using string 56, supporting column 57 is kept vertical so that weight 58 existing in supporting column 57 does not collide with the inner surface of supporting column 57 has been described, this can be applied to the other mechanisms.

As described above, in accordance with the second embodiment, the image display system comprises a display portion that displays images, a chair portion on which a user can sit and of which backrest portion is reclinable, a supporting portion which is united with the chair portion and which supports the display portion at its portion that is not in contact with the user, and a face contact portion which is supported by the display portion and comes into contact with the face of the user, and the supporting portion is movable so that the display portion follows, in accordance with the inclination of the backrest portion of the chair portion, the head of the user. Thus, with the supporting portion and the image display portion being connected to the chair portion on which the user sits, the risk that with the image display portion moving and thus with the gravity center position changing, the image display system itself would become likely to fall can be avoided. Further, it is preferable that, as with the first embodiment, the face contact portion is provided in contact with the face sides of the user and sandwiches the face of the user, and the display portion is movable, with a portion of the face contact portion being a point of support, in accordance with the movement of the head of the user. By doing so, the image display portion can be made to follow the movement of the face of the user substantially completely.

Further, in accordance with the second embodiment, the supporting portion is provided with a balance portion that cancels the moment of the display portion relative to the supporting portion. Thus, it can be configured such that the image display portion smoothly follows the movement of the face.

Further, in accordance with the second embodiment, the supporting portion is provided with a string-like flexible member that connects the display portion and the balance portion and with a friction relaxing mechanism that relaxes the friction occurring to the flexible member. Further, since the balance portion is not exposed to the outside of this system, damage to the user (e.g., contact) is prevented; further, since only the torque of the image display portion occurs, smooth following of the image display portion to the user can be assured.

Further, in accordance with the second embodiment, the supporting portion is provided, as the string-like flexible member, with a stainless-steel fiber. A stainless-steel fiber is flexible and excels in durability and tensile strength; thus, by utilizing a twined cord using the fibers, the risk that the flexible member would become likely to break can be avoided.

Further, in accordance with the second embodiment, the supporting portion is provided, as the string-like flexible member, with a para-type aramid fiber. As with the stainless-steel fiber described above, a para-type aramid fiber is flexible and excels in durability and tensile strength; thus, by utilizing a twined cord using the fibers, the risk that the flexible member would become likely to break can be avoided.

Further, in accordance with the second embodiment, the supporting portion is provided with a drop prevention mechanism that prevents the display portion from dropping when the flexible member breaks. Thus, this drop prevention mechanism plays an important role for avoiding the risk caused when the flexible member happens to break.

Further, in accordance with the second embodiment, the supporting portion is provided with a cover that covers the surface of the supporting portion. Thus, it can be prevented that fingers, etc. are pinched by the portions driven when image display portion is driven. Further, by providing a cover to each of the joint portions so that the flexible member cannot be seen from the outside and cannot be touched, the risk that with the flexible member being exposed to the outside, the flexible member would deteriorate, would be damaged, and would break, and thus the image display portion would drop can be avoided.

Further, in accordance with the second embodiment, the supporting portion is disposed adjacent to the backrest portion of the chair portion, and the chair portion is provided with a parallel link member which keeps, when the backrest portion inclines, the inclination of the supporting portion relative to the ground in the vertical direction. Thus, a large stroke for the image display portion to follow the head, which has been required in a floorstanding type image display system, is not required. This is because it is configured such that the backrest portion shoulders the stroke. For this reason, space saving can be realized. Further, in this configuration, the supporting column always stands orthogonally to a horizontal plane.

Thus, there is the effect that the supporting portion is prevented from coming into contact with the weight in the supporting portion.

In other words, there is the effect that space saving is realized when the chair reclines (because the supporting column portion does not protrude from the space for reclining) and that smooth following of the image display portion is realized, without depending upon the reclining position.

Further, in accordance with the second embodiment, when the user detaches the display portion from the face, the supporting portion evacuates the display portion out of the region defined by the are drawn, with its center being the hips of the user, by the head. Thus, a safety design is applied so that when the user rises from the chair, the user does not come into contact with the image display portion or the supporting portion, which assures that the image display system can be used at ease even in a dark room.

By the way, in the second embodiment, it may be configured such that in a case where image display portion 52 and weight 58 are suspended by a carrying pole instead of string 56, when assuming that the weight of image display portion 52 is M, that the weight of weight 58 is m, that the distance between image display portion 52 and a fulcrum is L, and that the distance between weight 58 and the fulcrum is 1, the moments are cancelled by M·L=m·1. With such structure being adopted, as with in a case of a balance, weight 58 and image display portion 52 can be driven up and down in a state that they are balanced (which substitutes the up and down motion of the string). Further, since this method does not use a string or a pulley, configuration can be simplified.

As with the above-described case, in which string 56 is used, also when such configuration is adopted, by keeping supporting column 57 vertical, space saving can be realized, and, further, the stroke in the horizontal direction can be made smaller. Further, in such configuration, it is configured such that for the purpose of driving in the horizontal direction, with a rotation mechanism having supporting column 57 as rotation axis and with a horizontally driving stage being provided to supporting column 57, image display portion 52 is made by the combination thereof horizontally movable as desired; and thus, if supporting column 57 inclines, the rotation axis of supporting column 57 and the horizontally driving stage also incline, and smooth driving in the horizontal direction cannot be realized. Accordingly, as with the above-described example, it becomes important that supporting column 57 is kept vertical.

<Third Embodiment>

Image display device 100 of a third embodiment has a configuration almost similar to that of FIG. 23 of the second embodiment. Thus, with illustration and configuration description thereof being omitted, description will be made hereinafter by using symbols similar to those in FIG. 23.

In the following, characterizing portions of the third embodiment will be described.

Figure 29:
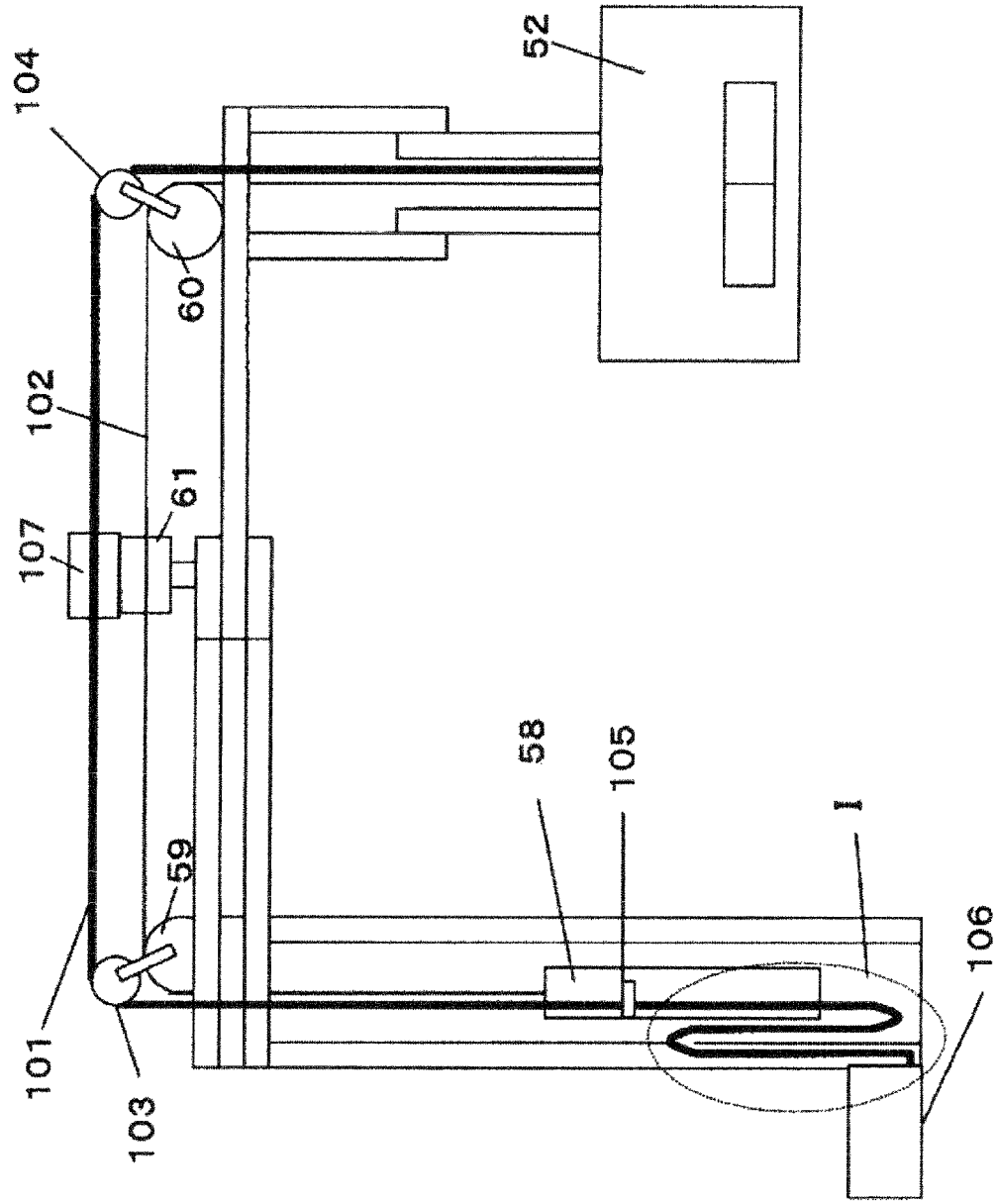
[FIG. 29] A drawing illustrating the hardwiring in a third embodiment.

FIG. 29 is a cross-section drawing of supporting portion 54 of image display device 100. As shown in FIG. 29, supporting portion 54 has hardwiring 101 along a string-like flexible member 102 in supporting portion 54. And, hardwiring 101 is led from image display portion 52 to weight 58 via pulleys for wiring 103, 104, and 107. Hardwiring 101 is fixed, at its intermediate portion, to wiring fixing portion 105 attached to weight 58. Hardwiring 101 is slackened so that it has a sufficient margin for the up and down drive of weight 58 (see region 1 in FIG. 29) and then is connected to the outside (e.g., controller 106). In other words, with respect to hardwiring 101 itself, its curvature is made as large as possible so that it does not break; it is designed such that it is not directly affected by the weight of weight 58 or the weight of image display portion 52; and it is disposed with a predetermined margin so as not to become a load when image display portion 52 moves. Since, for this reason, tensile force scarcely occurs to hardwiring 101 itself, the resistive load is small; further, it is taken care of that no load is exerted to hardwiring 101 itself.

Such hardwiring 101 is provided, for example, for supplying power to the LCDs of image display portion 52 and to the LCD illumination system, for displaying images, and for transmitting sound information. Of course, if all of such purposes could be addressed by radio transmission, a battery, a solar battery, or the like, that would suffice; however, to obtain stable outputs, supplying by means of hard wiring is the most effective way.

As described above, in accordance with the third embodiment, the image display device comprises a display portion that displays images, a supporting portion that supports the display portion at its portion that is not in contact with a user and that is provided with a balance portion that cancels the moment of the display portion relative to the supporting portion, a face contact portion that is supported by the image display portion and comes into contact with the face of the user, and a hardwiring for connecting the display portion to the outside which hardwiring is provided along the inside of the supporting portion and a portion of which hardwiring is fixed to a portion of the balance portion. Thus, since tensile force scarcely occurs to hardwiring 101 itself, the resistive load is small; further, with no load being exerted to hardwiring 101 itself, stable outputs can be obtained. Further, it is preferable that, as with the first embodiment, the face contact portion is provided in contact with the face sides of the user and sandwiches the face of the user, and the display portion is movable, with a portion of the face contact portion being a point of support, in accordance with the movement of the head of the user. By doing so, the image display portion can be made to follow the movement of the face of the user substantially completely.

It is to be noted that the invention described by the third embodiment may be applied to image display device 1 of the first embodiment, to the image display system of the second embodiment, or to each of the embodiments described later.

<Fourth Embodiment>

Image display device 170 of a fourth embodiment has a configuration almost similar to that of FIGS. 23 and 24 of the second embodiment. Thus, with illustration and configuration description thereof being omitted, description will be made hereinafter by using symbols similar to those in FIGS. 23 and 24.

In the following, characterizing portions of the fourth embodiment will be described.

Figure 30:
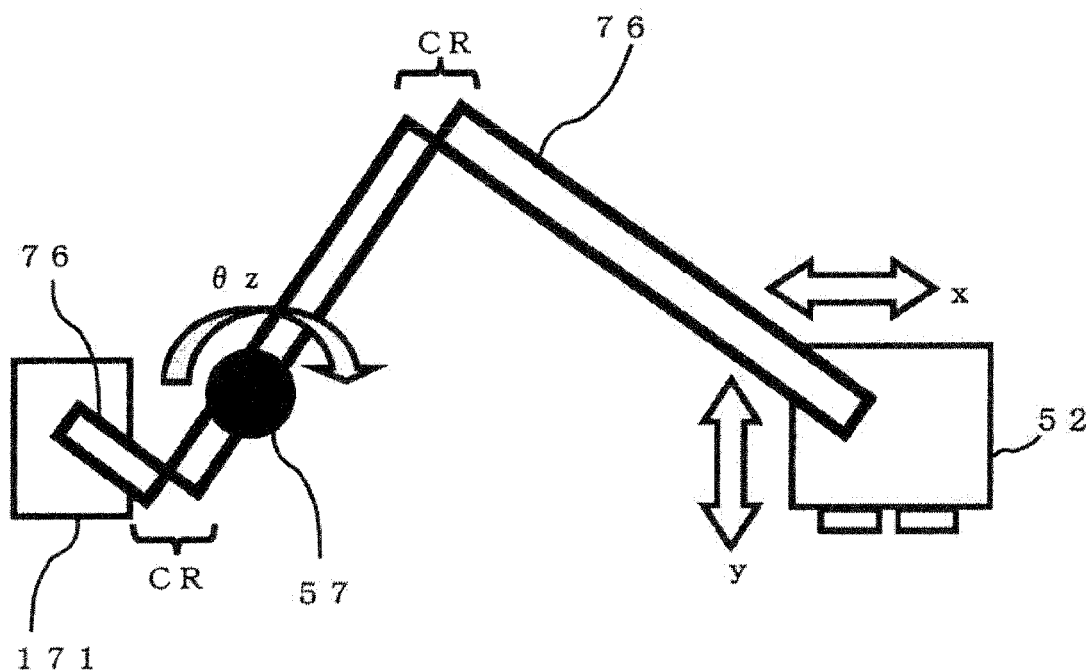
[FIG. 30] A drawing showing supporting portion 54 of image display system 170 of a fourth embodiment, as viewed from above.

FIG. 30 is a drawing illustrating supporting portion 54 of image display device 170, as viewed from above.

Basically, to make the user not feel the weight of image display portion 52, it should be structurally addressed such that image display portion 52 smoothly follows the face in response to the movement of the face. Thus, as shown in FIG. 30, a magic hand technique is introduced to supporting portion 54. This magic hand can be driven in the directions of x, y, and θz in FIG. 30. Thus, angle adjustment can be easily performed.

As shown in FIG. 30, in-horizontal-plane drive portion 76 is a mechanism which, like a magic hand, has angle adjustment mechanisms at cross portions CR, in which each of the members constituting in-horizontal-plane drive portion 76 is rotational movably coupled with a corresponding member, and, thus, which is expandable and contractible. In-horizontal-plane drive portion 76 is provided, at its one end opposite to the other end thereof where image display portion 52 is attached, with counterbalance portion 171. Since the ratio of the distance between supporting column 57 and counterbalance portion 171 and the distance between supporting column 57 and image display portion 52 is p to q, the ratio of moment is p to q in the case of the same weight. Since the ratio of the weight of counterbalance portion 171 including in-horizontal-plane drive portion 76 ranging from the supporting column to counterbalance portion 171 and the weight of image display portion 52 including in-horizontal-plane drive portion 76 ranging from the supporting column to the suspending position of image display portion 52 is q to p, the actual moment to supporting column 57 is constant by the relation of pq=qp, irrespective of the expansion and contraction of in-horizontal-plane drive portion 76. For this reason, when with a ball bearing or an air bearing being used, the operation of the coupling of each of cross portions CR and the operation of the rotation shaft of supporting column 57 can be smoothly performed, the magic hand can be driven in the directions of x, y, and θz while the user scarcely feel load. Further, by virtue of this mechanism, the rigidity of supporting column 57 is not required to be made so high, and vibrations can be also suppressed. Further, by this, a configuration through which, for example, the risk that the main body falls is highly likely to be avoided is realized.

It is to be noted that when introducing such magic hand technique, the image display device is provided with a detector portion that detects the setting condition such as levelness degree or vibration, and the angle adjustment mechanisms are provided with braking mechanisms that suppress rotational movements. And, when the setting condition has significantly deteriorated (in-flight air pocket earthquakes, etc.), the expansion and contraction of in-horizontal-plane drive portion 76 is suppressed by the braking mechanisms. More specifically, the angle adjustment mechanisms are provided with well-known braking mechanisms that are controlled by signals from the detector portion. By such controlling, danger, an accident, etc. can be avoided.

Figure 31:
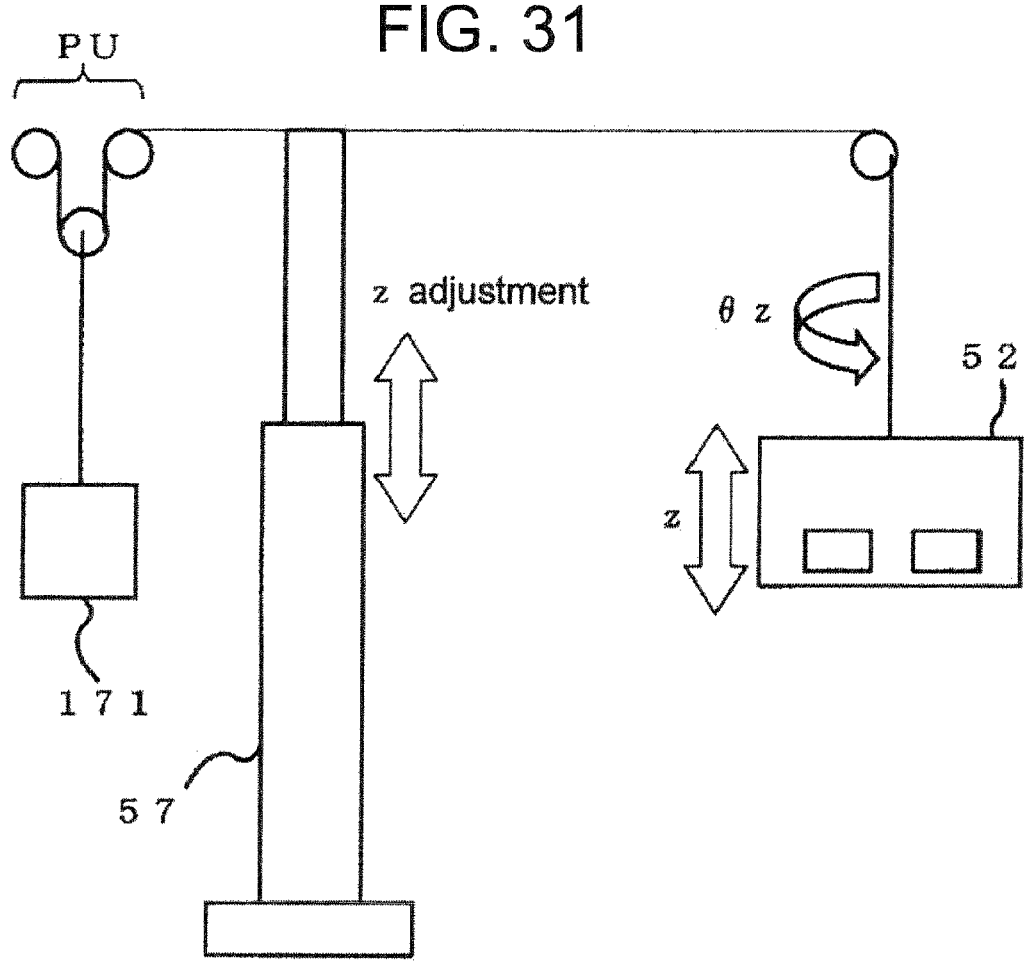
[FIG. 31] A drawing illustrating, with respect to supporting portion 54 of image display system 170 of the fourth embodiment, only the configuration of a z-direction movement mechanism.

Further, an elevator technique is used for the position adjustment of image display portion 52 in the up and down direction. FIG. 31 illustrates, with respect to supporting portion 54 of image display device 170, only the configuration of the z-direction movement mechanism.

As shown in FIG. 31, like an elevator, it is structured such that when the weight ratio of counterbalance portion 171 and image display portion 52 is q to p, balance is kept by using pulley PU. For example, in the case of q:p=2:1, the use of pulley PU, a pulley type as illustrated in FIG. 31, will suffice. Supporting column 57 can be moved up and down by hand, and it is configured such that rough height setting thereof can be performed in accordance with each of the states in which the user is lying, sitting, or standing. On the other hand, when the user moves the face up and down in a given state, image display portion 52 also moves up and down by about from 2 to 30 cm. In this regard, when with a ball bearing or an air bearing being used, the operation of the rotation shaft of the above-described pulley PU can be smoothly performed, the image display portion can be driven in the z-direction while the user scarcely feel load.

As described above, in accordance with the fourth embodiment, the image display device is provided with a display portion that displays images and with a supporting portion that supports the display portion at its portion that is not in contact with a user and that is expandable and contractible. Thus, the image display portion can be made to follow the movement of the face of the user, while alleviating the image display portion's weight felt by the user. Further, it is preferable that, as with the first embodiment, the face contact portion is provided in contact with the face sides of the user and sandwiches the face of the user, and the display portion is movable, with a portion of the face contact portion being a point of support, in accordance with the movement of the head of the user. By doing so, the image display portion can be made to follow the movement of the face of the user substantially completely.

Further, in accordance with the fourth embodiment, the image display device is provided with a setting condition detection portion that detects the setting condition and with a supporting portion control portion that suppresses the expansion and contraction changes of the supporting portion when the setting condition detection portion detects that the setting condition has significantly deteriorated. Thus, danger, an accident, etc. can be avoided.

It is to be noted that the invention described by the fourth embodiment may be applied to the first embodiment, to the second embodiment, to the third embodiment, or to each of the embodiments described later.

<Fifth Embodiment>

Image display system 180 of a fifth embodiment has a configuration almost similar to those of the second embodiment and the third embodiment. Thus, in the following, description will be made by using symbols similar to those of the second embodiment and the third embodiment.

In the following, characterizing portions of the fifth embodiment will be described.

While in the second embodiment the description has been made by using the image display system provided with the reclinable chair portion 55, in this embodiment, an image display system that is usable even in the case where it is supposed that the ground inclines, for example, in the case where the system is applied to a chair in an airplane, will be further described.

Figure 32:
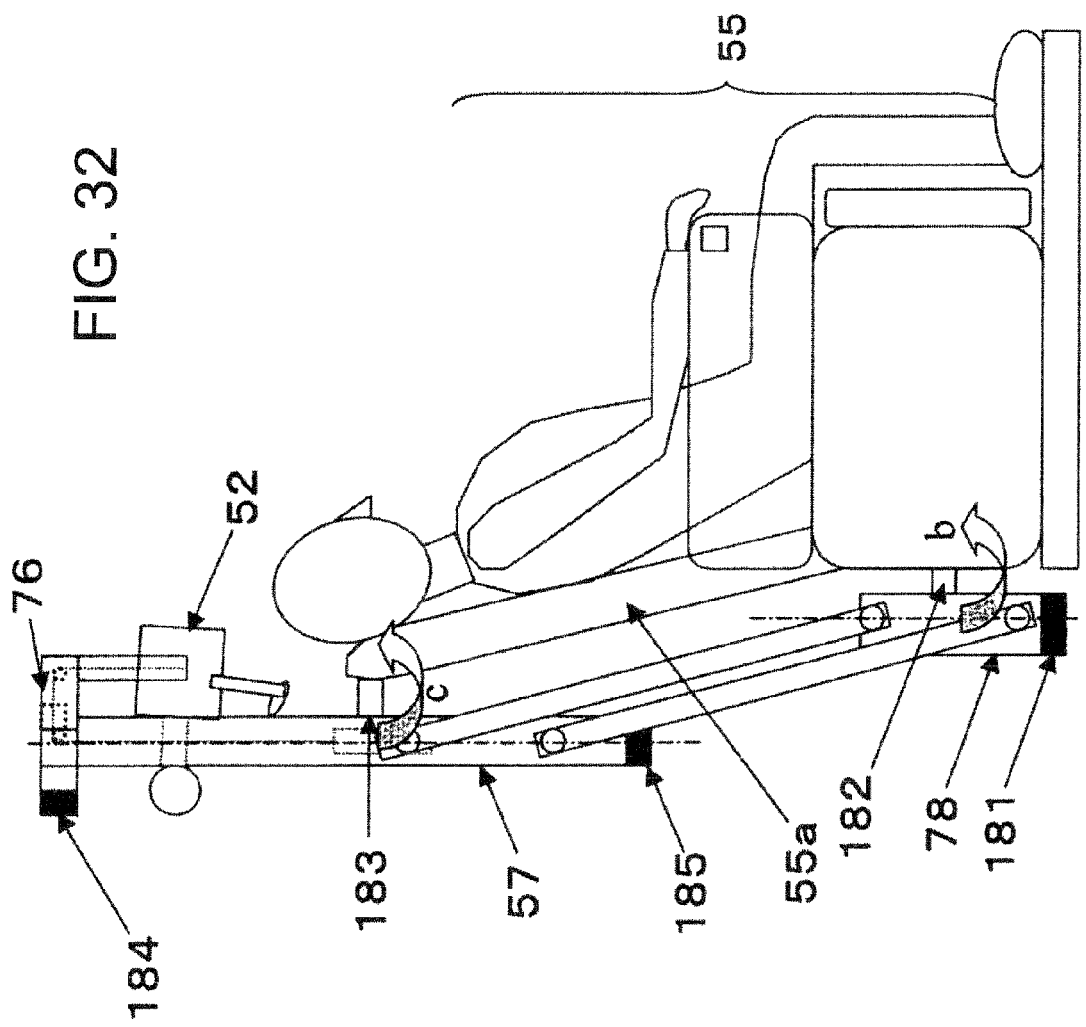
[FIG. 32] A sketch drawing of image display system 180 of a fifth embodiment, as viewed from the side direction.

FIG. 32 is a sketch drawing of image display system 180, as viewed from the side direction. In image display system 180, to chair portion 55 is provided fixing member 182 that is expandable and contractible in the direction of arrow b, and to backrest portion 55a is provided fixing member 183 that is expandable and contractible in the direction of arrow c. And, via those fixing members 182 and 183, the parallel link mechanism (see 69-71 in FIG. 27) and the chair portion are fixed to each other.

Further, to the under surface of parallel link fixing portion 78 is attached weight 181. And, to the upper portion of supporting column 57 and in the opposite direction side relative to image display portion 52 is disposed counterweight portion 184 to create balance to image display portion 52. The counterweight portion 184 can be so disposed because the XY-stroke over the chair small and thus because the counterweight portion 184 does not form an obstacle in view of space even it is disposed there. Further, the reason that the counterweight is disposed is that when in a vehicle, the balance realized by counterweight portion 184 were not kept, expansion and contraction of in-horizontal-plane drive portion 76 would occur when the vehicle inclines, which would be dangerous. Further, to the lower end of supporting column 57 is attached weight 185.

Figure 33:
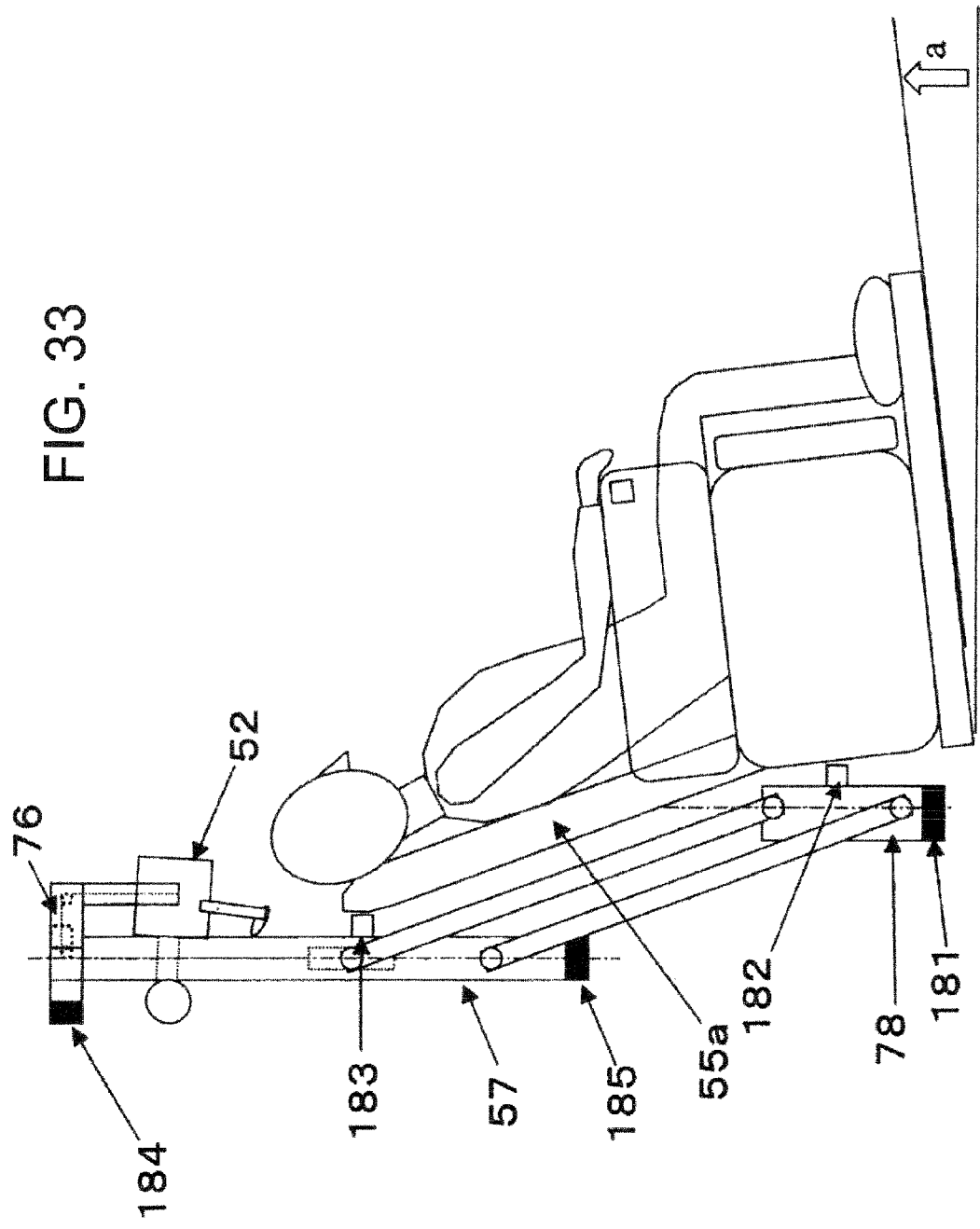
[FIG. 33] A sketch drawing of image display system 180 of the fifth embodiment.

Further, the above-described fixing member 183 is disposed at the position where it is balanced between the pair of counterweight portion 184 and image display portion 52 and weight 185 and plays a role of stably maintaining supporting column 57 to be vertical. Here, FIG. 33 is a drawing that illustrate the situation in which the floor has inclined when, for example, an airplane is taking off.

In such a case, by virtue of the effect of weight 181, parallel link fixing portion 78 tries to keep vertical relative to a horizontal plane. Thus, fixing member 182 adjusts the distance and inclination between parallel link fixing portion 78 and the chair so as to address the floor inclination indicated by arrow a, and in concert with that motion, supporting column 57 is also kept to be vertical by the parallel link. Since, as a result thereof, in-horizontal-plane drive portion 76 is maintained to be horizontal, the danger induced by the inclination of in-horizontal-plane drive portion 76 does not occur. Further, by controlling such that when the supporting column happens to incline because of steep inclination occurring in the case of, e.g., an airplane, in-horizontal-plane drive portion 76 is locked by a stopper which inactivates the movement of in-horizontal-plane drive portion 76, the system can sufficiently address sudden condition changes that occur, e.g., when the airplane is hit by an air pocket. It is to be noted that the entirety of weight 181, weight 185, and counterweight portion 184 corresponds to "vertical balance portion" referred to in the claims.

Moreover, as shown in FIG. 34, there are cases where supporting column 57 cannot be set to be vertical also when, for example, this system is used in an ordinary-house. When supporting column 57 is vertical as shown in FIG. 34(1), there arises no problem; however, when supporting column 57 is set aslant as shown in FIG. 34(2), weight 58 comes into contact with the inner wall of supporting column 57, which makes smooth movement difficult. In the case of a small inclination of supporting column 57, processing the portion of the inner wall with which the weight may come into contact to be a smooth surface will suffice. However, in the case where the system is, for example, a type not provided with the above-described counterweight portion 184, with in-horizontal-plane drive portion 76 being inclined as shown in FIG. 34(2), the expansion and contraction of in-horizontal-plane drive portion 76 acts in a certain direction, and thus the user feels a sense of discomfort that the user is pulled in the direction when the image display portion is attached to the user's face.

In order to improve this situation, it may be configured such that as shown in FIG. 34(3), by providing angle adjustment mechanism 186 on the base of supporting column 57, supporting column 57 is kept vertical. Alternatively, it may be configured such that, as shown in FIG. 34(4), by providing angle adjustment mechanism 187 between supporting column 57 and in-horizontal-plane drive portion 76, in-horizontal-plane drive portion 76 is kept horizontal.

Also, it may be configured such that by providing, in angle adjustment mechanism 186 or angle adjustment mechanism 187, a level degree detector and a drive means that drives the angle adjustment mechanism, angle adjustment is automatically performed in respect to inclination.

As described above, in accordance with the fifth embodiment, the image display system comprises a display portion that displays images, a supporting portion that supports the display portion at its portion that is not in contact with a user, a face contact portion that is supported by the image display portion and comes into contact with the face of the user, and an adjustment portion which is provided on a portion of the supporting portion and which adjusts at least either the setting angle of the supporting portion relative to a floor portion or the setting angle of the display portion relative to the floor portion. Thus, the image display system is usable even in the case where it is supposed that the ground inclines, for example, in the case where the system is applied to a chair in an airplane.

Further, in accordance with the fifth embodiment, the supporting portion is provided with a vertical balance portion having weights. Thus, also in this case, the image display system is usable even in the case where it is supposed that the ground inclines, for example, in the case where the system is applied to a chair in an airplane.

It is to be noted that the invention described by the fifth embodiment may be applied to image display device 1 of the first embodiment, to image display system 50 of the second embodiment, to image display device 100 of the third embodiment, to image display device 170 of the fourth embodiment, or to each of the embodiments described later.

<Sixth Embodiment>

Image display device 190 of a sixth embodiment has a configuration almost similar to that of image display device 1 of the first embodiment. Thus, with illustration and configuration description thereof being omitted, description will be made hereinafter by using symbols similar to those of the first embodiment.

By using image display device for a home-theater, high-definition images can be viewed with a high resolution and a higher sense of reality can be enjoyed.

Figure 35:
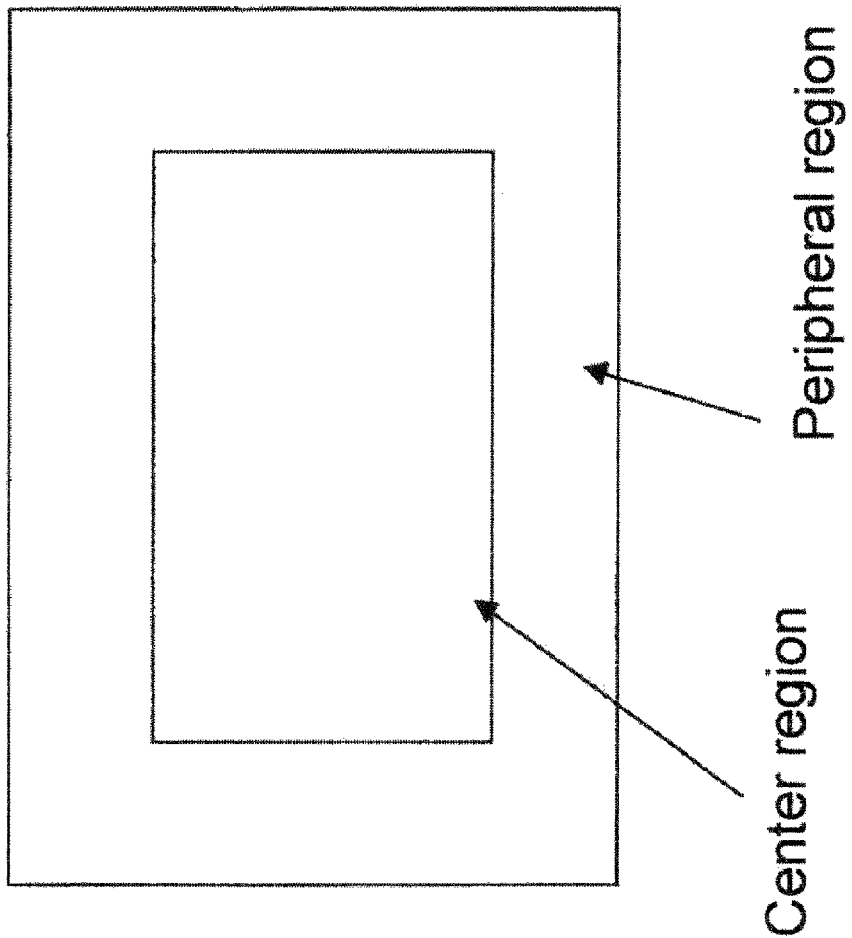
[FIG. 35] A drawing illustrating the images displayed by image display device 190 of a sixth embodiment.

In this embodiment, as with the FIG. 9 of the first embodiment, two images are combined and divided to supply information to the both eyes. In that process, the image is projected with a predetermined size and with a high-definition in the center region shown in FIG. 35, and the image is projected with a low-definition in the peripheral region. With respect to the image of the peripheral region, it is controlled such that by making its center portion, the portion that overlaps with the image of the center region, an inky black image (originally, displayable), no sense of discomfort is induced when the images are combined.

Next, consideration will be given to the appropriate size of the center region. Generally, the number of pixels of a liquid crystal device is often considered in terms of its image screen size; This invention is directed to a system in which virtual images are viewed through eyepiece lenses, and description will be made from the viewpoint of the relationship between the field of view and the dot size therein (which means the number of pixels of a liquid crystal device) and of the eyesight. Under ordinary circumstances, the eyesight is generally determined by testing, through an eyesight test to what degree one has relative to the critical resolution; however, in the case of a liquid crystal device, the eyesight is defined by determining whether the gaps between pixels can be resolved by human eyes. Thus, an experiment using transmission type liquid crystal devices has been conducted, and the data based on the results thereof will be shown next.

FIG. 36 is a table in which with a display device having an image screen size of 52 inches (diagonal length) being placed and with the number of pixels and the field of view angle being changed, the eyesights by which the dots displayed on the display device are visible are written. "The number of pixels per unit area" means the number of pixels in the horizontal direction of the display device having an aspect ratio of 16:9. Further, when the display device is observed from a position at a distance of, e.g., 2 m, the field of view angle in the diagonal direction becomes approximately 36.546 degrees, and the field of view angle becomes approximately 32.111 degrees.

Regions a-d, in the table, indicated by heavy lines are defined by determining by the experiment "whether dots are visible" instead of determining whether the above-described "gaps between pixels" are visible. Further, the determination is based on the following categories: a="dots in the displayed image are not visible." b="dots in the displayed image are visible, but when the entire image is viewed, one scarcely feels uneasy," c="dots in the displayed image are visible, but when accustomed, one does not feel uneasy," and d="the resolution is low, and the image screen size should be made smaller."

As a result of this, when the above-described number of pixels is made equal to or larger than 1280, high-definition images up to 108.3 degrees (images of a diagonal field of view angle of 120 degrees) can be viewed with a sufficient sense of reality. Further, it can be seen that when the above-described number of pixels is made 1920, images up to 53 degrees can be enjoyed without being aware of dots.

However, the data are based on transmission type liquid crystal devices, and since it is known that in reflection type liquid crystal devices, the gaps between pixels are still narrower when compared at the same number of pixels, the gaps between pixels of reflection type liquid crystal devices are more invisible even when the field of view angle is made larger. It can be understood that it can be arranged such that the size of the center region is first determined based on the liquid crystal devices to be used, and then the size of the peripheral region is determined. It is to be noted that, regarding the peripheral region images, it is said that the field of view angle recognizable by human eyes is 180 degrees; however, as a result of the experiment, it has been shown that a field of view angle of more than 90 degrees would provide a considerable sense of being absorbed, and thus configuring such that a diagonal field of view angle of about from 90 to 120 degrees is obtained would suffice. Regarding the peripheral region images, as shown in FIG. 36, with respect to the field of view angle range of 79.4 to 108.3 degrees, many of them are categorized as "the resolution is low, and the image screen size should be made smaller" when the number of pixels is small. However, while it is desirable that to display these portions, high-definition images are used, there is also the possibility that low-resolution devices are used in view of cost and because the portions are not used so much. In this case, it is desirable that control by which the color thereof is tuned with the image of the center region or that letters and figures are displayed as large as possible.

Figure 37:
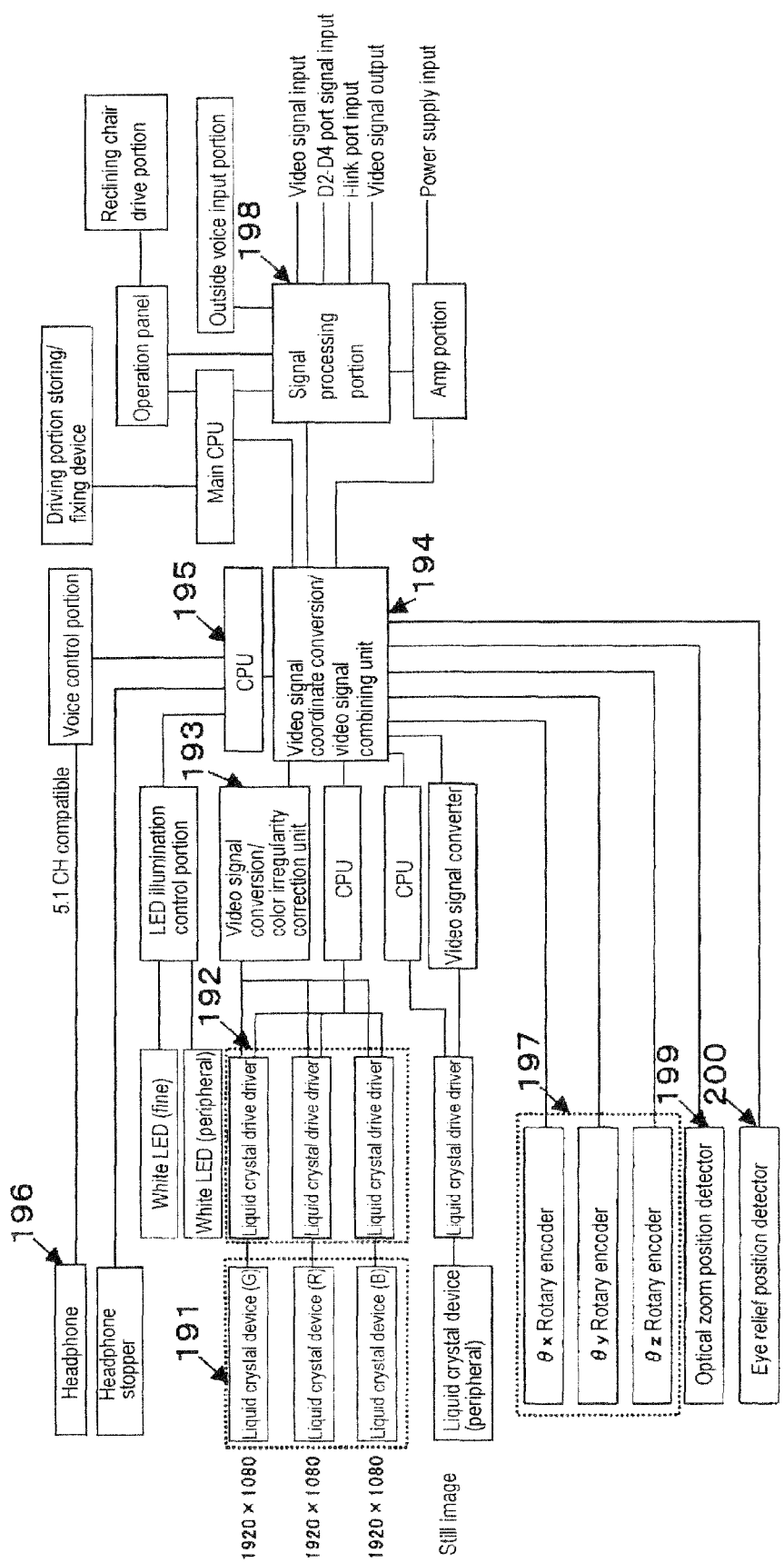
[FIG. 37] A drawing illustrating the control system of image display device 190 in the sixth embodiment.

The control system for outputting center region images and peripheral region images will be outlined next, referring to FIG. 37. In FIG. 37, a control method using three RGB LCDs is illustrated, as an example. Here, as an option, description will be made based on a control system outline drawing in which peripheral region images are displayed as still images. (Of course, three RGB LCDs can be also applied to the peripheral region; in that case, supposing that the same set of 1920×1080 liquid crystal devices as those for the center region images is present would suffice.)

With respect to the 1920×1080 liquid crystal devices RGB191, each of the images therefrom are combined with each other by the optical system, and the combined image is outputted as a color image. Each of crystal devices RGB191 is controlled by each of liquid crystal device drivers 192 that control liquid crystal ON/OFF, and when an image is outputted as a color image, it is structured such that with the image being controlled by video signal conversion/color irregularity correction unit 193 that converts high-definition video signals into liquid crystal ON/OFF control, a color image as a sharp color image is outputted. However, this high-definition image is an image controlled only for reproducing with fidelity an original image; as a front end processor, video signal coordinate conversion/video signal combining unit 194 that electrically resizes video sizes, shifts an image in a predetermined direction, combines images, and generates peripheral region images in accordance with a predetermined condition is located. CPU 195 that controls video signal coordinate conversion/video signal combining unit 194 also controls head phone output portion 196, performs switching control by which the head phone output is switched to information from outside voice input portion in an emergency, and processes, for example, signal processing portion 198 that reads output values from θx-θy-θz rotary encoder 197 (provided to, for example, universal joint portion 63 shown in FIG. 25 of the second embodiment) that is attached to the face attaching portion, detects the relative angle between the ground and the face, and, based on that information, processes the image by using the above-described video signal coordinate conversion/video signal combining unit 194, optical zoom position detection portion 199, and eye relief detection portion 200; and thus it is designed such that comfortable images are provided.

While this control system is set to image display portion 52, a control system, a control panel, etc. that actually control high-definition images from the outside, driving of the reclining chair, and driving of the fixing mechanism provided for the storage and security of image display portion 52 are all set to the chair side. Here, the communication between image display portion 52 and chair portion 55 is performed mainly by radio transmission, optical fibers, etc., to decrease the number of hardwirings as far as possible; only with respect to the power supply portions, hardwiring passes through the balance weight storage pipe portion to realize hardwiring connection.

The control system has been briefly described in the above. Next, referring to FIGS. 38-42, description will be made on the image processing that is actually performed by the above-described video signal coordinate conversion/video signal combining unit 194.

FIG. 38(A) shows an outputted image of a center region image; FIG. 38(B) shows an outputted image of a peripheral region image. While the display optical system that displays the center region image can originally display it with the same size as that of the peripheral region image, the center region image is reduced by an optical zoom mechanism and is made to have the size of the center region image. In other words, the display pixel pitch itself is also reduced, and the pixel cannot be recognized by the eyes. This processing is performed so that the user will not be aware of pixels in the field of equal to or less than a field of view angle of 60 degrees where the user is relatively likely to move the eyes. However, since if not additionally processed, the image displayed in the screen also becomes small, the image is displayed with the image being enlarged so that it has the same size as the peripheral region image. When there is not an intermediate value as dot, an interpolating processing is of course applied based on the peripheral dot value. FIG. 38(A) shows the image experienced the above-described processings.

To combine these images by the combining optical system and then to project a combined image as shown in FIG. 38(C) to the right and left eyes is the basic image processing method of the present invention. In this case, the both images are optically and electrically adjusted so that they coincide with each other and are displayed as if the user is viewing the combined image on a single display. However, in the center portion is projected a high-definition image with fine pixels, and in the peripheral portion is projected a low-definition image of which pixels are recognizable.

Figure 39:
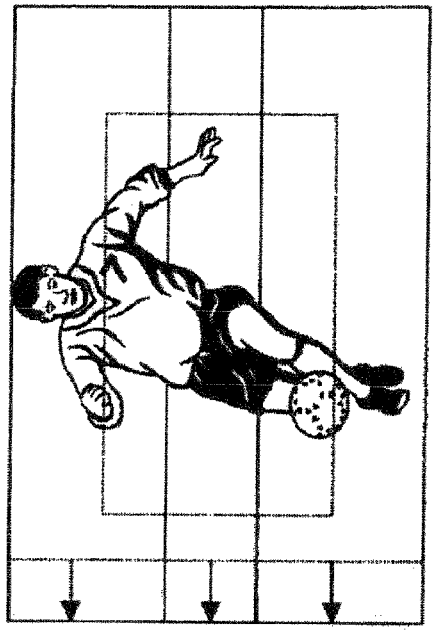
[FIG. 39] Drawings Illustrating the images displayed by image display device 190 in the sixth embodiment.
Figure 39:
Figure 39:
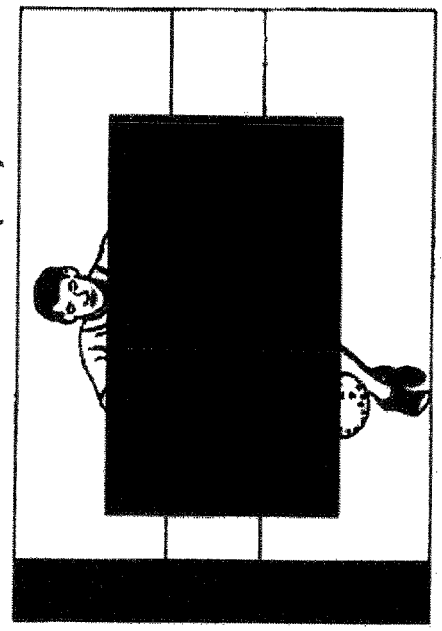

Next, FIG. 39 shows the change of the display image when since the soccer player image shown in FIG. 38 was located in the left side from the center, the user tries to see the soccer player in the image center by turning his or her head in the left direction. The rotation of the user's head is determined by the θz-direction output value of the above-described θx-θy-θz rotary encoder 197. Since, as described above in connection with FIG. 36, the largeness of the field angle can be substituted with the field of view angle, both of the entire images of FIGS. 39(A) and 39(B) are shifted in the right direction by rotation angle detected by θx-θy-θz rotary encoder 197.

In this case, the image data of course lacks data corresponding to the left-side, black portion of FIG. 39(B), and when the image is outputted, the sense of reality is impaired. To address this problem, as the image processing method of the present invention, the information of the pixels adjacent to the black portion is stored, and the left black portion is substituted with the same thing as the information, with the same thing being extended. When viewing the center, the resolution and attention degree of human eyes relative to peripheral images has extremely decreased, and thus so long as continuous images and colors exist there, almost no sense of discomfort is induced. By this method, even if there exits no image data of the portion, a sense of reality can be enjoyed by generating images by such method.

However, among image contents, there are ones that use the image screen fully; in such a case where the above-described soccer player further moves from one end to the other, there arises the possibility that the user gets tired all the more because the screen is too large. So, in the present invention, the mode in which an image is displayed as a full image as shown in FIG. 40(A) can be switched to the mode in which the image is displayed only in the center region. Referring to FIGS. 40(B) and 40(C), description will be made on the case where the image display device is switched to the mode in which the image is displayed only in the center region.

Since the original center region image is an image optically reduced, such image is an image accompanying no peripheral image as shown in FIG. 40(B) when supplied with only the normal output information. The center has a field of view angle of 60 degrees, the image itself can be enjoyed sufficiently; however, since there exists no peripheral image, the user feels as if he or she is in a movie theater. However, as described above, in the present invention, the information of the pixels adjacent to the black peripheral portion is stored, the left black portion is substituted with the same thing as the information, with the same thing being extended, and the same thing is displayed in the peripheral region. This state is illustrated by FIG. 40(C), and, as described above, the resolution and attention degree relative to the peripheral images has extremely decreased, and thus so long as continuous images and colors exist there, almost no sense of discomfort is induced.

By this method, even if there exits no image data of the portion, a sense of reality can be enjoyed by generating images by such method. Further, in FIG. 40(D) is shown the change of the display image when the user tries to see the soccer player in the image center by turning his or her head in the left direction. The rotation of the user's head is determined by the output value of θx-θy-θz rotary encoder 197. The image is shifted by image processing in the right direction by rotation angle detected by θx-θy-θz rotary encoder 197; the information of the pixels adjacent to the portions lacking images is stored, and the same thing as the information is used, with the same thing being extended. By this the user can not only enjoy the entire image, but also enjoy a sense of reality as if he or she is on the spot.

Figure 40:
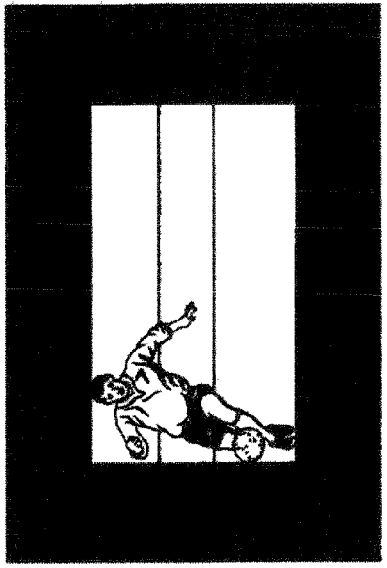
[FIG. 40] Drawings illustrating the images displayed by image display device 190 in the sixth embodiment.
Figure 40:
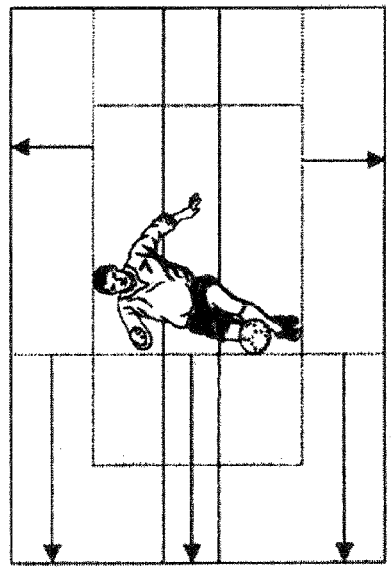
Figure 40:
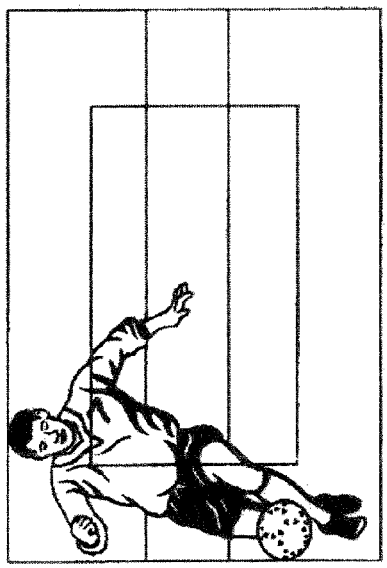
Figure 40:
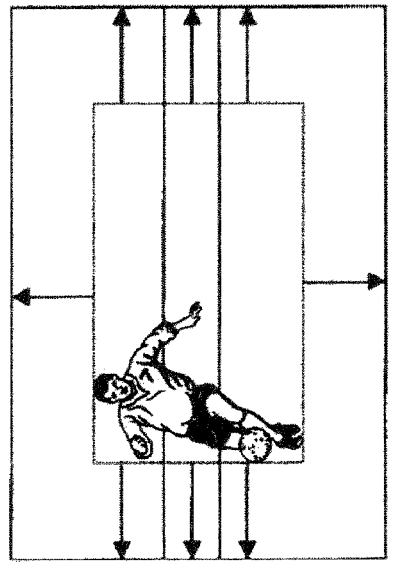

In FIG. 40, the method of extending adjacent image information has been adopted; as another method of using the image display device, it may also be configured such that high-definition images are displayed basically only in the center region, and other information is provided in the peripheral region.

Figure 41:
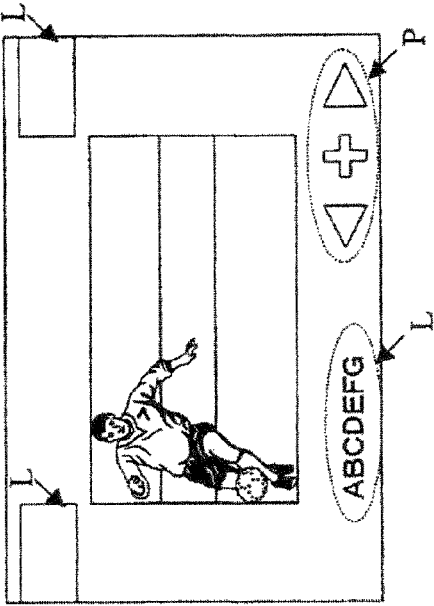
[FIG. 41] Drawings illustrating the images displayed by image display device 190 in the sixth embodiment.
Figure 41:
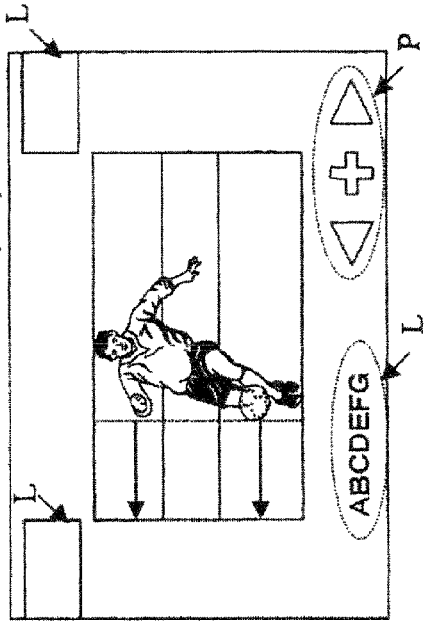
Figure 41:
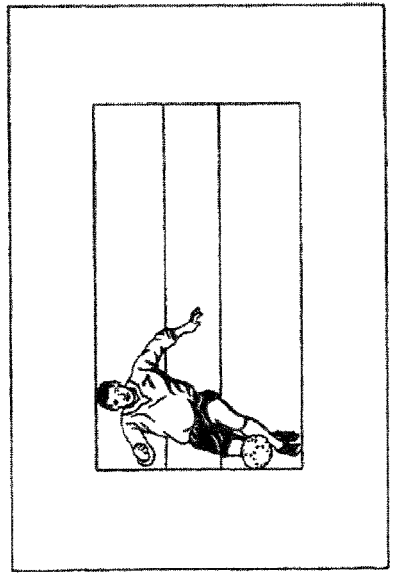
Figure 41:
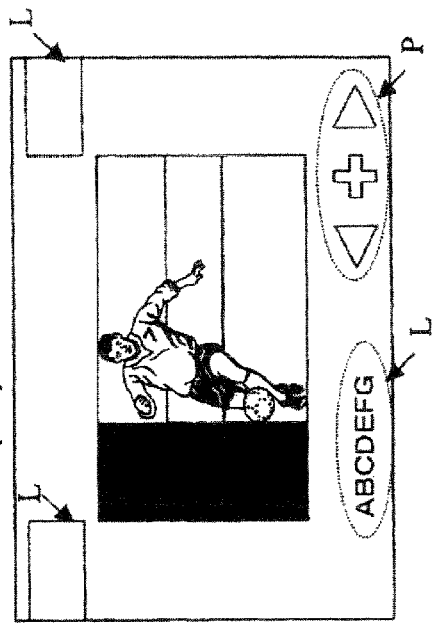

In FIG. 41, the image display device is, as shown in FIG. 41(A), switched to the image display mode in which an image is displayed only in the center region, and, as shown in FIG. 41(B), character information L, operation panel P, etc. are displayed in the peripheral region. As character information L, information services of other TV programs, teletext broadcasting information, etc. can be conceived. Regarding the operation panel, it is preferable that for example, a pointing device is displayed on the operation panel, and makes it operable with an operation member, e.g., a mouse.

Further, it may also be configured such that the image display device is operated by combining the operation member, such as a mouse, and the recognition of the user's movement through the above-described θx-θy-θz rotary encoder 197.

For example, it may also be configured such that by selecting the center region with the operation member and by performing an action of turning the head, the image display device is switched to the above-described mode in which the image is shifted (FIG. 41(C)) or switched to the mode in which while the image being shifted (FIG. 41(D)), adjacent pixel information is extended.

Figure 42:
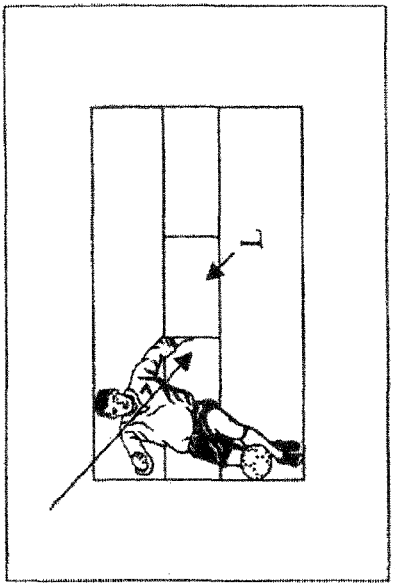
[FIG. 42] Drawings illustrating the images displayed by image display device 190 in the sixth embodiment.
Figure 42:
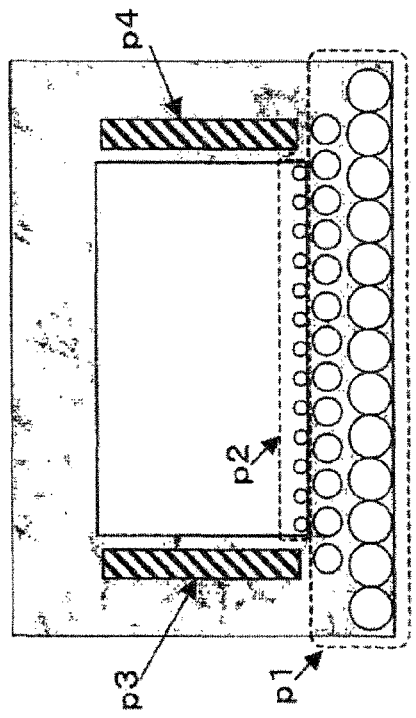
Figure 42:
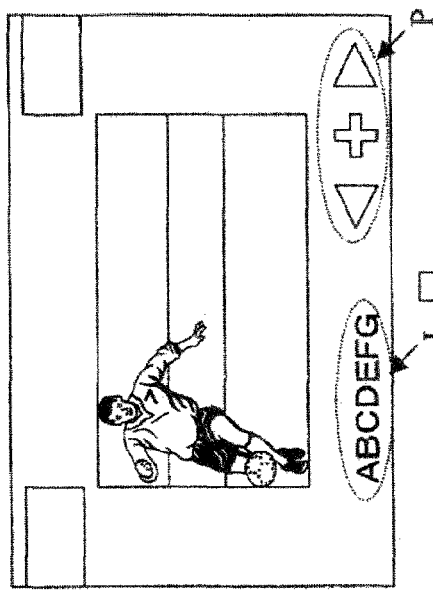
Figure 42:
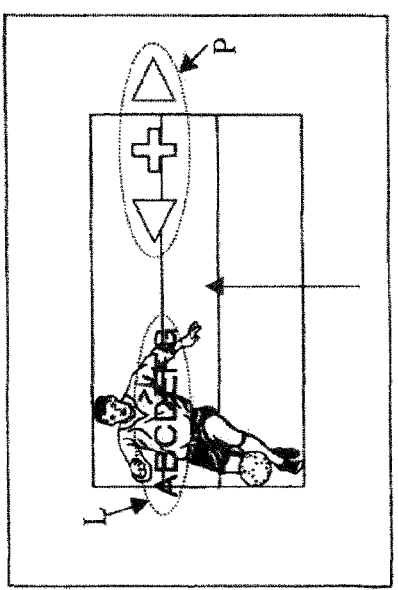

Further, it may also be configured such that selecting the peripheral region with the operation member and by performing an action of turning the head, the image display device is switched to a mode in which character information L, operation panel P, etc. shown in FIG. 42(A) are shifted to the center region (FIG. 42 (B, C)). This mode takes into account of the fact that since peripheral images are located outside a field of view angle of 60 degrees, it is fatiguing for the user to continue looking at such portion by moving his or her eyes by a large amount: FIG. 42(B) shows the state in which with the head being directed to the upper-left direction, other TV programs' information that was on the upper-left has been shifted to the screen center. Of course, the amount by which the head has been moved in the upper-left direction can be calculated from the θz-direction rotation angle measured by θx-θy-θz rotary encoder 197, and thus this mode is useful when, for example, the user takes a look at other programs while viewing center images without moving his or her eyes. Similarly, FIG. 42(C) shows the state in which with the head being directed to the downward direction, the character information and operation panel image that were on the lower portion have been shifted to the screen center. Of course, the amount by which the head has been moved in the downward direction can be calculated from the θx-direction rotation angle measured by θx-θy-θz rotary encoder 197, and thus the user can take a look at the character information or operate operation panel image. The reason why such mode can be realized is that since it is configured such that the peripheral region image can originally display its center image (in normal conditions, displayed as black), overlapping image outputs can be performed with ease.

Further, in FIG. 42(D), as peripheral images, predetermined images are outputted in a state of being defocused. This method takes advantage of the human memory that even if one cannot recognize what the peripheral images are, he or she thinks that defocused images are located in the distance and that sharp images are located at a short distance; and by virtue of the peripheral defocused images, the user can have a sense of depth with respect to the center image.

Further, since the peripheral images are projected in a state of being defocused, the user's attention can be easily directed to the center image, and thus, the sense of being absorbed felt by the user can be further improved.

Further, in this case, it may also be configured such that, as shown in FIG. 42(D), an image having predetermined patterns p1 of which sizes become smaller as they near the center region is displayed in the peripheral region image. In FIG. 42(D), those marks are shown only with respect to the lower region among the peripheral regions. By performing such a display, still enhanced perspective can be supplied to the user. Further, as shown in FIG. 42(D), by displaying, along the frame of the center region image, the above-described predetermined patterns p2 that are smaller than patterns p1, perspective can be further improved. In particular, by displaying marks that are not interrupted and are positioned in both of the center region image and the peripheral region image, natural perspective can be supplied to the user.

In addition, since, as described above, the center region image is projected so that it becomes a clear image, and the peripheral region images are projected so that they are in a state of being defocused, perspective can be supplied more effectively. Further, as shown in FIG. 42(D), an image having, along the left end and the right end of the center region image, column-like patterns p3 and p4 is displayed in the peripheral region image. Since by displaying such patterns, the user's attention can be drawn to the center region, the sense of being absorbed felt by the user can be further improved.

As described above, in accordance with the sixth embodiment, the image display device comprises a display portion that displays images, a supporting portion that supports the display portion at its portion that is not in contact with a user, and a face contact portion that is supported by the image display portion and comes into contact with the face of the user, and the display portion, when it displays an image, can change the content of the center region in the projection area and the content of the peripheral region in the projection area and performs either a first display in which the image is projected with a high-definition in the center region and the image is projected with a low-definition in the peripheral region or a second display in which the entirety of the image is projected with a high-definition in the center region and an image different from the image is projected with a low-definition. Thus, the display can be performed in accordance with the user's usage or taste.

Further, in accordance with the sixth embodiment, the display portion, when it performs the second display, displays, in the portion corresponding to the peripheral region, an image having information different from the image displayed in the portion corresponding to the center region. Thus, in accordance with the user's desire, a sense of being absorbed can be given to the user at the time of viewing.

Further, in accordance with the sixth embodiment, the display portion, when it performs the second display, displays, in the portion corresponding to the peripheral region, an image having predetermined patterns of which sizes become smaller as they near the center region. Thus, images that give perspective to the user and are provided with a sense of reality can be provided.

Further, in accordance with the sixth embodiment the display portion displays, in the portion corresponding to the center region, an image having in at least a portion of the periphery of the portion corresponding to the center region patterns that are similar to and smaller than the predetermined patterns that the peripheral region has. Thus, more natural perspective can be supplied to the user.

Further, in accordance with the sixth embodiment the display portion projects, in the peripheral region, an image in a defocused condition. Thus, the user's attention can be easily directed to the center image, and the sense of being absorbed felt by the user can be further improved.

Further, in accordance with the sixth embodiment, the face contact portion is provided with a movement detection portion that detects the movement of the face of the user, and the display portion, in accordance with the movement of the face of the user detected by the movement detection portion, shifts, in the portion corresponding to the center region, the display region of the image to be displayed. Thus, the sense of discomfort felt by the user at the time of using the device can be alleviated.

Further, in accordance with the sixth embodiment, the display portion, when it performs the second display, displays, as the peripheral image, information relating to the operation by the user. Thus, with the display area being effectively utilized, information useful to the user can be provided.

Further, in accordance with the sixth embodiment, the face contact portion is provided with a movement detection portion that detects the movement of the face of the user, and the display portion, in accordance with the movement of the face of the user detected by the movement detection portion, shifts either the display region of the image to be displayed in the portion corresponding to the center region or the display position where the information relating to the operation by the user is displayed. Thus, the sense of discomfort felt by the user at the time of using the device can be alleviated, and, at the same time, the operability can be improved.

It is to be noted that the invention described by the sixth embodiment may be applied to image display device 1 of the first embodiment, to image display system 50 of the second embodiment, to image display device 100 of the third embodiment, to image display device 170 of the fourth embodiment, to image display system 180 of the fifth embodiment, or to each of the embodiments described later.

<Seventh Embodiment>

Image display device 120 of a seventh embodiment has a configuration almost similar to that of the first embodiment image display device 1 having been described referring to FIG. 1. In this embodiment, as shown in FIG. 43, at least two sets of image display devices 120 are set in the vicinity of each other and are used.

Figure 43:
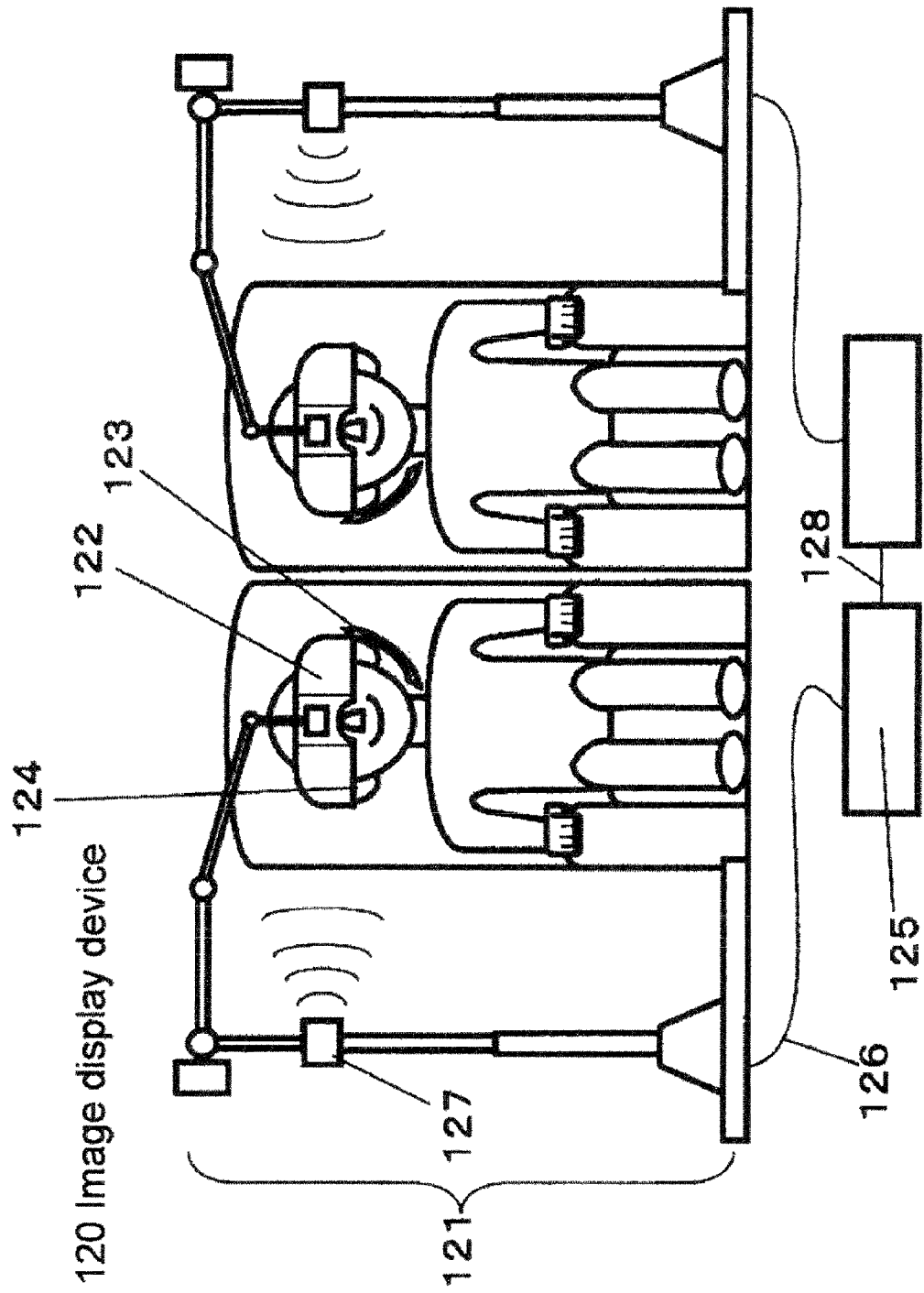
[FIG. 43] A sketch drawing of image display device 120 in a seventh embodiment.

In FIG. 43, the weight of image display portion 122 of the left side image display device 120 is supported by supporting portion 121 in a manner that the image display portion is suspended by the supporting portion that is supported by the floor; to image display portion 122 are provided voice input portion 123 to which voice is inputted and sound output portion 124 which outputs sound information. Image processing device 125 is a DVD player, a BS tuner, a computer main body, or the like; information therefrom is, as radio transmission information sound data or image data, outputted, by infrared light emitting portion 127 which is attached to supporting portion 121 via cable 126, to infrared light receiving portion, not shown, attached to image display portion 122. The outputted information can supply to the user the image and sound having been processed by image processing device 125. Since the right side image display device 120 is also similarly supplied with sound information and image information from the right side image processing device 125, each of the two users can originally enjoy completely independent image and sound.

Since the system according to this invention is intended for personal use, there are few cases where, as shown in FIG. 1, the image display devices are set in the vicinity of each other in a room; however, a lot of users feel surrounded when they view images alone, and thus a possibility in which, as shown in FIG. 1, two sets of the image display devices are placed near to each other, and the users, while enjoying conversation or between-meal eating, appreciate separate images may well be conceived. So, this embodiment is configured such that image processing devices 5 of the right and left image display devices 120 are connected to each other by voice transmission cable 128 (radio transmission being also applicable), and one user's speaking voice from voice input portion 123 is outputted from the other user's sound output portion 124 together with the primary sound information.

Further, in this embodiment, in order to prevent separate pieces of information from infrared light emitting portions 127 from mixing with each other, there are provided switches for shifting the wavelength by a predetermined frequency. By virtue of these switches, the separate pieces of information delivered by the infrared light emitting portions 127 on both sides can use separate frequency bands, and thus mixing with one another can be precluded. In accordance with this invention, it may also be realized that when borrowing a single DVD and running it by one DVD player, by coinciding the infrared light emitting frequencies with each other, image and sound information from, e.g., the left side infrared light emitting portion 127 is to be received by both of the right and left users, and as a result the two users simultaneously enjoy the same image.

As described above, in accordance with the seventh embodiment, the image display device is an image display device comprises a display portion, a sound output portion, a communication portion that, from the outside, inputs image information into the display portion and inputs sound information into the sound output portion, a supporting portion which supports the display portion at its portion that is not in contact with a user, and a face contact portion which is supported by the display portion and comes into contact with the face of the user, wherein the communication portion has, when at least two sets of the image display devices are set in the vicinity of each other and are used, a switching mechanism of infrared lights having slightly different wavelengths. Thus, when multiple sets of the image display devices are placed in the vicinity of each other, and multiple users appreciates images, the images and sounds to be appreciated do not mix with each other. In accordance with this invention, in the case where in order to make the image display portion smoothly follow the face (because when the number of hardwirings is large, it creates resistance, and smooth following cannot be realized), a mechanism for transmitting sound outputs and image displays from the image processing device by use of radio transmission such as infrared light is introduced, by using identical image display devices near to each other, identical images can be displayed on the both of the image display devices (through which multiple image display portions can be supplied with images by a single image processing device, which leads to cost reduction). However, since the image display device is first and foremost intended for personal use, when users appreciating images want to separate images, sound information or image information mix with one another. As described above, switching of infrared lights having slightly different wavelengths resolves those problems and produces the effect that the users can not only enjoy separate images but also enjoy identical images. Further, it is preferable that, as with the first embodiment, the face contact portion is provided in contact with the face sides of the user and sandwiches the face of the user, and the display portion is movable, with a portion of the face contact portion being a point of support, in accordance with the movement of the head of the user. By doing so, the image display portion can be made to follow the movement of the face of the user substantially completely.

<Eighth Embodiment>

Figure 44:
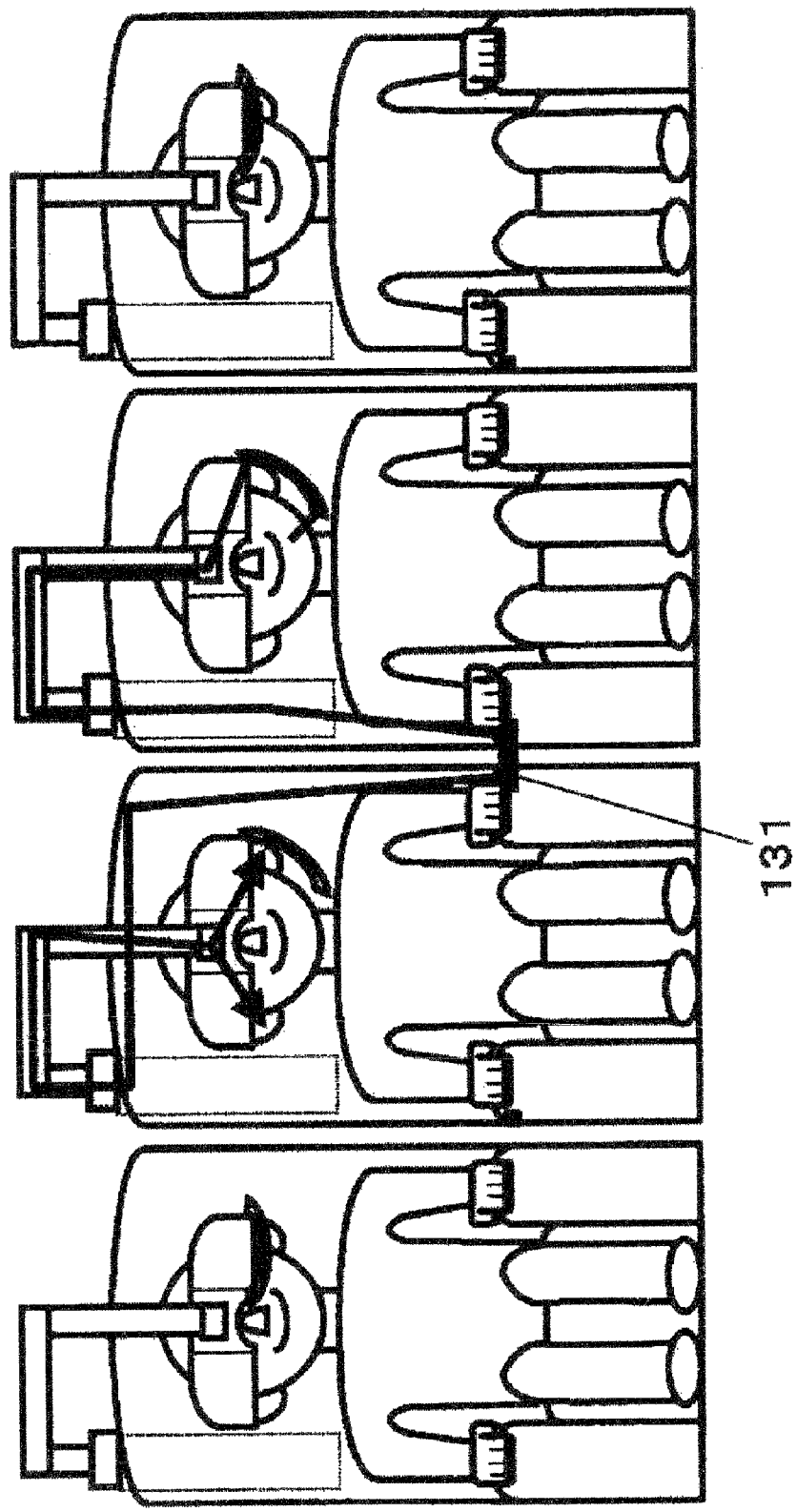
[FIG. 44] A sketch drawing of image display device 130 in an eighth embodiment.

Image display device 130 of an eighth embodiment has a configuration almost similar to that of the second embodiment image display device 50 having been described referring to FIG. 44. Thus, with illustration and configuration description thereof being omitted, description will be made hereinafter by using symbols similar to those in FIG. 23.

In this embodiment, as shown in FIG. 44, at least two sets of image display devices 130 are set in the vicinity of each other and are used.

This embodiment envisages a case where multiple users appreciate images, for example, in a movie theater. FIG. 44 shows the state in which a user has selected an information sharer, and the user and the selected user are exchanging information. With respect to each of the image display devices 130 arranged side by side, as with in the case of FIG. 23, supporting portion 54 is set to the backrest portion of the chair, and image display portion 52 is suspended by supporting portion 54. In the case of a floorstanding type image display device as shown in FIG. 1 of the first embodiment, the supporting portion itself can be moved with ease; however, since it can be placed in any place, there arise problems in terms of space and safety. In contrast, supporting portion 54 set to the backrest portion is set in a space portion where no person accesses; thus, although there is the disadvantage that the image display device itself cannot be easily moved, it excels in space and safety, and thus it will be suitably used in cases where it is used almost without being moved, for example, in a public facility, in movie theater, or as a relaxation chair for home use. In FIG. 44, conversation on/off mechanism 131 for enabling users sitting on adjacent chairs to have a conversation with each other is shown; and it is configured such that when adjacent chairs is connected by the conversation on/off mechanism, one user's speaking voice from voice input portion 51 is outputted from the other user's sound output portion 53 together with sound information of, e.g., a movie. While, as described earlier, on/off of voice input can be performed by moving voice input portion 51 up and down, the users cannot enjoy conversation unless the chairs are connected with each other by conversation on/off mechanism 131. Thus, any user can enjoy images while having a conversation only with a user with whom the former user wants to have a conversation.

However, when voice inputted to one voice input portion 51 is constantly goes to sound output portions 53, the inputted voice mixes, as noise, with the primary images and sound, and thus the sense of reality may be impaired. To address this problem, in this invention, it is configured such that the on/off of sound output portions 53 can be performed by upwardly moving voice input portion 51 to detach it from the mouth position. By this, any user can have a conversation only when the user wants to have a conversation, and when the user need not have a conversation, the user can have other user enjoy images and sound with the sense of reality.

As described above, in accordance with the eighth embodiment, the image display device is an image display device comprises a display portion, a sound output portion that outputs sound to the both ears of a user, a voice input portion to which the voice of the user is inputted, a supporting portion which supports the display portion at its portion that is not in contact with the user, and a face contact portion which is supported by the display portion and comes into contact with the face of the user, the image display device being characterized in that it is provided, when at least two sets of said image display devices are set in the vicinity of each other and are used, with a switching portion that switches what kind of sound information is outputted from said sound output portion and with a switching portion that switches to which image display device is inputted voice information from said voice input portion. Thus, this invention works effectively when it is applied to, for example, a movie theater. Generally, a movie theater requires a large facility in which a large screen is placed and by which the screen can be viewed from every seat, which costs a great deal. In contrast, when the invention of this embodiment is utilized to form a movie theater-like facility, an ordinary room would suffice; further, there arises the advantage that even when the surrounding is noisy or even when the user in front has a long sitting height, any user can enjoy a movie equally without being bothered. But then, when the user came to the movie theater together with fellow users, the user cannot at all have a conversation with the other and feels isolated. To address this problem, in this embodiment there is provided the condition by which with the user who speaks and the user who is spoken to being freely switched, any user can enjoy conversation with a desired user; also, there is achieved, for example, a switching function by which only when a user wants to speak, the user downwardly moves the microphone (voice input device) to make sound output "on" and to speak, and when the user need not speak, the user upwardly moves the microphone to make sound output "off" and not to convey muttering or cough to the other user. This method can produce, for example, the effect that any user can enjoy conversation with a desired user under desired conditions. Further, it is preferable that, as with the first embodiment, the face contact portion is provided in contact with the face sides of the user and sandwiches the face of the user, and the display portion is movable, with a portion of the face contact portion being a point of support, in accordance with the movement of the head of the user. By doing so, the image display portion can be made to follow the movement of the face of the user substantially completely.

<Ninth Embodiment>

Image display device 150 of a ninth embodiment has a configuration almost similar to that of the second embodiment image display device 50 having been described referring to FIG. 23. Thus, with illustration and configuration description thereof being omitted, description will be made hereinafter by using symbols similar to those in FIG. 23.

Figure 45:
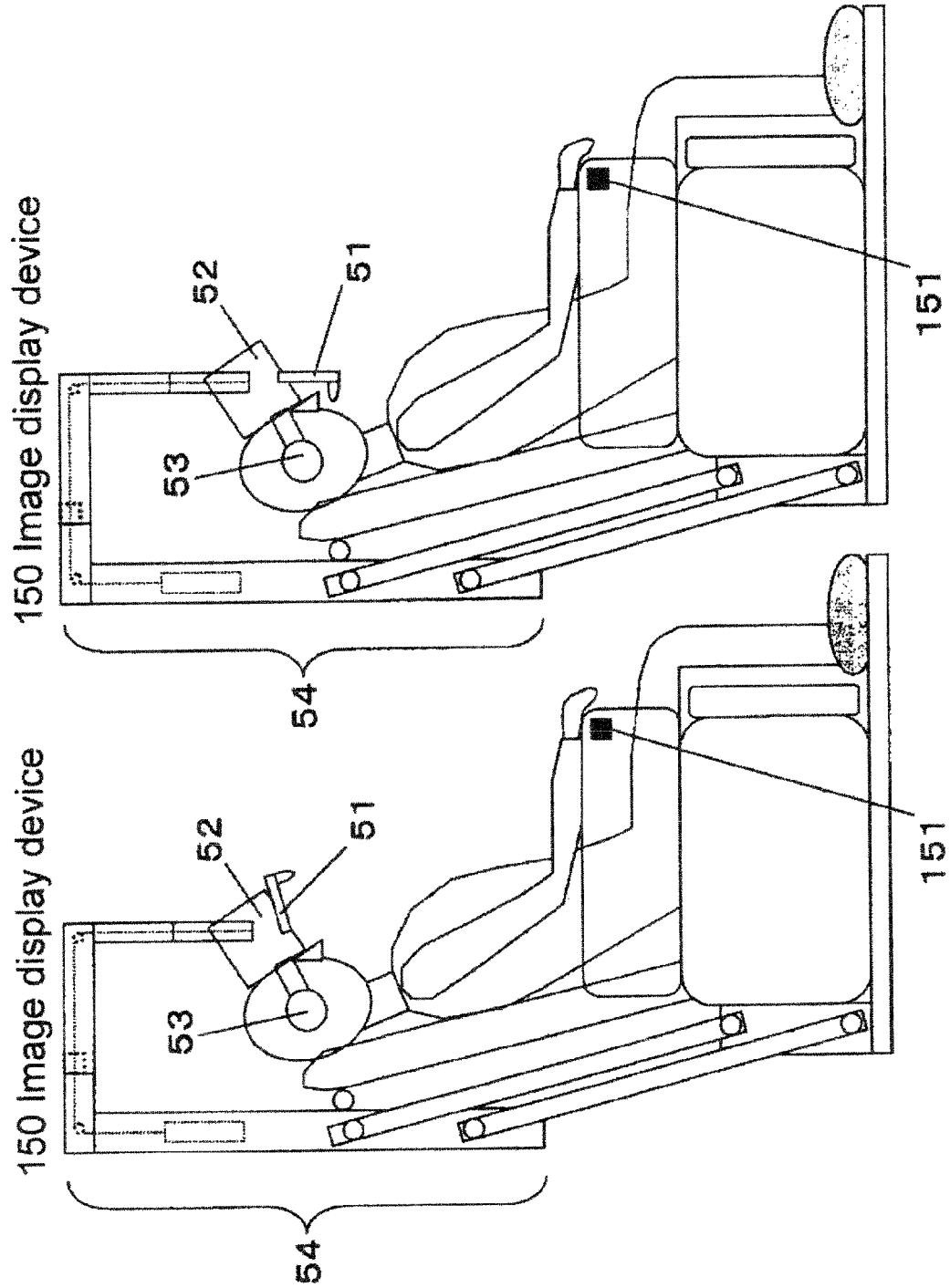
[FIG. 45] A sketch drawing of image display device 150 in a ninth embodiment.

As shown in FIG. 45, two sets of image display devices 150 of this embodiment are attached to the two chairs arranged one behind the other, as a setting example of image display device 150. Each of the two image display devices 150 is provided with supporting portion 54 and supports by supporting portion 54 image display portion 52 to which sound output portion 53 and voice input portion 51 are attached. Further, the image display portion is provided, in its armrest portion, with information input on/off switch 151. Further, as described above, voice input portion 51 can perform, by its up and down motion, on/off of voice input.

In FIG. 45, the left side user has upwardly moved voice input portion 51. That is, the voice input is in "off" state. Thus, the left side user is in the state in which the user need not speak with a person around the user and is appreciating images. In this case, information input on/off switch 151 is used for an outside person to ask a question of the user. For example, in the case of a seat in an airplane, when a flight attendant pushes information input on/off switch 151, the voice of the night attendant is outputted from sound output portion 53 of the user together with the information being outputted as sound information. The switch is utilized by the flight attendant when he or she provides information to a user sitting on a specified seat at the time of arranging meals or servicing drinking water.

In contrast in FIG. 45, the right side user has downwardly moved voice input portion 3. That is, the voice input is in "on" state. This is a state in which the user can, by speaking to a specified user (who is selectable within the image and is sitting nearby (but whose approval is required)), exchange information. Further, it is may also be configured such that, with the voice input being kept "on," when the user pushes information input on/off switch 151, the user can directly speak with a specified person (e.g., a flight attendant). By configuring so, the user can use the switch in case of emergency or when the user wants to be serviced.

As described above, in accordance with the ninth embodiment, the image display device comprises a display portion, a sound output portion that outputs sound to the both ears of a user, a supporting portion which supports the display portion at its portion that is not in contact with the user, a face contact portion which is supported by the display portion and comes into contact with the face of the user, and a switching portion that switches whether sound information from the outside is outputted by said sound output portion. Thus, this invention effectively works in a case where, for example, an airplane flight attendant supplies information to an individual as necessary. More specifically, even in a situation where surrounding information enters the eyes or ears of a user, and it is difficult for the user to be absorbed in image viewing, the user can, when this embodiment is applied, be absorbed in image viewing because no outside sound or images enter the eyes or ears. Moreover, since an on/off switch for deciding whether to mix outside approach into the sound received by the user is provided, there is produced the effect that the sense of reality felt by the user is not impaired, and minimized information provision can be performed. Further, the face contact portion is provided in contact with the face sides of the user and sandwiches the face of the user, and the display portion is movable, with a portion of the face contact portion being a point of support, in accordance with the movement of the head of the user. Thus, the image display portion can be made to follow the movement of the face of the user substantially completely.

Modification Examples

Next among the mechanisms having been described above, inventions having still higher effects will be described.

Eye-Width Adjustment

By completely adjusting the distance between the lenses for the both eyes and the eye-width by the eye-width adjustment mechanism, good images that do not cause eyestrain can be provided. However, when optically adjusting the eye-width actually, the adjustment time may be long, or the adjustment mechanism may become complicated. So, it may be configured such that by providing an optical adjustment portion which makes the lens distance roughly coincide with the eye-width and an electrical adjustment portion which makes the eye-width precisely coincide with the distance between the both image screens, good images that do not substantially cause eyestrain are provided.

In this configuration, for example, as in the case of child vs. adult or foreigner vs. Japanese, the mechanical, rough adjustment is made within the eye-width range of from 65 mm to 55 mm on a basis of 5 mm to meet their average eye-widths. And, as the fine adjustment, the images are electrically shifted. This method has the following advantages: since substantially the optical center is used by the mechanical adjustment, distortion difference felt by the right and left eyes is substantially zero; since the fine adjustment is electrically performed, fine adjustment between the eye-width and the image display distance can be performed, and the eye-width adjustment mechanism becomes relatively simple.

Use by Multiple Users

In the case where it is assumed that the image display device is used by a few users by turns, it is troublesome to perform adjustment addressing each user on each occasion. Thus, it may be configured such that the image display device is supplied with an information input means for identifying the user and with a control means which in accordance with the inputted information, performs automatic adjustment in accordance with adjustment information pre-stored for each user. As the information input means for identifying the user, a method in which the user selects a specified button displayed on the image display portion or method in which the user is recognized through password input may be used. And, with, in accordance with the recognition results, the image display device being automatically adjusted to all of the conditions meeting the specified user, including, the eye-width adjustment and the display image/focus adjustments, wasted time can be eliminated, and the user can immediately enjoy image viewing.

Sound Output Portion

While the example in which the face sandwiching portion and the speaker are integrally disposed has been described, it may also be configured such that the speaker is provided on the chair portion. In that case, the ear portion can be released. Further, a vibration portion which vibrates in concert with at least one of the image and the sound information may be provided on the chair portion.

Industrial Applicability

The following merchantabilities can be expected in utilizing the present invention:

Large screen personal computers and CADs that do not make one feel the weight and fatigue, large screen displays that substitute movie theaters and projectors, provision of 3D large screen images full of reality, the Internet reception of images from the above-described video mechanism, provision of images full of reality to a sick person or bedridden elderly person, relaxation image display devices, provision of new sense TV game images, provision of large screen images in a small space, high confidentiality information display systems for individual use, virtual reality displays, remote controllable large screen displays, digital newspaper reception systems with a wide screen, relaxation service at the seat of an airplane, etc., educational materials that do not injure the eyesight, new display games in an amusement facility, etc.

What is claimed is:

1. An image display device comprising:
a display portion having a two-dimensionally light emitting type photoelectric device that has a display surface orthogonal to a direction of emitted light flux, and eyepiece optical systems that project the light flux emitted from said photoelectric device onto at least one eyeball of a user; and
a face sandwiching portion that is connected to said display portion, and that is capable of changing a distance between said eyepiece optical systems and the eyeball of said user, and of maintaining said changed distance,
wherein said eyepiece optical systems form an intermediate image,
wherein said eyepiece optical systems comprise optical elements which are arranged between the eyeball and a position of forming the intermediate image, and at least one of the optical elements has an aspherical shape having a conic surface on at least one side,
wherein a Conic coefficient of said conic surface is less than 0.

2. The image display device according to claim 1, wherein said eyepiece optical systems have a viewing angle of more than ±30 degrees.

3. The image display device according to claim 1, wherein said conic surface is formed on a far surface of said at least one of the optical elements from the eyeball of said user.

4. The image display device according to claim 2, wherein said conic surface is formed on a far surface of said at least one of the optical elements from the eyeball of said user.

5. The image display device according to claim 1, wherein in each of said eyepiece optical systems in said display portion, an optical element located nearest to the eyeball of said user from among said optical elements has said conic surface.

6. The image display device according to claim 2, wherein in each of said eyepiece optical systems in said display portion, an optical element located nearest to the eyeball of said user from among said optical elements has said conic surface.

7. The image display device according to claim 1, wherein said eyepiece optical systems comprise at least three lenses as the optical elements.

8. The image display device according to claim 2, wherein said eyepiece optical systems comprise at least three lenses as the optical elements.

9. The image display device according to claim 1, wherein in each of said eyepiece optical systems, an optical element located most distant from the eyeball of said user from among said optical elements comprises a cemented lens.

10. The image display device according to claim 2, wherein in each of said eyepiece optical systems, an optical element located most distant from the eyeball of said user from among said optical elements comprises a cemented lens.

11. The image display device according to claim 1, wherein said face sandwiching portion comprises a face contact portion provided so as to contact with face sides of said user, and to sandwich the face of said user.

12. The image display device according to claim 2, wherein said face sandwiching portion comprises a face contact portion provided so as to contact with face sides of said user, and to sandwich the face of said user.

13. The image display device according to claim 11,
wherein said face contact portion comes into contact with the face sides by sandwiching both ears of said user, and
wherein a portion of said face contact portion sandwiching said both ears comprises a sound output mechanism.

14. The image display device according to claim 11, wherein said face contact portion comprises an elastic member for coming into contact with the face sides of said user, and wherein said face contact portion comprises, independently of said elastic member, a width changing portion that changes a face sandwiching width, and a distance changing portion that changes the distance between said eyepiece optical systems and the eyes of said user.

15. The image display device according to claim 11, wherein said display portion changes, in accordance with the distance between said eyepiece optical systems and the eyes of said user, a size of an image to be displayed.

16. The image display device according to claim 11,
wherein said display portion comprises a face fixing member at a portion that faces a front side of the face of said user, and
wherein a position of said face contact portion is changeable to a distance where the front side of the face of said user is in contact with said face fixing member and to a distance where without the front side of the face of said user being in contact with said face fixing member, a sight line of both eyes of said user is, relative to said display portion, relatively movable around an axis passing through both ears.

17. The image display device according to claim 16,
wherein said face fixing member is provided so as to evade an eyeglass frame of said user, and to be discretely provided around and above and below the eyes, and wherein said display portion comprises light-shielding members for shielding outside light from right-and-left sides of said eyeglass frame.

18. The image display device according to claim 16, wherein said display portion comprises a frame recognition portion that recognizes whether there exists an eyeglass frame of said user, and wherein a thickness in an optical axis direction of said eyepiece optical systems is changeable in accordance with a recognition result of said frame recognition portion.

19. The image display device according to claim 11, wherein said display portion is supported by a supporting portion that is not in contact with said user.

* * * * *